US012351705B2

(12) United States Patent
Zhang et al.

(10) Patent No.: US 12,351,705 B2
(45) Date of Patent: Jul. 8, 2025

(54) ETHYLENE INTERPOLYMER PRODUCTS HAVING INTERMEDIATE BRANCHING

(71) Applicant: NOVA Chemicals (International) S.A., Fribourg (CH)

(72) Inventors: Zengrong Zhang, Calgary (CA); Fazle Sibtain, Calgary (CA); Niousha Kazemi, Calgary (CA); Kenneth Taylor, Sarnia (CA); Shivendra Goyal, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 527 days.

(21) Appl. No.: 17/895,547

(22) Filed: Aug. 25, 2022

(65) Prior Publication Data

US 2023/0002596 A1 Jan. 5, 2023

Related U.S. Application Data

(63) Continuation of application No. 17/068,919, filed on Oct. 13, 2020, now abandoned, which is a continuation of application No. 16/243,203, filed on Jan. 9, 2019, now Pat. No. 10,882,987.

(51) Int. Cl.
C08L 23/06 (2006.01)
C08L 23/0807 (2025.01)

(52) U.S. Cl.
CPC .......... *C08L 23/06* (2013.01); *C08L 23/0815* (2013.01); *C08L 2205/025* (2013.01); *C08L 2205/03* (2013.01); *C08L 2207/06* (2013.01)

(58) Field of Classification Search
None
See application file for complete search history.

(56) References Cited

U.S. PATENT DOCUMENTS

| | | |
|---|---|---|
| 5,198,401 A | 3/1993 | Turner et al. |
| 5,382,630 A | 1/1995 | Stehling et al. |
| 5,382,631 A | 1/1995 | Stehling et al. |
| 5,408,004 A | 4/1995 | Lai et al. |
| 5,519,091 A | 5/1996 | Tsutsui et al. |
| 5,530,065 A | 6/1996 | Farley et al. |
| 5,571,880 A | 11/1996 | Alt et al. |
| 5,605,969 A | 2/1997 | Tsutsui et al. |
| 5,663,249 A | 9/1997 | Ewen et al. |
| 5,674,342 A | 10/1997 | Obijeski et al. |
| 5,677,383 A | 10/1997 | Chum et al. |
| 5,685,128 A | 11/1997 | Chum et al. |
| 5,747,594 A | 5/1998 | Degroot et al. |
| 5,767,208 A | 6/1998 | Turner et al. |
| 5,773,106 A | 6/1998 | Degroot et al. |
| 5,783,638 A | 7/1998 | Lai et al. |
| 5,792,534 A | 8/1998 | Degroot et al. |
| 5,844,045 A | 12/1998 | Kolthammer et al. |
| 5,847,053 A | 12/1998 | Chum et al. |
| 5,869,575 A | 2/1999 | Kolthammer et al. |
| 5,874,139 A | 2/1999 | Bosiers et al. |
| 5,986,028 A | 11/1999 | Lai et al. |
| 6,025,448 A | 2/2000 | Swindoll et al. |
| 6,111,023 A | 8/2000 | Chum et al. |
| 6,121,185 A | 9/2000 | Rosen et al. |
| 6,127,484 A | 10/2000 | Cribbs et al. |
| 6,218,472 B1 | 4/2001 | Debras et al. |
| 6,221,982 B1 | 4/2001 | Debras et al. |
| 6,262,195 B1 | 7/2001 | Dall'Occo et al. |
| 6,277,931 B1 | 8/2001 | Jaber et al. |
| 6,300,433 B1 | 10/2001 | Rodriguez et al. |
| 6,306,969 B1 | 10/2001 | Patel et al. |
| 6,313,240 B1 | 11/2001 | Hasegawa et al. |
| 6,316,549 B1 | 11/2001 | Chum et al. |
| 6,346,575 B1 | 2/2002 | Debras et al. |
| 6,388,017 B1 | 5/2002 | McDaniel et al. |
| 6,392,076 B1 | 5/2002 | Adams et al. |
| 6,403,717 B1 | 6/2002 | Adams et al. |

(Continued)

OTHER PUBLICATIONS

Ansara, Mahmoud; Hatzikiriakos, Sawas G.; Sukhadia, Ashish M. and Rohlfing, David C.; Rheology of Ziegler-Natta and metallocene high-denisty polyethylenes: broad molecular weight distribution effects; Rheol Acta, 2011, pp. 17-27.

Arnett, Raymond L.; Zero-Shear Viscosity of Some Ethyl Branched Paraffinic Model Polymers; 1980 American Chemical Society; J. Phys. Chem. vol. 84. pp. 649-652.

Graessley, William W.; Effect of Long Branches on the Flow Properties of Polymers; 1977, vol. 10, Flow Properties of Polymers; pp. 332-339.

Karjala, Teresa P.; Sammler, Robert L.; Mangnus, Marc A.; Hazlitt, Lonnie G.; Johnson, Mark S.; Wang, Jian; Hagen, Charles J., Jr.; Huang, W.L. and Reichek, Kenneth N.; Detection of Low Levels of Long-Chain Branching in Polydisperse Polyethylene Materials; Journal of Applied Polymer Science, vol. 119, 2011, pp. 636-646.

Yau, Wallace W. and Hill, Donald R.; Application of Triple-Detector Size Exclusion Chromatography (On-Line Differential Refractometer, Viscometer and Light Scattering Detectors) for the Characterization of brominated Polyetyrene; International Journal of Polymer Analysis and Characterization; Published online: Sep. 24, 2006; pp. 151-171.

(Continued)

*Primary Examiner* — Christopher M Rodd
(74) *Attorney, Agent, or Firm* — Thomas J. Styslinger

(57) ABSTRACT

This disclosure relates to ethylene interpolymer product having intermediate branching. Intermediate branching was defined as branching that was longer than the branch length due to comonomer and shorter than the entanglement molecular weight ($M_e$). Intermediately branched ethylene interpolymer products were produced in a continuous solution polymerization process employing an intermediate branching catalyst formulation. Intermediately branched ethylene interpolymer products were characterized by a Non-Comonomer Index Distribution ($NCID_i$), a melt index from 0.3 to 500 dg/minute, a density from 0.858 to 0.965 g/cm³, a polydispersity ($M_w/M_n$) from about 2 to about 25 and a $CDBI_{50}$ from about 10% to about 98%. A method based on triple detection cross fractionation chromatography (3D-CFC) was disclosed to measure $NCID_i$.

14 Claims, 20 Drawing Sheets

(56) References Cited

U.S. PATENT DOCUMENTS

| | | |
|---|---|---|
| 6,416,833 B1 | 7/2002 | Climenhage et al. |
| 6,433,095 B1 | 8/2002 | Laurent |
| 6,441,116 B1 | 8/2002 | Shikuma et al. |
| 6,448,341 B1 | 9/2002 | Kolthammer et al. |
| 6,462,135 B1 | 10/2002 | Rohde et al. |
| 6,462,136 B1 | 10/2002 | Saito et al. |
| 6,469,103 B1 | 10/2002 | Jain et al. |
| 6,479,589 B2 | 11/2002 | Debras et al. |
| 6,479,609 B1 | 11/2002 | Dall'Occo et al. |
| 6,486,088 B1 | 11/2002 | Crowther et al. |
| 6,489,427 B1 | 12/2002 | Clutton et al. |
| 6,506,867 B1 | 1/2003 | Lai et al. |
| 6,518,385 B1 | 2/2003 | Chai |
| 6,534,612 B1 | 3/2003 | Lai et al. |
| 6,538,070 B1 | 3/2003 | Cardwell et al. |
| 6,555,631 B1 | 4/2003 | Wang et al. |
| 6,562,919 B2 | 5/2003 | Crowther et al. |
| 6,566,446 B1 | 5/2003 | Parikh et al. |
| 6,566,450 B2 | 5/2003 | Debras et al. |
| 6,569,948 B2 | 5/2003 | Laurent |
| 6,579,922 B2 | 6/2003 | Laurent |
| 6,642,339 B1 | 11/2003 | Chai et al. |
| 6,657,026 B1 | 12/2003 | Kimberley et al. |
| 6,683,149 B2 | 1/2004 | Jain et al. |
| 6,723,398 B1 | 4/2004 | Chum et al. |
| 6,723,677 B1 | 4/2004 | Estrada et al. |
| 6,730,751 B2 | 5/2004 | Shamshoum et al. |
| 6,780,954 B2 | 8/2004 | Lai et al. |
| 6,806,220 B2 | 10/2004 | Crowther et al. |
| 6,828,395 B1 | 12/2004 | Ehrman et al. |
| 6,844,398 B2 | 1/2005 | Shikuma et al. |
| 6,870,010 B1 | 3/2005 | Lue et al. |
| 6,875,816 B2 | 4/2005 | Degroot et al. |
| 6,906,141 B2 | 6/2005 | Chum et al. |
| 6,916,883 B2 | 7/2005 | Parikh et al. |
| 6,921,795 B2 | 7/2005 | Wang et al. |
| 6,921,799 B1 | 7/2005 | Follestad et al. |
| 6,924,342 B2 | 8/2005 | Stevens et al. |
| 6,969,741 B2 | 11/2005 | Lustiger et al. |
| 6,982,311 B2 | 1/2006 | Karande et al. |
| 6,988,022 B2 | 1/2006 | Parrish et al. |
| 7,022,770 B2 | 4/2006 | Lustiger et al. |
| 7,041,617 B2 | 5/2006 | Jensen et al. |
| 7,101,939 B2 | 9/2006 | Nowlin et al. |
| 7,125,933 B2 | 10/2006 | German et al. |
| 7,148,304 B2 | 12/2006 | Kimberley et al. |
| 7,153,909 B2 | 12/2006 | Van Dun et al. |
| 7,166,676 B2 | 1/2007 | Jacobsen et al. |
| 7,230,054 B2 | 6/2007 | Mavridis et al. |
| 7,250,473 B2 | 7/2007 | Schramm et al. |
| 7,250,474 B2 | 7/2007 | Maziers |
| 7,271,221 B2 | 9/2007 | Stevens et al. |
| 7,300,983 B2 | 11/2007 | Degroot et al. |
| 7,396,881 B2 | 7/2008 | Lustiger et al. |
| 7,432,328 B2 | 10/2008 | Jaker |
| 7,439,306 B2 | 10/2008 | Davis |
| 7,456,243 B2 | 11/2008 | Jensen et al. |
| 7,514,504 B2 | 4/2009 | Van Sinoy et al. |
| 7,645,835 B2 | 1/2010 | Van Dun et al. |
| 7,659,343 B2 | 2/2010 | Wooster et al. |
| 7,714,073 B2 | 5/2010 | Jacobsen et al. |
| 7,846,552 B2 | 12/2010 | Weeks |
| 7,858,702 B2 | 12/2010 | Jaker |
| 7,868,092 B2 | 1/2011 | Kwalk et al. |
| 7,906,451 B2 | 3/2011 | Citron et al. |
| 7,968,659 B2 | 6/2011 | Chai |
| 7,977,268 B2 | 7/2011 | Citron et al. |
| 7,999,039 B2 | 8/2011 | Degroot et al. |
| 8,039,554 B2 | 10/2011 | Iseki et al. |
| 8,076,428 B2 | 12/2011 | Shim et al. |
| 8,101,685 B2 | 1/2012 | Jiang et al. |
| 8,101,687 B2 | 1/2012 | Schramm et al. |
| 8,227,564 B2 | 7/2012 | Loveday et al. |
| 8,410,217 B2 | 4/2013 | Tse et al. |
| 8,426,525 B2 | 4/2013 | Nozue et al. |
| 8,475,898 B2 | 7/2013 | Wang et al. |
| 8,475,899 B2 | 7/2013 | Yang et al. |
| 8,481,647 B2 | 7/2013 | Jiang et al. |
| 8,895,466 B2 | 11/2014 | Busico et al. |
| 8,933,175 B2 | 1/2015 | Yu et al. |
| 9,068,033 B2 | 6/2015 | Fiscus et al. |
| 9,102,819 B2 | 8/2015 | Kapur et al. |
| 9,115,275 B2 | 8/2015 | Kupar et al. |
| 9,540,457 B1 | 1/2017 | Ding et al. |
| 9,540,459 B2 | 1/2017 | Ebisawa et al. |
| 2002/0177677 A1 | 11/2002 | Kanamori et al. |
| 2003/0114595 A1 | 6/2003 | Van Dun et al. |
| 2003/0149181 A1 | 8/2003 | Kolthammer et al. |
| 2005/0119413 A1 | 6/2005 | Maziers |
| 2006/0036041 A1 | 2/2006 | Kwalk |
| 2006/0041088 A1 | 2/2006 | Nagy et al. |
| 2007/0010626 A1 | 1/2007 | Shankernarayanan et al. |
| 2009/0062463 A1 | 3/2009 | Backmann et al. |
| 2009/0099315 A1 | 4/2009 | Kipke et al. |
| 2009/0326169 A1 | 12/2009 | Dams et al. |
| 2010/0304052 A1 | 12/2010 | Chai et al. |
| 2012/0065335 A1 | 3/2012 | Kipke et al. |
| 2012/0252989 A1 | 10/2012 | Dewachter et al. |
| 2012/0309910 A1 | 12/2012 | Dewachter et al. |
| 2012/0322959 A1 | 12/2012 | Masi et al. |
| 2013/0085231 A1* | 4/2013 | Lue ................. C08L 23/0815 525/240 |

OTHER PUBLICATIONS

Randall, James C.; A Review of High Resolution Liquid 13Carbon Nuclear Magnetic Resonance Characterizations of Ethylene-Based Polymers; Journal of Macromolecular Science-Reviews in Macromolecular Chemistry and Physics, Published online: Dec. 5, 2006, pp. 201-317.

Shroff, R.N. and Mavridis, H.; Long-Chain-Branching Index for Essentially Linear Polyethylenes; 199, American Chemical Society; Macromolecules, vol. 32, pp. 8454-8464.

Wood-Adams, Paula M. and Dealy, John M.; Degrood, A. Willem and Redwine, O. David; Effect of Molecular Structure on the Linear Viscoelastic Behavior of Polyethylene; Macromolecules 2000, vol. 33. pp. 7489-7499.

Yang, Qing, Jensen, Michael D. and McDaniel, Max P., Alternative View of Long Chain Branch Formation by Metallocene Catalysts, Macromolecules, 2010, vol. 43, pp. 8836-8852.

Yau, Wallace W and Gillespie, David; A Trisec and 3DTREF Approach to Polymer Blend Design; 2000 Polymers, Laminations & Coatings Conference Proceedings, pp. 1-11.

Non-Final Office Action in U.S. Appl. No. 17/068,919, filed Apr. 5, 2022, 7 pgs.

\* cited by examiner

ETHYLENE INTERPOLYMER PRODUCTS HAVING INTERMEDIATE BRANCHING

CROSS-REFERENCE TO RELATED APPLICATIONS

This application is a continuation of U.S. patent application Ser. No. 17/068,919, filed Oct. 13, 2020, which is a continuation of U.S. patent application Ser. No. 16/243,203, filed Jan. 9, 2019, now U.S. Pat. No. 10,882,987, both of which are hereby incorporated by reference in their entireties.

TECHNICAL FIELD

This disclosure relates to: copolymers of ethylene and α-olefins having intermediate branching; continuous polymerization processes to manufacture such copolymers; analytical methods to characterize such copolymers; and the utility of such copolymers in a myriad of manufactured articles.

BACKGROUND

The polymer industry is in constant need of improved ethylene interpolymer products, e.g. in flexible film applications such as food packaging, shrink films and stretch films. As disclosed hereinafter, ethylene interpolymer products having intermediate branching have performance attributes that are advantageous in film applications. Relative to competitive ethylene interpolymer products of similar density and melt index, films produced from intermediately branched ethylene interpolymer products have, for example, higher dart impact, higher tensile strength and/or improved optical properties, such as higher film 45° gloss and lower film haze. The polymer industry is also in need of improved ethylene interpolymer products for rigid applications, including, but not limited to containers, lids, caps and toys, etc. Ethylene interpolymer products having intermediate branching also have utility in such rigid applications. Ethylene interpolymer products having intermediate branching were produced in a continuous solution polymerization process. Solution polymerization processes are typically carried out at temperatures above the melting point of the ethylene interpolymer being synthesized. In a typical solution polymerization process, catalyst components, solvent, monomer(s) and hydrogen are fed under pressure to one or more reactors. A wide variety of vessels (e.g. polymerization reactors, etc.) and vessel arrangements can be used under a wide range of process conditions allowing the production of a wide variety of ethylene interpolymer products. Post reactor, the polymerization reaction is typically quenched by adding a catalyst deactivator and passivated by adding an acid scavenger. Once passivated, the polymer solution is forwarded to polymer recovery operations where the ethylene interpolymer product is separated from process solvent, unreacted residual ethylene and unreacted optional α-olefin(s).

SUMMARY OF DISCLOSURE

In this application, ethylene interpolymer products having intermediate branching are disclosed, as well as a process to manufacture such products and a method to measure the Non-Comonomer Index Distribution ($NCID_i$) to quantify the amount of intermediate branching in such products. Intermediate branching was defined as branching that was longer than the branch length due to comonomer (e.g. $C_4$ or $C_6$ branches from 1-hexene or 1-octene comonomers, respectively) and shorter than the entanglement molecular weight, $M_e$ ($M_e$ is a well-known concept in polymer physics). The amount of intermediate branching in the disclosed ethylene interpolymer products was characterized by the 'Non-Comonomer Index (NCI)', as well as the 'Non-Comonomer Index Distribution ($NCID_i$), which was generated using triple detection cross fractionation chromatography (3D-CFC) techniques. Ethylene interpolymer products, having intermediate branching, may, or may not contain long chain branching as characterized by the Long Chain Branching Factor (LCBF).

Long chain branches were branches that were greater than or equal to $M_e$; long chain branches were macromolecular in nature and were evident in rheological measurements. The advantages of ethylene interpolymer products having intermediate branching in films applications is disclosed and compared with comparative ethylene interpolymer product films that did not contain intermediate branching.

The following embodiments are provided for the purpose of a specific disclosure for the appended claims.

One embodiment of this disclosure, hereinafter embodiment [I], is fully described immediately below.

[I]-1. An ethylene interpolymer product comprising:
(i) a first ethylene interpolymer;
(ii) a second ethylene interpolymer, and;
(iii) optionally a third ethylene interpolymer;
wherein said second ethylene interpolymer is characterized by an intermediate branching, wherein said intermediate branching is characterized by a Non-Comonomer Index Distribution, $NCID_i$, having a value characterized by Eq. (1a) and Eq. (1b);

$$NCID_i \leq 1.000 - 0.00201(\log M_i - \log M_o + 4.93) + 0.00137(\log M_i - \log M_o + 4.93)^2 - 0.00034(\log M_i - \log M_o + 4.93)^3 \quad \text{Eq. (1a)}$$

$$NCID_i \geq 0.730 - 0.00388(\log M_i - \log M_o + 4.93) + 0.00313(\log M_i - \log M_o + 4.93)^2 - 0.00069(\log M_i - \log M_o + 4.93)^3 \quad \text{Eq. (1b)}$$

wherein, $M_o$ is a peak molecular weight that characterizes a molecular weight distribution of said second ethylene interpolymer when fit to a log normal distribution;

wherein a first derivative of said $NCID_i$ $$\frac{dNCID_i}{d\log M_i},$$

Eq. (2);

$$\frac{dNCID_i}{d\log M_i} = \beta_1 + 2\beta_2(\log M_i - \log M_o + 4.93) + 3\beta_3(\log M_i - \log M_o + 4.93)^2 \quad \text{Eq. (2)}$$

has a value of $\leq -0.0001$, coefficients $\beta_0, \beta_1, \beta_2$ and $\beta_3$ are generated by fitting said $NCID_i$ of said second ethylene interpolymer to a third order polynomial, Eq. (3), $$NCID_i = \beta_0 + \beta_1(\log M_i - \log M_o + 4.93) + \beta_2(\log M_i - \log M_o + 4.93)^2 + \beta_3(\log M_i - \log M_o + 4.93)^3 \quad \text{Eq. (3)}$$

wherein said $NCID_i$ may be experimentally measured or computer simulated;

wherein said ethylene interpolymer product does not contain long chain branching as characterized by a dimensionless Long Chain Branching Factor, LCBF, having a value of <0.001.

[I]-2. The ethylene interpolymer as described in [I]-1, wherein said first ethylene interpolymer is synthesized using a homogenous catalyst formulation and said second ethylene interpolymer is synthesized using an intermediate branching catalyst formulation.

[I]-3. The ethylene interpolymer product as described in [I]-2, wherein said homogeneous catalyst formulation is an unbridged single site catalyst formulation and said intermediate branching catalyst formulation is an in-line intermediate branching catalyst formulation or a batch intermediate branching catalyst formulation.

[I]-4. The ethylene interpolymer product as described in [I]-1 having a melt index from about 0.3 to about 500 dg/minute and a density from about 0.858 to about 0.965 g/cc; wherein melt index is measured according to ASTM D1238 (2.16 kg load and 190° C.) and density is measured according to ASTM D792.

[I]-5. The ethylene interpolymer product as described in [I]-1 having a $M_w/M_n$ from about 2 to about 25.

[I]-6. The ethylene interpolymer product as described in [I]-1 having a $CDBI_{50}$ from about 10% to about 98%.

[I]-7. The ethylene interpolymer product as described in [I]-1; wherein
(i) said first ethylene interpolymer has a melt index from about 0.001 to about 1000 dg/minute, a density from about 0.855 g/cm³ to about 0.975 g/cc and is from about 0 to 60 weight percent of said ethylene interpolymer product;
(ii) said second ethylene interpolymer has melt index from about 0.001 to about 1000 dg/minute, a density from about 0.89 g/cm³ to about 0.965 g/cc and is from about 10 to 99 weight percent of said ethylene interpolymer product;
(iii) optionally said third ethylene interpolymer has a melt index from about 0.1 to about 10000 dg/minute, a density from about 0.855 to about 0.975 g/cc and is from 0 to about 30 weight percent of said ethylene interpolymer product;
wherein melt index is measured according to ASTM D1238 (2.16 kg load and 190° C.), density is measured according to ASTM D792 and weight percent is the weight of said first, said second or said optional third ethylene interpolymer divided by the weight of said ethylene interpolymer product.

[I]-8. The ethylene interpolymer product as described in [I]-1 synthesized using a solution polymerization process.

[I]-9. The ethylene interpolymer product as described in [I]-1 further comprising from 0.001 to about 10 mole percent of one or more α-olefin.

[I]-10. The ethylene interpolymer product as described in [I]-9; wherein said one or more α-olefin are $C_3$ to $C_{10}$ α-olefins.

[I]-11. The ethylene interpolymer product as described in [I]-10; wherein said one or more α-olefin is 1-hexene, 1-octene or a mixture of 1-hexene and 1-octene.

[I]-12. The ethylene interpolymer product as described in [I]-1 wherein said third ethylene interpolymer is synthesized using a heterogeneous catalyst formulation or a homogeneous catalyst formulation or an intermediate branching catalyst formulation.

[I]-13. The ethylene interpolymer product as described in [I]-1; wherein said first ethylene interpolymer has a first $CDBI_{50}$ from about 20 to about 98%, said second ethylene interpolymer has a second $CDBI_{50}$ from about 20 to about 70% and said optional third ethylene interpolymer has a third $CDBI_{50}$ from about 20 to about 98%.

[I]-14. The ethylene interpolymer product as described in [I]-13; wherein said first $CDBI_{50}$ is higher than said second $CDBI_{50}$.

Another embodiment of this disclosure, hereinafter embodiment [II], is fully described immediately below.

[II]-1. An ethylene interpolymer product comprising:
(i) a first ethylene interpolymer;
(ii) a second ethylene interpolymer, and;
(iii) optionally a third ethylene interpolymer;
wherein said second ethylene interpolymer is characterized by an intermediate branching, wherein said intermediate branching is characterized by a Non-Comonomer Index Distribution, $NCID_i$, having a value characterized by Eq. (1a) and Eq. (1b), wherein, $M_o$ is a peak molecular weight that characterizes a molecular weight distribution of said second ethylene interpolymer when fit to a log normal distribution;
wherein a first derivative of said $NCID_i$, $$\frac{dNCID_i}{d\log M_i},$$

Eq. (2), has a value of ≤−0.0001, coefficients $\beta_0$, $\beta_1$, $\beta_2$ and $\beta_3$ are generated by fitting said $NCID_i$ of said second ethylene interpolymer to a third order polynomial, Eq. (3),
wherein said $NCID_i$ may be experimentally measured or computer simulated;
wherein said ethylene interpolymer product contains long chain branching as characterized by a dimensionless Long Chain Branching Factor, LCBF, having a value ≥0.001.

[II]-2. The ethylene interpolymer as described in [II]-1, wherein said first ethylene interpolymer is synthesized using a homogenous catalyst formulation and said second ethylene interpolymer is synthesized using an intermediate branching catalyst formulation. [II]-3. The ethylene interpolymer product as described in [II]-2, wherein said homogeneous catalyst formulation is a bridged single site catalyst formulation and said intermediate branching catalyst formulation is an in-line intermediate branching catalyst formulation or a batch intermediate branching catalyst formulation. [II]-4. The ethylene interpolymer product as described in [II]-1 having a melt index from about 0.3 to about 500 dg/minute and a density from about 0.858 to about 0.965 g/cc; wherein melt index is measured according to ASTM D1238 (2.16 kg load and 190° C.) and density is measured according to ASTM D792.

[II]-5. The ethylene interpolymer product as described in [II]-1 having a $M_w/M_n$ from about 2 to about 25.

[II]-6. The ethylene interpolymer product as described in [II]-1 having a $CDBI_{50}$ from about 10% to about 98%.

[II]-7. The ethylene interpolymer product as described in [II]-1; wherein
(i) said first ethylene interpolymer has a melt index from about 0.001 to about 1000 dg/minute, a density from about 0.855 g/cm³ to about 0.975 g/cc and is from about 0 to 60 weight percent of said ethylene interpolymer product;
(ii) said second ethylene interpolymer has melt index from about 0.001 to about 1000 dg/minute, a density from about 0.89 g/cm³ to about 0.965 g/cc and is from about to 99 weight percent of said ethylene interpolymer product;
(iii) optionally said third ethylene interpolymer has a melt index from about 0.1 to about 10000 dg/minute, a density from about 0.855 to about 0.975 g/cc and is from 0 to about 30 weight percent of said ethylene interpolymer product;
wherein melt index is measured according to ASTM D1238 (2.16 kg load and 190° C.), density is measured according to ASTM D792 and weight percent is the weight of said first, said second or said optional third ethylene interpolymer divided by the weight of said ethylene interpolymer product.

[II]-8. The ethylene interpolymer product as described in [II]-1 synthesized using a solution polymerization process.

[II]-9. The ethylene interpolymer product as described in [II]-1 further comprising from 0.001 to about 10 mole percent of one or more α-olefin.

[II]-10. The ethylene interpolymer product as described in [II]-9; wherein said one or more α-olefin are $C_3$ to $C_{10}$ α-olefins.

[II]-11. The ethylene interpolymer product as described in [II]-10; wherein said one or more α-olefin is 1-hexene, 1-octene or a mixture of 1-hexene and 1-octene.

[II]-12. The ethylene interpolymer product as described in [II]-1 wherein said third ethylene interpolymer is synthesized using a heterogeneous catalyst formulation or a homogeneous catalyst formulation or an intermediate branching catalyst formulation.

[II]-13. The ethylene interpolymer product as described in [II]-1; wherein said first ethylene interpolymer has a first $CDBI_{50}$ from about 20 to about 98%, said second ethylene interpolymer has a second $CDBI_{50}$ from about 20 to about 70% and said optional third ethylene interpolymer has a third $CDBI_{50}$ from about 20 to about 98%.

[II]-14. The ethylene interpolymer product as described in [II]-13; wherein said first $CDBI_{50}$ is higher than said second $CDBI_{50}$.

An additional embodiment of this disclosure, hereinafter embodiment [III], is fully described immediately below.

[III]-1. An ethylene interpolymer product comprising at least one ethylene interpolymer; wherein said ethylene interpolymer is characterized by:
an intermediate branching wherein said intermediate branching is characterized by a Non-Comonomer Index Distribution, $NCID_i$, having a value characterized by Eq. (1a) and Eq. (1b);
wherein, $M_o$ is a peak molecular weight that characterizes a molecular weight distribution of said ethylene interpolymer when fit to a log normal distribution;
wherein a first derivative of said $NCID_i$, $$\frac{dNCID_i}{d\log M_i},$$

Eq. (2), has a value of $\leq -0.0001$, coefficients so, $\beta_1$, $\beta_2$ and $\beta_3$ are generated by fitting said $NCID_i$ of said ethylene interpolymer to a third order polynomial, Eq. (3), wherein said $NCID_i$ may be experimentally measured or computer simulated.

[III]-2. The ethylene interpolymer product as described in [III]-1, wherein said ethylene interpolymer is synthesized using an intermediate branching catalyst formulation.

[III]-3. The ethylene interpolymer product as described in [III]-2, wherein said intermediate branching catalyst formulation is an in-line intermediate branching catalyst formulation or a batch intermediate catalyst formulation.

[III]-4. The ethylene interpolymer product as described in [III]-1, comprising a first ethylene interpolymer, a second ethylene interpolymer and optionally a third ethylene interpolymer;
wherein at least one of said first, said second and/or said third ethylene interpolymer is characterized by said $NCID_i$ having a value characterized by Eq. (1a) and Eq. (1b) and said first derivative Eq. (2) has a value $\leq -0.0001$, wherein said $NCID_i$ may be experimentally measured or computer simulated.

[III]-5. The ethylene interpolymer product as described in [III]-4, wherein said first ethylene interpolymer is synthesized with a first heterogeneous catalyst formulation, said second ethylene interpolymer is synthesized with a second heterogeneous catalyst formulation and said optional third ethylene interpolymer is synthesized with a third heterogeneous catalyst formulation; wherein said first, said second and said third heterogeneous catalyst formulations may be the same formulation or different formulations with the proviso that at least one of said first, said second and said third heterogeneous catalyst formulations is an intermediate branching catalyst formulation.

[III]-6. The ethylene interpolymer product as described in [III]-1, further characterized by a dimensionless Long Chain Branching Factor, LCBF, having a value <0.001.

[III]-7. The ethylene interpolymer product as described in [III]-1 having a melt index from about 0.3 to about 500 dg/minute and a density from about 0.890 to about 0.965 g/cc; wherein melt index is measured according to ASTM D1238 (2.16 kg load and 190° C.) and density is measured according to ASTM D792.

[III]-8. The ethylene interpolymer product as described in [III]-1 having a $M_w/M_n$ from about 2.2 to about 25.

[III]-9. The ethylene interpolymer product as described in [III]-1 having a $CDBI_{50}$ from about 10% to about 98%.

[III]-10. The ethylene interpolymer product as described in [III]-5; wherein
(i) said first ethylene interpolymer has a melt index from about 0.001 to about 1000 dg/minute, a density from about 0.890 g/cm³ to about 0.965 g/cc and is from about 0 to 60 weight percent of said ethylene interpolymer product;
(ii) said second ethylene interpolymer has melt index from about 0.001 to about 1000 dg/minute, a density from about 0.89 g/cm³ to about 0.965 g/cc and is from about 10 to 99 weight percent of said ethylene interpolymer product; and
(iii) optionally said third ethylene interpolymer has a melt index from about 0.1 to about 10000 dg/minute, a density from about 0.89 to about 0.965 g/cc and is from 0 to about 30 weight percent of said ethylene interpolymer product;

wherein melt index is measured according to ASTM D1238 (2.16 kg load and 190° C.), density is measured according to ASTM D792 and weight percent is the weight of said first, said second or said optional third ethylene interpolymer divided by the weight of said ethylene interpolymer product.

[III]-11. The ethylene interpolymer product as described in [III]-1 synthesized using a solution polymerization process.

[III]-12. The ethylene interpolymer product as described in [III]-1 further comprising from 0.001 to about 10 mole percent of one or more α-olefin.

[III]-13. The ethylene interpolymer product as described in [III]-11; wherein said one or more α-olefin are $C_3$ to $C_{10}$ α-olefins.

[III]-14. The ethylene interpolymer product as described in [III]-12; wherein said one or more α-olefin is 1-hexene, 1-octene or a mixture of 1-hexene and 1-octene.

One embodiment of this disclosure, hereinafter embodiment [IV], relates to a method to determine $NCID_i$, as fully described immediately below.

[IV]-1. A method to determine the Non-Comonomer Index Distribution, $NCID_i$, of an ethylene interpolymer product, comprising:
   a) placing from about 150 to about 300 mg of said ethylene interpolymer product into a sample dissolution vessel of a Polymer Char Crystaf-TREF unit;
   b) dissolving said ethylene interpolymer product by adding 35 mL of solvent to said dissolution vessel, heating said vessel to 140° C., then stirring for about 2 to about 3 hours to form a polymer solution; wherein said solvent is 1,2,4-trichlorobenzene containing 250 ppm of 2,6-di-tert-butyl-4-methylphenol;
   c) transferring said polymer solution to a TREF column and equilibrating said TREF column at 110° C. for about 20 to about 45 minutes;
   d) cooling said polymer solution by reducing the temperature of said TREF column to 30° C., employing a cooling rate of 0.2° C./minute, to form a crystallized ethylene interpolymer product and equilibrating said TREF column at 30° C. for 90 minutes;
   e) heating said TREF column to a first dissolution temperature, employing a heating rate of 1.0° C./min, and maintaining said TREF column at said first dissolution temperature for at least 50 minutes;
   f) eluting a first TREF fraction from said TREF column using said solvent flowing at 1 mL/minute;
   g) transferring said first TREF fraction through a heated transfer line into a Size Exclusion Chromatography (SEC) unit operating at 140° C. to produce an SEC effluent; wherein said heated transfer line is maintained at 140° C.;
   h) passing said SEC effluent through a SEC detection system; wherein said SEC detection system includes a differential refractive index detector (DRI) to determine a polymer concentration; a dual-angle (15° and 90°) light scattering detector to determine a viscosity average molecular weight, $M_v^f$; and, a differential viscometer to determine an intrinsic viscosity, $[\eta]^f$, of said first TREF fraction; wherein superscript f represents the $f^{th}$ TREF fraction, where f=1 for said first TREF fraction;
   i) calculating a Non-Comonomer Index, $NCI^f$, of said first TREF fraction according to Eq. (4);

$$NCI^f = \frac{1000000([\eta]^f/(M_v^f)^{0.725})}{(391.98 - Ax(B \times T^f + C)} \qquad \text{Eq. (4)}$$

wherein, A, B and C are constants that depend on the α-olefin comonomer in said ethylene interpolymer and $T^f$ is a weight average TREF elution temperature of said first TREF fraction calculated based on the re-constructed analytical TREF profile of said ethylene interpolymer product;
   j) incrementally increasing the temperature of said TREF column and repeat steps (e) through (i), such that said ethylene interpolymer is fractionated into at least 5 TREF fractions to less than 21 TREF fractions;
   k) calculating said Non-Comonomer Index Distribution ($NCID_i$) of said ethylene interpolymer according to Eq. (5)

$$NCID_i = \Sigma_1^f (wt.fr.)^f (w_i \log(M_i))^f \times NCI^f \qquad \text{Eq. (5)}$$

wherein $(wt.fr.)^f$ represents the weight fraction of the $f^{th}$ TREF fraction and $(w_i \log(M_i))^f$ represents the weight fraction of the $f^{th}$ TREF fraction having molar mass $M_i$ and superscript f represents the TREF fraction number.

[IV]-2. The method as described in [IV]-1; wherein said Polymer Char Crystaf-TREF unit was programmed and controlled with Polymer Char TREF software having step-elution capability.

[IV]-3. The method as described in [IV]-1; wherein said Size Exclusion Chromatography (SEC) unit comprised a PL 220 high-temperature chromatography unit equipped with either four Shodex columns (HT803, HT804, HT805 and HT806), or four PL Mixed ALS or BLS columns; and SEC data was acquired and processed using Cirrus GPC software and Excel spreadsheet to calculate said absolute molar mass and said intrinsic viscosity.

[IV]-4. The method as described in [IV]-1, wherein said constant A is 2.1626, said constant B is −0.6737 and said C is 63.6727, when the α-olefin is 1-octene.

An additional embodiment of this disclosure, hereinafter embodiment [V], relates to the manufacture an ethylene interpolymer product having intermediate branching, as fully described immediately below.

[V]-1. A continuous solution polymerization process wherein an ethylene interpolymer product is produced, wherein said ethylene interpolymer product is characterized as having an intermediate branching, wherein said intermediate branching is characterized by a Non-Comonomer Index Distribution, $NCID_i$, comprising:
   a) injecting ethylene, a process solvent, a first catalyst formulation, one or more α-olefins and optionally hydrogen into a first reactor to produce a first exit stream containing a first ethylene interpolymer in said process solvent;
   b) passing said first exit stream into a second reactor and injecting into said second reactor, ethylene, said process solvent, an intermediate branching catalyst formulation, one or more α-olefins and optionally hydrogen to produce a second exit stream containing a second ethylene interpolymer and said first ethylene interpolymer in said process solvent;
   c) optionally adding a catalyst deactivator A to said second exit stream, downstream of said second reactor, forming a deactivated solution A;

d) passing said second exit stream, or optionally said deactivated solution A, into a third reactor and optionally injecting into said third reactor, ethylene, process solvent, one or more α-olefins, hydrogen and a third catalyst formulation to produce a third exit stream containing an optional third ethylene interpolymer, said second ethylene interpolymer and said first ethylene interpolymer in said process solvent;

e) adding a catalyst deactivator B to said third exit stream, downstream of said third reactor, forming a deactivated solution B; with the proviso that e) is skipped if said catalyst deactivator A was added in c);

optionally, b) through e) are skipped and replaced with f) through j), with the proviso that if b) through e) are not skipped, e) is followed by k);

f) injecting ethylene, said process solvent, an intermediate branching catalyst formulation, one or more α-olefins and optionally hydrogen into a second reactor to produce a second exit stream containing a second ethylene interpolymer in said process solvent;

g) combining said first and said second exit streams, downstream of said second reactor, to form a third exit stream;

h) optionally adding a catalyst deactivator A to said third exit stream forming a deactivated solution A;

i) passing said third exit stream into a third reactor and optionally injecting into said third reactor, ethylene, said process solvent, one or more α-olefins, hydrogen and a third catalyst formulation to produce a fourth exit stream containing an optional third ethylene interpolymer, said second ethylene interpolymer and said first ethylene interpolymer in said process solvent;

j) adding a catalyst deactivator B to said fourth exit stream, downstream of said third reactor, forming a deactivated solution B; with the proviso that j) is skipped if said catalyst deactivator A was added in h);

k) adding a passivator to said deactivated solution A or said deactivated solution B to form a passivated solution;

l) phase separating said passivated solution to recover said ethylene interpolymer product;

wherein said ethylene interpolymer product is characterized by said Non-Comonomer Index Distribution, $NCID_i$, having a value characterized by Eq. (1a) and Eq. (1b);

wherein, $M_o$ is a peak molecular weight that characterizes a molecular weight distribution of said second ethylene interpolymer when fit to a log normal distribution;

wherein a first derivative of said $NCID_i$, $$\frac{dNCID_i}{d\log M_i},$$

Eq. (2), has a value of $\leq -0.0001$, coefficients $\beta_0$, $\beta_1$, $\beta_2$ and $\beta_3$ are generated by fitting said $NCID_i$ of said second ethylene interpolymer to a third order polynomial, Eq. (3), wherein said $NCID_i$ may be experimentally measured or computer simulated.

[V]-2. The process as described in [V]-1, wherein said first catalyst formulation is an unbridged single site catalyst formulation; wherein said ethylene interpolymer product is further characterized by a dimensionless Long Chain Branching Factor, LCBF, having a value <0.001.

[V]-3. The process as described in [V]-1, wherein said first catalyst formulation is a bridged metallocene catalyst formulation; wherein said ethylene interpolymer product is further characterized by a dimensionless Long Chain Branching Factor, LCBF, having a value ≥0.001.

[V]-4. The process as described in [V]-1, wherein said first catalyst formulation is said intermediate branching catalyst formulation, or a second intermediate branching formulation, or a Ziegler-Natta catalyst formulation.

[V]-5. The process as described in [V]-1, wherein said third catalyst formulation is one or more of: an unbridged single site catalyst formulation; a bridged metallocene catalyst formulation; said intermediate branching catalyst formulation; a second intermediate branching catalyst formulation; a Ziegler-Natta catalyst formulation.

[V]-6. The process as described in [V]-1, wherein said ethylene, said one or more α-olefin, said hydrogen and said first catalyst formulation are not injected into said first reactor and said first ethylene interpolymer is not formed; optionally, said process solvent is not injected into said first reactor.

[V]-7. The process as described in [V]-1, wherein said intermediate branching catalyst formulation is an in-line intermediate branching catalyst formulation formed in an in-line process comprising:

a) forming a first product mixture in a first heterogeneous catalyst assembly by combining a stream S1 and a stream S2 and allowing said first product mixture to equilibrate for a HUT-1 seconds; wherein said stream S1 comprises a magnesium compound and an aluminum alkyl in said process solvent and said stream S2 comprises a chloride compound in said process solvent;

b) forming a second product mixture in said first heterogeneous catalyst assembly by combining said first product mixture with a stream S3 and allowing said second product mixture to equilibrate for a HUT-2 seconds; wherein said stream S3 comprises a metal compound in said process solvent;

c) forming said in-line intermediate branching catalyst formulation in said first heterogeneous catalyst assembly by combining said second product mixture with a stream S4 and allowing said in-line intermediate branching catalyst formulation to equilibrate for a HUT-3 seconds prior to injection into said second reactor and optional injection into said third reactor, wherein said stream S4 comprises an alkyl aluminum co-catalyst in said process solvent;

d) optionally, c) is skipped and said in-line intermediate branching catalyst formulation is formed inside said second reactor and optionally inside said third reactor; wherein said second product mixture is equilibrated for an additional HUT-3 seconds and injected into said second reactor and optionally into said third reactor, and said stream S4 is independently injected into said second reactor and optionally into said third reactor, and;

e) optionally, a second heterogeneous catalyst assembly is employed wherein a) through c) are conducted to form a second in-line intermediate branching catalyst formulation that is injected into said third reactor; optionally said second in-line intermediate branching catalyst formulation is formed inside said third reactor according to d);
wherein said HUT-1 is from about 5 seconds to about 70 seconds, said HUT-2 is from about 2 seconds to about 50 seconds and said HUT-3 is from about 0.5 to about 15 seconds.

[V]-8. The process as described in [V]-7, wherein;
 a) said magnesium compound is defined by the formula $Mg(R^1)_2$, wherein the $R^1$ groups may be the same or different;
 b) said aluminum alkyl is defined by the formula $Al(R^3)_3$, wherein the $R^3$ groups may be the same or different;
 c) said chloride compound is defined by the formula $R^2Cl$;
 d) said metal compound is defined by the formulas $M(X)_n$ or $MO(X)_n$, wherein M represents titanium, zirconium, hafnium, vanadium, niobium, tantalum, chromium, molybdenum, tungsten, manganese, technetium, rhenium, iron, ruthenium, osmium or mixtures thereof, O represents oxygen, X represents a halogen atom and n is an integer that satisfies the oxidation state of the metal M, and;
 e) said alkyl aluminum co-catalyst is defined by the formula $Al(R^4)_p(OR^5)_q(X)_r$, wherein the $R^4$ groups may be the same or different, the $OR^5$ groups may be the same or different and $(p+q+r)=3$, with the proviso that p is greater than 0;
wherein $R^1$, $R^2$, $R^3$, $R^4$ and $R^5$ represent hydrocarbyl groups having from 1 to 10 carbon atoms; optionally $R^2$ may be a hydrogen atom.

[V]-9. The process as described in [V]-7, wherein; a molar ratio of said aluminum alkyl to said magnesium compound in said second and optionally said third reactor is from about 3.0:1 to about 70:1; a molar ratio of said chloride compound to said magnesium compound in said second and optionally said third reactor is from about 1.0:1 to about 4.0:1; a molar ratio of said alkyl aluminum co-catalyst to said metal compound in said second and optionally said third reactor is from about 0:1 to about 10:1, and; a molar ratio of said aluminum alkyl to said metal compound in said second and optionally said third reactor is from about 0.05:1 to about 2:1.

[V]-10. The process as described in [V]-1, wherein said intermediate branching catalyst formulation is a batch intermediate branching catalyst formulation; wherein said batch intermediate branching catalyst formulation is formed within said second reactor by injecting a stream S5 and a stream S4 into said second reactor, wherein said stream S4 comprises an alkyl aluminum co-catalyst in said process solvent and said stream S5 comprises a batch intermediate branching procatalyst in said process solvent; optionally said batch intermediate branching catalyst formulation is employed in said third reactor by independently injecting said stream S5 and said stream S4 into said third reactor.

[V]-11. The process as described in [V]-10, wherein said alkyl aluminum co-catalyst is defined by the formula $Al(R^4)_p(OR^5)_q(X)_r$, wherein the $R^4$ groups may be the same or different, the $OR^5$ groups may be the same or different and $(p+q+r)=3$, with the proviso that p is greater than 0; wherein $R^4$ and $R^5$ represent hydrocarbyl groups having from 1 to 10 carbon atoms.

[V]-12. The process as described in [V]-10; wherein said batch intermediate branching procatalyst comprises:
 a) a magnesium compound defined by the formula $Mg(R^1)_2$, wherein $R^1$ may be the same or different;
 b) a chloride compound defined by the formula $R^2Cl$;
 c) optionally an aluminum alkyl halide defined by the formula $(R^6)_vAlX_{3-v}$; wherein the $R^6$ groups may be the same or different, X represents a halogen atom, and v is 1 or 2;
 d) a metal compound defined by the formulas $M(X)_n$ or $MO(X)_n$, wherein M represents titanium, zirconium, hafnium, vanadium, niobium, tantalum, chromium, molybdenum, tungsten, manganese, technetium, rhenium, iron, ruthenium, osmium or mixtures thereof, O represents oxygen, X represents a halogen atom and n is an integer that satisfies the oxidation state of the metal M;
wherein $R^1$, $R^2$ and $R^6$ represent hydrocarbyl groups having from 1 to 10 carbon atoms; optionally $R^2$ may be a hydrogen atom.

[V]-13. The process as described in [V]-12 wherein a molar ratio of said chloride compound to said magnesium compound in said batch intermediate branching procatalyst is from about 2:1 to about 3:1; wherein a molar ratio of said magnesium compound to said metal compound in said procatalyst is from 5:1 to about 10:1; wherein a molar ratio of said aluminum alkyl halide to said magnesium compound in said procatalyst is from about 0:1 to about 0.5:1, and; wherein a molar ratio of said alkyl aluminum co-catalyst to said metal compound in said procatalyst is from about 0.5:1 to about 10:1.

Embodiments of this disclosure include articles of manufacture. Not to be construed as limiting, the ethylene interpolymer products disclosed herein may be converted into manufactured articles comprising a film. Non-limiting examples of processes to manufacture such films include blown film processes, double bubble processes, triple bubble processes, cast film processes, tenter frame processes and machine direction orientation (MDO) processes. An embodiment of this disclosure, hereinafter embodiment [VI], is fully described immediately below.

[VI]-1. A film comprising at least one layer comprising an ethylene interpolymer product comprising at least one ethylene interpolymer, wherein said ethylene interpolymer is characterized by an intermediate branching, wherein said intermediate branching is characterized by a Non-Comonomer Index Distribution, $NCID_i$, having a value characterized by Eq. (1a) and Eq. (1b), wherein, $M_o$ is a peak molecular weight that characterizes a molecular weight distribution of said ethylene interpolymer when fit to a log normal distribution; wherein a first derivative of said $NCID_i$, $$\frac{dNCID_i}{d\log M_i},$$

Eq. (2), has a value of $\leq -0.0001$, coefficients $\beta_0$, $\beta_1$, $\beta_2$ and $\beta_3$ are generated by fitting said $NCID_i$ of said ethylene interpolymer to a third order polynomial, Eq. (3), and wherein said $NCID_i$ may be experimentally measured or computer simulated.

[VI]-2. The film as described in [VI]-1, wherein said ethylene interpolymer is synthesized using an intermediate branching catalyst formulation.

[VI]-3. The film as described in [VI]-2, wherein said intermediate branching catalyst formulation is an in-line intermediate branching catalyst formulation or a batch intermediate catalyst formulation.

[VI]-4. The film as described in [VI]-1, wherein said ethylene interpolymer product comprises a first ethylene interpolymer, a second ethylene interpolymer and optionally a third ethylene interpolymer;
wherein at least one of said first, said second and/or said third ethylene interpolymer is characterized by said $NCID_i$ having a value characterized by Eq. (1a) and Eq. (1b) and said first derivative Eq. (2) has a value −0.0001, wherein said $NCID_i$ may be experimentally measured or computer simulated.

[VI]-5. The film as described in [VI]-4, wherein said first ethylene interpolymer is synthesized with a first heterogeneous catalyst formulation, said second ethylene interpolymer is synthesized with a second heterogeneous catalyst formulation and said optional third ethylene interpolymer is synthesized with a third heterogeneous catalyst formulation; wherein said first, said second and said third heterogeneous catalyst formulations may be the same formulation or different formulations with the proviso that at least one of said first, said second and/or said third heterogeneous catalyst formulations is an intermediate branching catalyst formulation.

[VI]-6. The film as described in [VI]-1, wherein said ethylene interpolymer is further characterized by a dimensionless Long Chain Branching Factor, LCBF, having a value <0.001.

[VI]-7. The film as described in [VI]-1, wherein said ethylene interpolymer product has a melt index from about 0.3 to about 15 dg/minute and a density from about 0.890 to about 0.965 g/cc; wherein melt index is measured according to ASTM D1238 (2.16 kg load and 190° C.) and density is measured according to ASTM D792.

[VI]-8. The film as described in [VI]-1, wherein said ethylene interpolymer product has a $M_w/M_n$ from about 2.2 to about 25 and a $CDBI_{50}$ from about 10% to about 98%.

[VI]-9. The film as described in [VI]-5, wherein:
(i) said first ethylene interpolymer has a melt index from about 0.001 to about 1000 dg/minute, a density from about 0.890 g/cm³ to about 0.965 g/cc and is from about 0 to 60 weight percent of said ethylene interpolymer product;
(ii) said second ethylene interpolymer has melt index from about 0.001 to about 1000 dg/minute, a density from about 0.89 g/cm³ to about 0.965 g/cc and is from about 10 to 99 weight percent of said ethylene interpolymer product; and
(iii) optionally said third ethylene interpolymer has a melt index from about 0.1 to about 10000 dg/minute, a density from about 0.890 to about 0.965 g/cc and is from 0 to about 30 weight percent of said ethylene interpolymer product;
wherein melt index is measured according to ASTM D1238 (2.16 kg load and 190° C.), density is measured according to ASTM D792 and weight percent is the weight of said first, said second or said optional third ethylene interpolymer divided by the weight of said ethylene interpolymer product.

[VI]-10. The film as described in [VI]-1, wherein said ethylene interpolymer product is manufactured using a solution polymerization process.

[VI]-11. The film as described in [VI]-1, wherein said ethylene interpolymer product further comprises from 0.001 to about 10 mole percent of one or more α-olefin; wherein said one or more α-olefin are $C_3$ to $C_{10}$ α-olefins.

[VI]-12. The film as described in [VI]-11, wherein said one or more α-olefin is 1-hexene, 1-octene or a mixture of 1-hexene and 1-octene.

[VI]-13. The film as described in [VI]-1, wherein said film is a monolayer film having a dart impact that is from 10% to 110% higher, relative to a comparative monolayer film; wherein said comparative monolayer film contains a comparative ethylene interpolymer that has replaced said ethylene interpolymer;
wherein said comparative ethylene interpolymer does not contain intermediate branching, has a comparative Non-Comonomer Index Distribution ($NCID_i$®) that does not satisfy Eq. (1a) and Eq. (1b), and has a comparative first derivative $$\left(\frac{dNCID_i}{d\log M_i}\right)^c > -0.0001.$$

[VI]-14. The film as described in [VI]-1, wherein said at least one layer further comprises one or more polyolefin.

[VI]-15. The film as described in [VI]-14, wherein said polyolefin is one or more ethylene polymer, one or more propylene polymer or a mixture of said ethylene polymer and said propylene polymer.

[VI]-16. The film as described in [VI]-1, wherein said film has a thickness from 0.5 mil to 10 mil.

[VI]-17. The film as described in [VI]-1, wherein said film comprises from 2 to 11 layers, wherein at least one or more layer comprises said ethylene interpolymer product having intermediate branching.

A further embodiment of this disclosure, hereinafter embodiment [VII], is fully described immediately below.

[VII]-1. A film comprising at least one layer comprising an ethylene interpolymer product comprising:
(i) a first ethylene interpolymer;
(ii) a second ethylene interpolymer, and;
(iii) optionally a third ethylene interpolymer;
wherein said second ethylene interpolymer is characterized by an intermediate branching, wherein said intermediate branching is characterized by a Non-Comonomer Index Distribution, $NCID_i$, having a value characterized by Eq. (1a) and Eq. (1b); wherein, $M_o$ is a peak molecular weight that characterizes a molecular weight distribution of said second ethylene interpolymer when fit to a log normal distribution;
wherein a first derivative of said $NCID_i$, $$\frac{dNCID_i}{d\log M_i},$$

Eq. (2), has a value of ≤−0.0001, coefficients $\beta_0$, $\beta_1$, $\beta_2$ and $\beta_3$ are generated by fitting said $NCID_i$ of said second ethylene interpolymer to a third order polynomial, Eq. (3), and wherein said $NCID_i$ may be experimentally measured or computer simulated.

[VII]-2. The film as described in [VII]-1, wherein said first ethylene interpolymer is synthesized using a homogenous catalyst formulation and said second ethylene interpolymer is synthesized using an intermediate branching catalyst formulation.

[VII]-3. The film as described in [VII]-2, wherein said homogeneous catalyst formulation is an unbridged single site catalyst formulation or a bridged metallocene catalyst formulation and said intermediate branching catalyst formulation is an in-line intermediate branching catalyst formulation or a batch intermediate branching catalyst formulation.

[VII]-4. The film as described in [VII]-1, wherein said ethylene interpolymer product has a melt index from about 0.3 to about 15 dg/minute and a density from about 0.858 to about 0.965 g/cc; wherein melt index is measured according to ASTM D1238 (2.16 kg load and 190° C.) and density is measured according to ASTM D792.

[VII]-5. The film as described in [VII]-1, wherein said ethylene interpolymer product has a $M_w/M_n$ from about 2 to about 25 and a $CDBI_{50}$ from about 10% to about 98%.

[VII]-6. The film as described in [VII]-1 wherein;
(i) said first ethylene interpolymer has a melt index from about 0.001 to about 1000 dg/minute, a density from about 0.855 g/cm$^3$ to about 0.975 g/cc and is from about 0 to 60 weight percent of said ethylene interpolymer product;
(ii) said second ethylene interpolymer has melt index from about 0.001 to about 1000 dg/minute, a density from about 0.89 g/cm$^3$ to about 0.965 g/cc and is from about 10 to 99 weight percent of said ethylene interpolymer product
(iii) said third ethylene interpolymer has a melt index from about 0.1 to about 10000 dg/minute, a density from about 0.855 to about 0.975 g/cc and is from 0 to about 30 weight percent of said ethylene interpolymer product
wherein melt index is measured according to ASTM D1238 (2.16 kg load and 190° C.), density is measured according to ASTM D792 and weight percent is the weight of said first, said second or said optional third ethylene interpolymer divided by the weight of said ethylene interpolymer product.

[VII]-7. The film as described in [VII]-1, wherein said ethylene interpolymer product is manufactured using a solution polymerization process.

[VII]-8. The film as described in [VII]-1, wherein said ethylene interpolymer product further comprises from 0.001 to about 10 mole percent of one or more α-olefin; wherein said one or more α-olefin are $C_3$ to $C_{10}$ α-olefins.

[VII]-9. The film as described in [VII]-8, wherein said one or more α-olefin is 1-hexene, 1-octene or a mixture of 1-hexene and 1-octene.

[VII]-10. The film as described in [VII]-1, wherein said film is a monolayer film having one or more of the following properties:
a) a dart impact from 10% to 110% higher;
b) a machine direction tensile strength from 10% to 20% higher;
c) a transverse direction tensile strength from 10% to 20% higher;
d) a 45° gloss from 10% to 110% higher;
e) a haze from 10% to 50% lower;
relative to a comparative monolayer film, wherein said comparative monolayer film contains a comparative second ethylene interpolymer that has replaced said second ethylene interpolymer;
wherein said comparative second ethylene interpolymer does not contain intermediate branching, has a comparative first derivative Eq. (2) value >−0.0001.

[VII]-11. The film as described in [VII]-1; wherein said at least one layer further comprises one or more polyolefin.

[VII]-12. The film as described in [VII]-11, wherein said polyolefin is one or more ethylene polymer, one or more propylene polymer or a mixture of said ethylene polymers and said propylene polymers.

[VII]-13. The film as described in [VII]-1, wherein said film has a thickness from 0.5 mil to 10 mil.

[VII]-14. The film as described in [VII]-1, wherein said film comprises from 2 to 11 layers, wherein at least one or more layer comprises said ethylene interpolymer product having intermediate branching.

Not to be construed as limiting, the ethylene interpolymer products disclosed herein may be converted into rigid manufactured articles such as containers, bottle caps, hinged closures, toys, recreational equipment, cable jacketing, tubing, pipe, foamed articles, truck bed liners, pallets and the like. Such rigid manufactured articles may contain one or more layers comprising the ethylene interpolymer products described in embodiments fully described above. Such rigid manufactured articles may be fabricated using processes that are well-known in the art; non-limiting examples include injection molding, compression molding, blow molding, rotomolding, profile extrusion, pipe extrusion, sheet thermoforming and foaming processes employing chemical or physical blowing agents.

DESCRIPTION OF FIGURES

The following Figures are presented for the purpose of illustrating selected features and embodiments of this disclosure; it being understood that the embodiments represented in these figures are not limiting.

for Example 1, Example 4, Component B of Example 5 and Component B of Example 10 illustrating $$\frac{dNCID_i}{d\log M_i} \text{ values} \leq -0.0001;$$

in contrast, the $$\frac{dNCID_i}{d\log M_i}$$

of Comparative 1 was >−0.0001. Note: Note: For a comparison purpose, data plotted in FIG. 6 were horizontally shifted to a same $M_o$ value of 60000, i.e. the $M_o$ value from the component B of Example 10.

Figure 7:
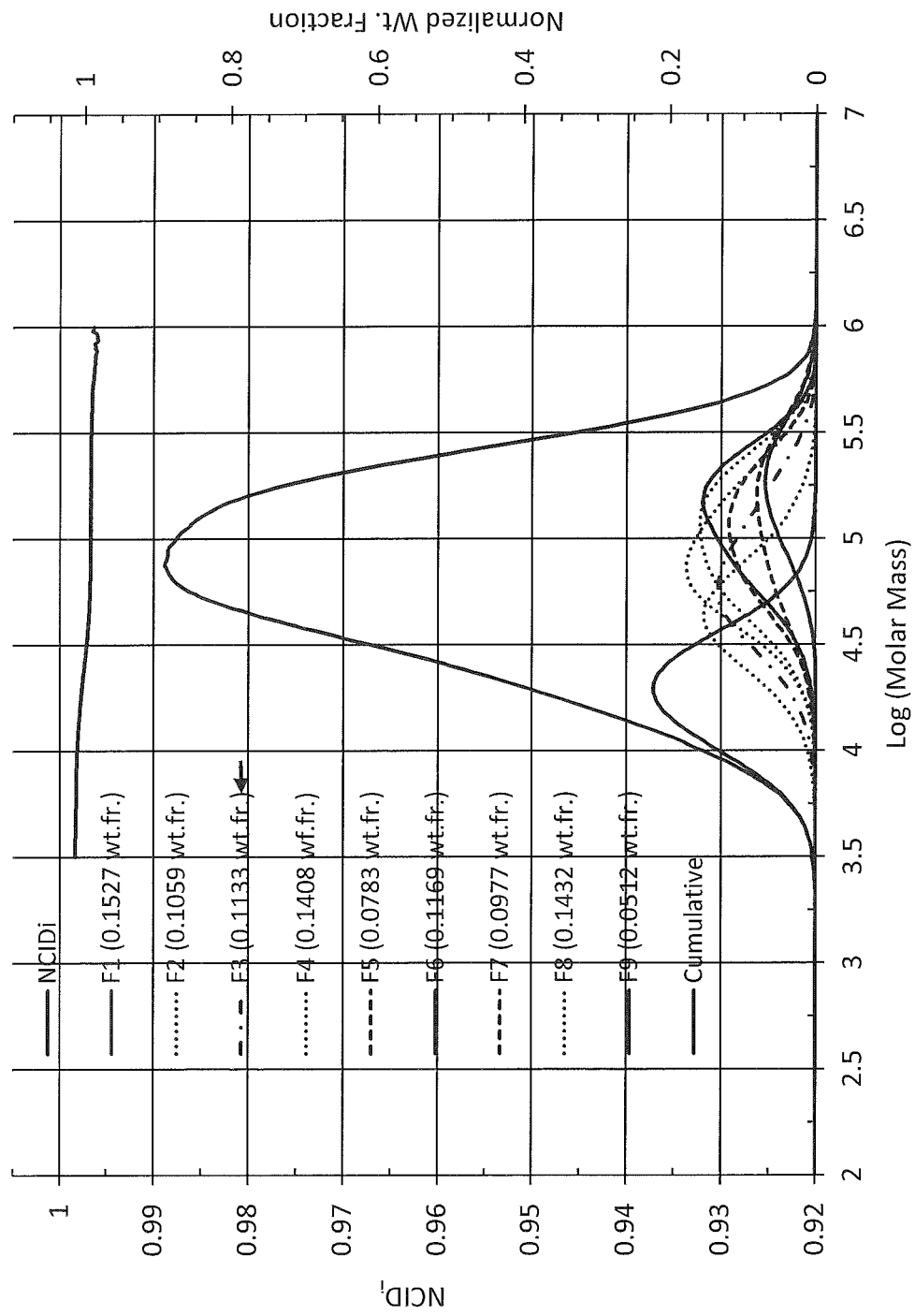

FIG. 7 illustrates the $NCID_i$ of Comparative 3 on the left axis generated from nine TREF fractions (F1 through F9); the right axis shows the normalized weight fraction of each TREF fraction as well as the cumulative weight fraction.

Figure 8:
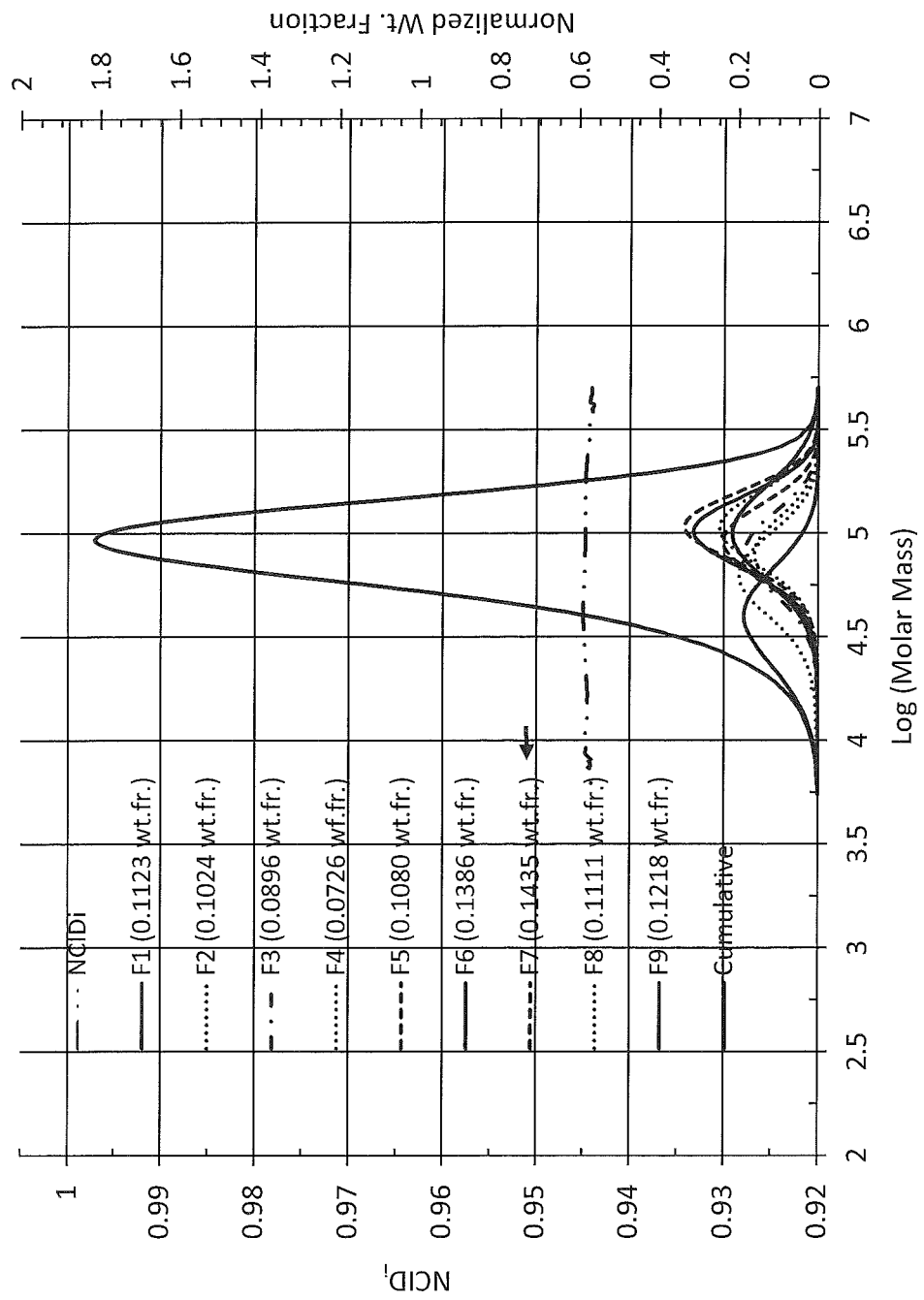

FIG. 8 illustrates the $NCID_i$ of Comparative 4 on the left axis generated from nine TREF fractions (F1 through F9); the right axis shows the normalized weight fraction of each TREF fraction as well as the cumulative weight fraction.

Figure 9:
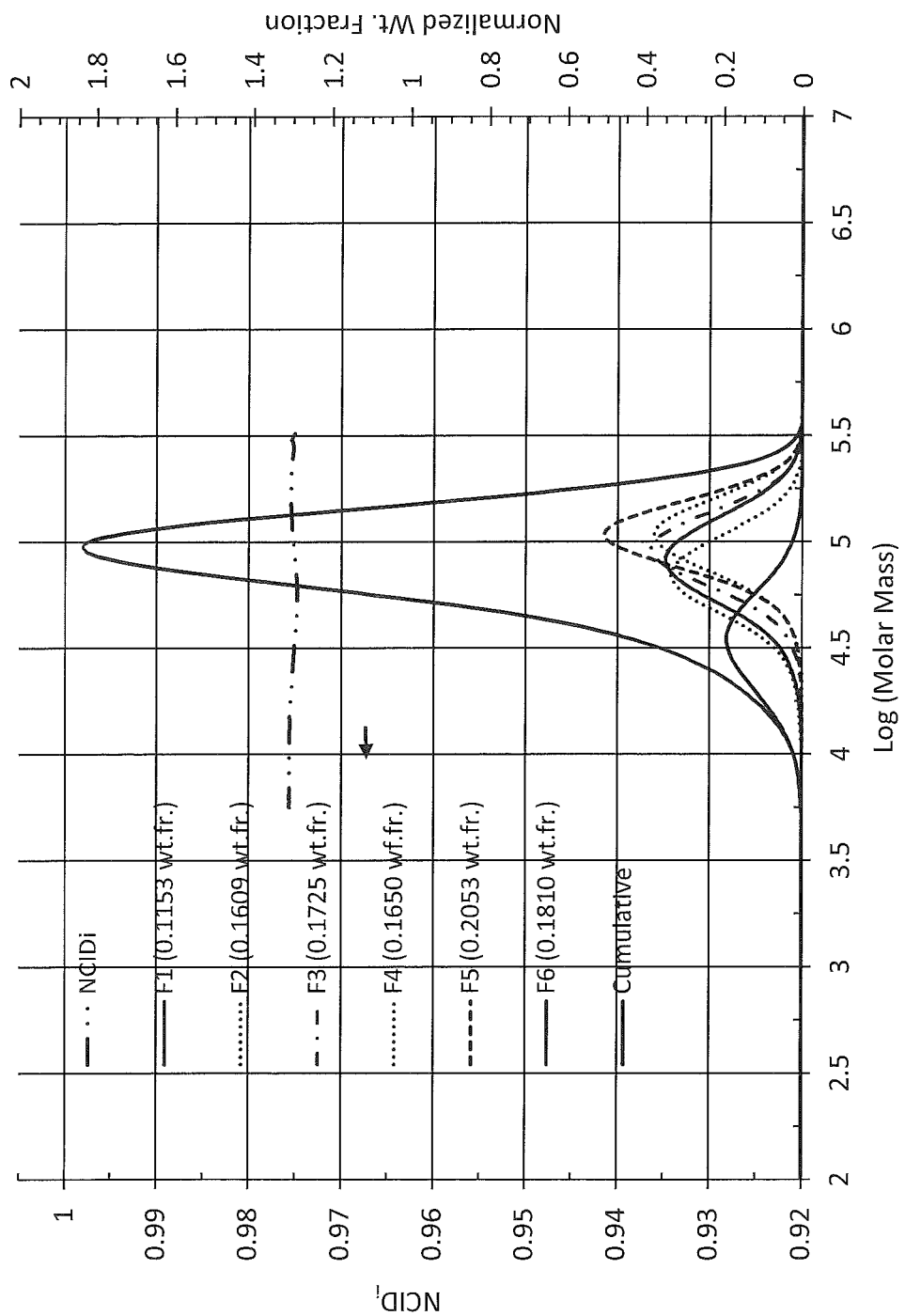

FIG. 9 illustrates the $NCID_i$ of Comparative 5 on the left axis generated from six TREF fractions (F1 through F6); the right axis shows the normalized weight fraction of each TREF fraction as well as the cumulative weight fraction.

Figure 10:
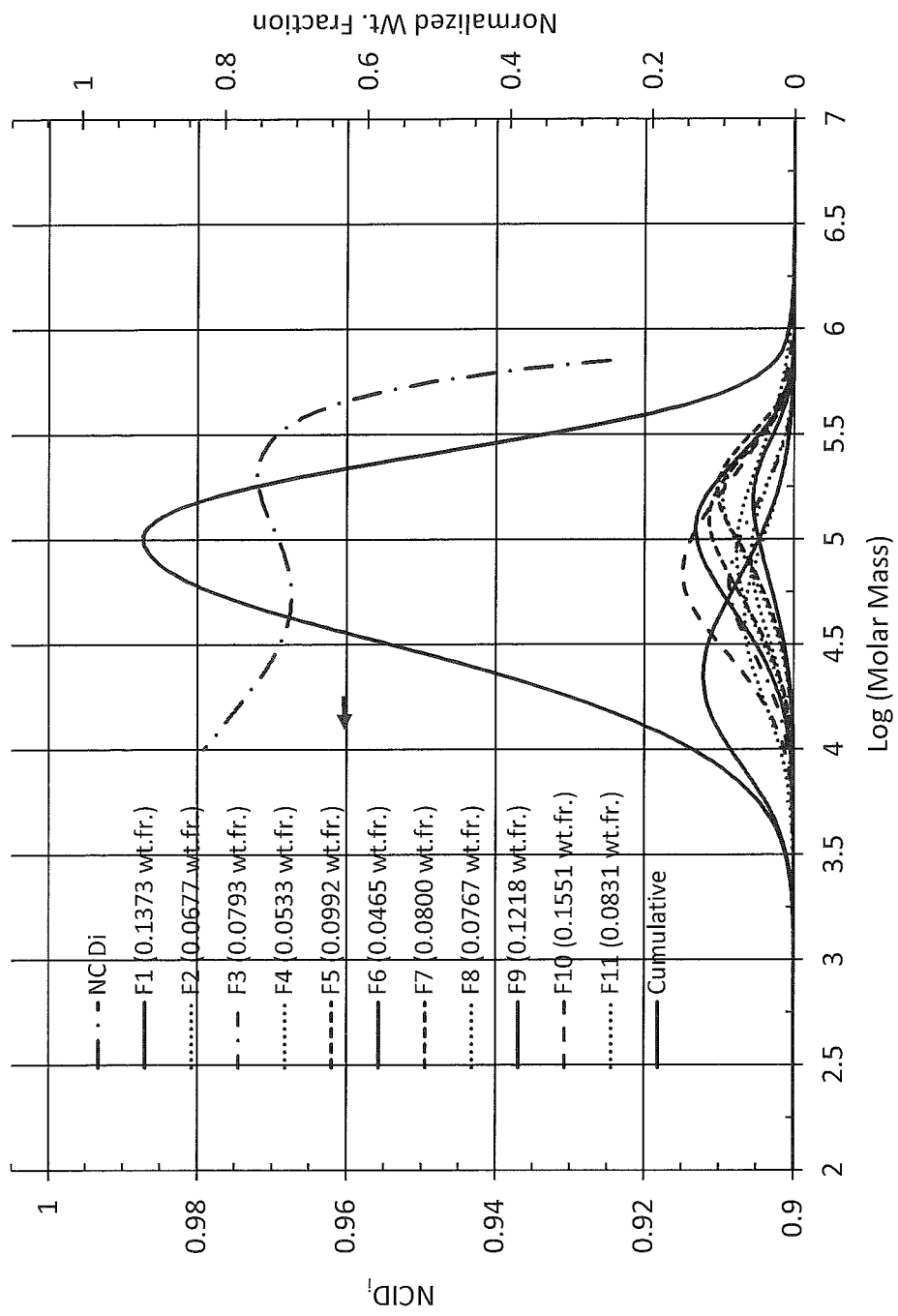

FIG. 10 illustrates the $NCID_i$ of Example 5 on the left axis generated from eleven TREF fractions (F1 through F11); the right axis shows the normalized weight fraction of each TREF fraction as well as the cumulative weight fraction.

Figure 11:
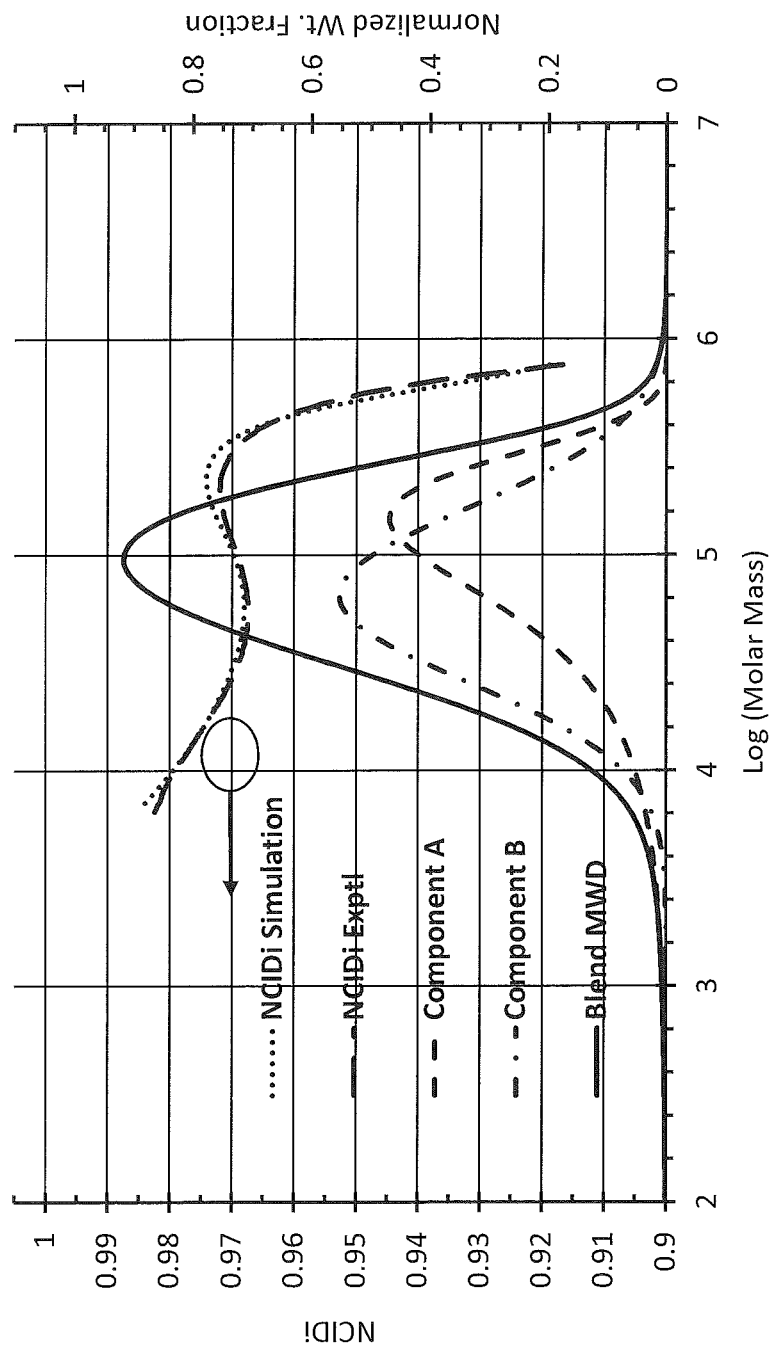

FIG. 11 compares $NCID_i$ values (left axis) of Example 5 ($NCID_i$ Exptl, long dashed curve) with a computer simulated $NCID_i$ ($NCID_i$ Simulation, dotted curve). Simulated Example 5 was a binary blend of: i) 44.0 wt % component A having a constant $NCID_i^A$ of 0.997, $M_r$ was 160000 and (p was 0.850; and ii) 56.0 wt % component B having a $NCID_i^B$ where $\beta_0$, $\beta_1$, $\beta_2$, and $\beta 3$ were 0.97000, −0.00400, 0.00450 and −0.00090, respectively, and $M_o$ was 65000 and $\zeta$ was 0.2620. The molecular weight distributions (right axis) of component A, component B and the combined (overall) were also plotted.

Figure 12:
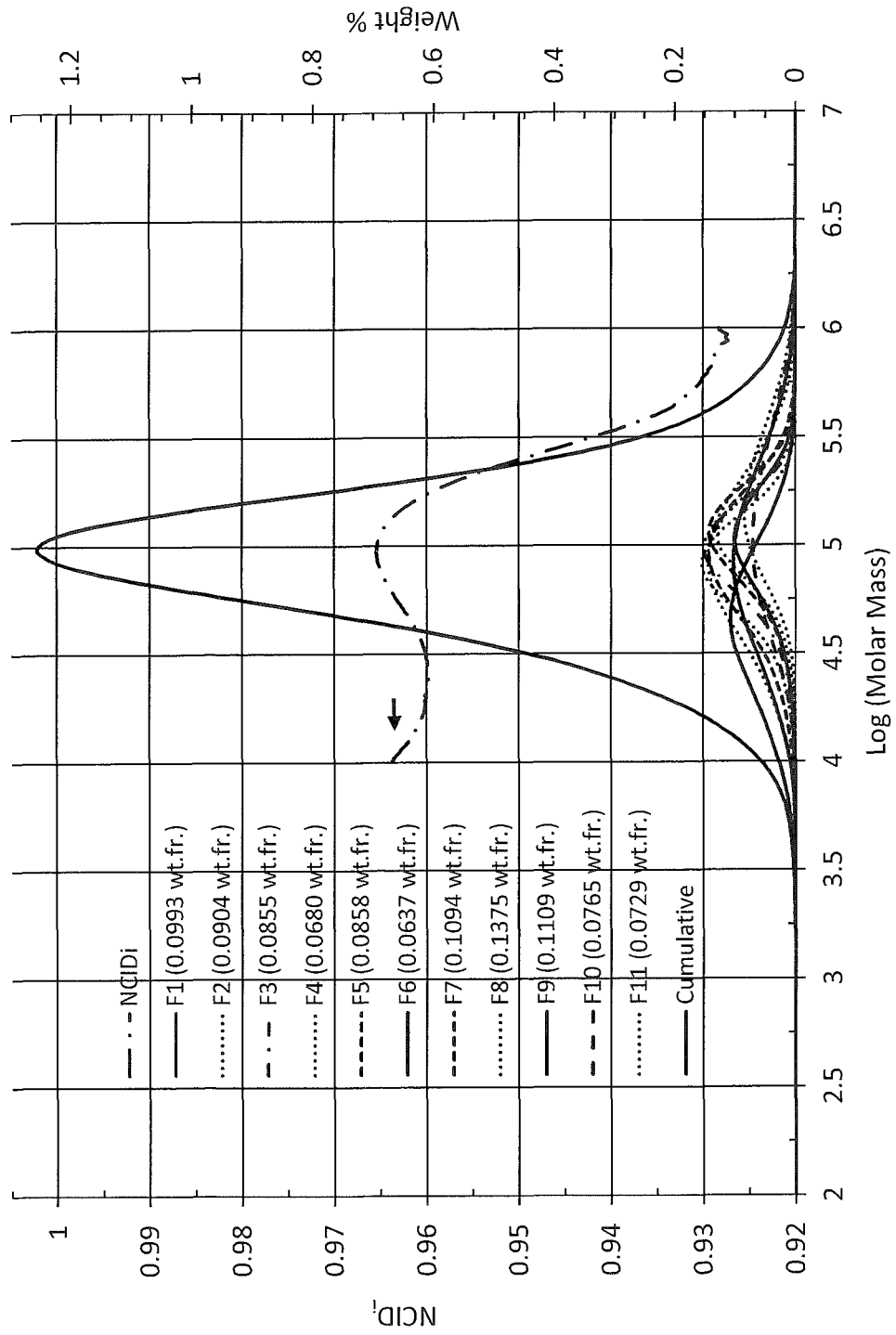

FIG. 12 illustrates the $NCID_i$ of Example 6 on the left axis generated from eleven TREF fractions (F1 through F11); the right axis shows the normalized weight fraction of each TREF fraction as well as the cumulative weight fraction.

Figure 13:
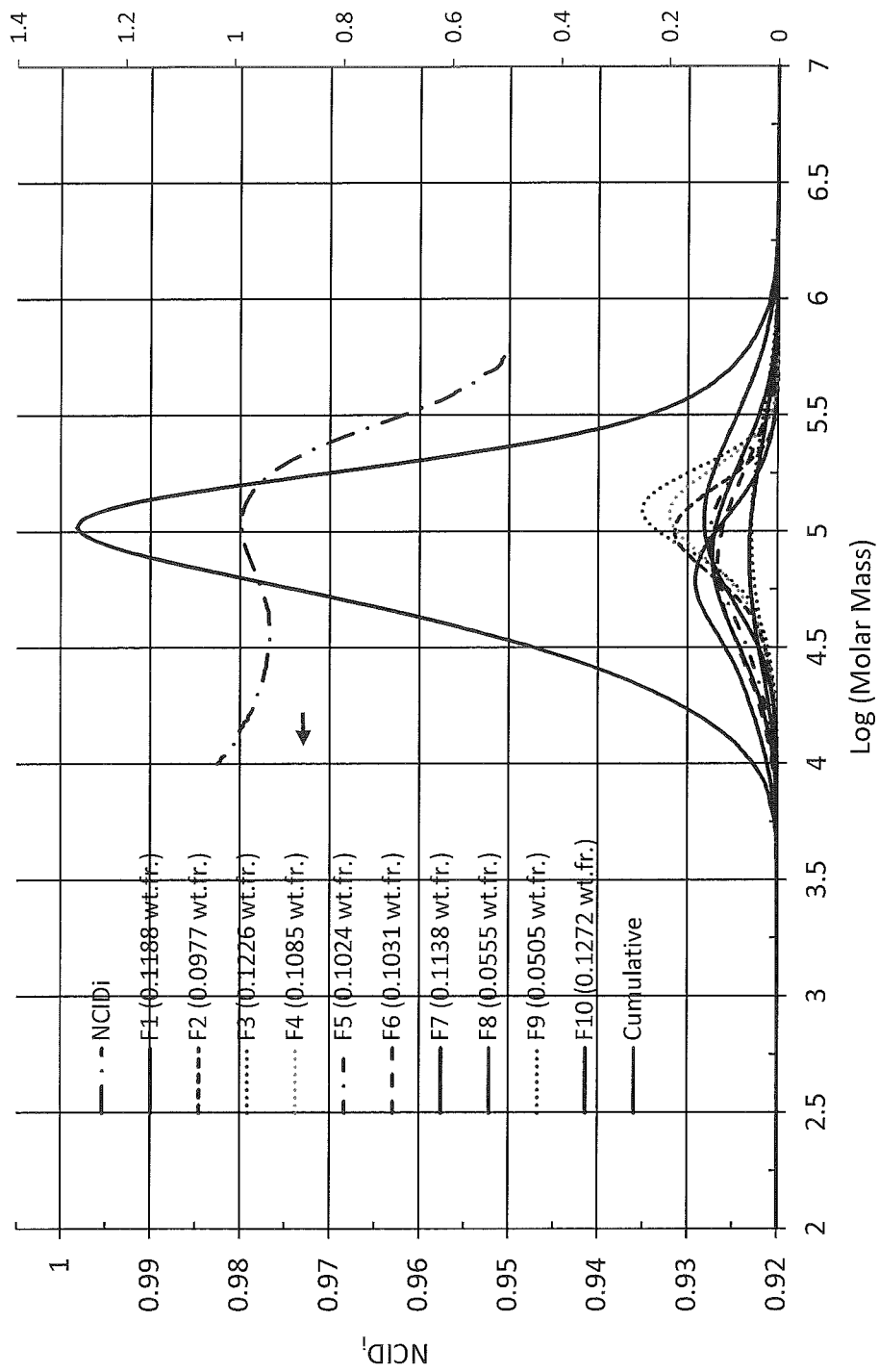

FIG. 13 illustrates the $NCID_i$ of Example 7 on the left axis generated from ten TREF fractions (F1 through F10); the right axis shows the normalized weight fraction of each TREF fraction as well as the cumulative weight fraction.

Figure 14:
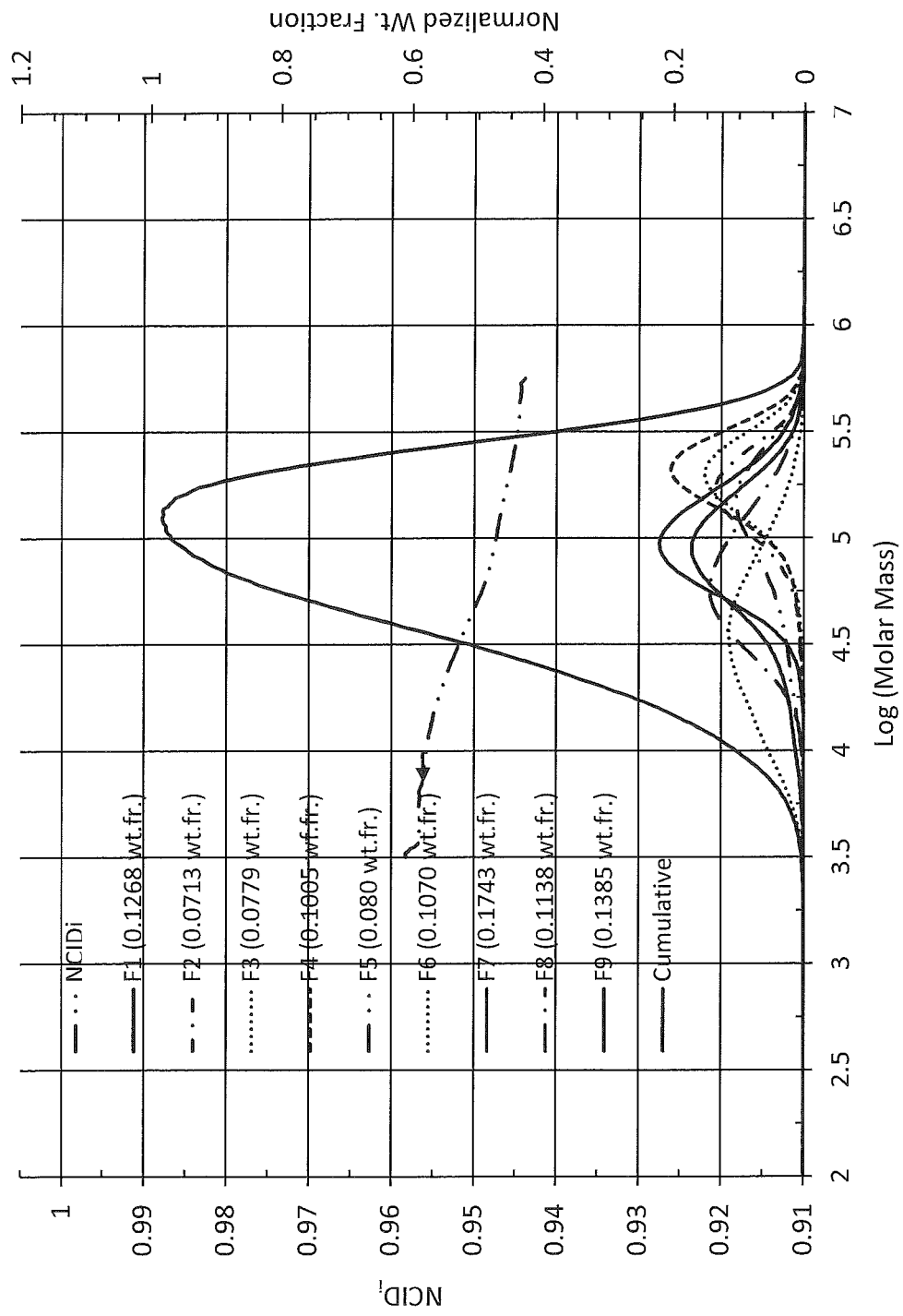

FIG. 14 illustrates the $NCID_i$ of Comparative 6 on the left axis generated from nine TREF fractions (F1 through F9); the right axis shows the normalized weight fraction of each TREF fraction as well as the cumulative weight fraction.

Figure 15:
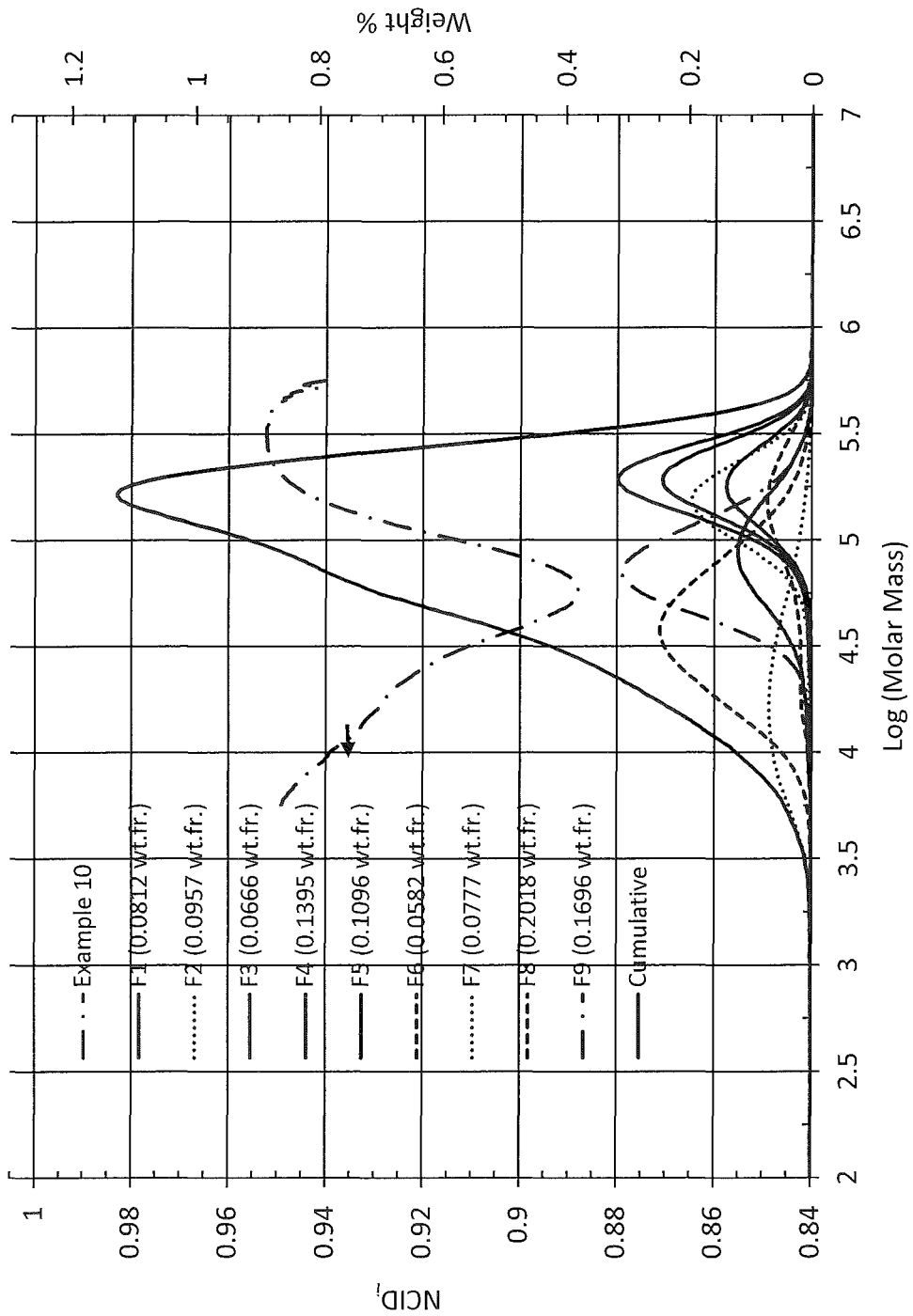

FIG. 15 illustrates the $NCID_i$ of Example 10 on the left axis generated from nine TREF fractions (F1 through F9); the right axis shows the normalized weight fraction of each TREF fraction as well as the cumulative weight fraction.

Figure 16:
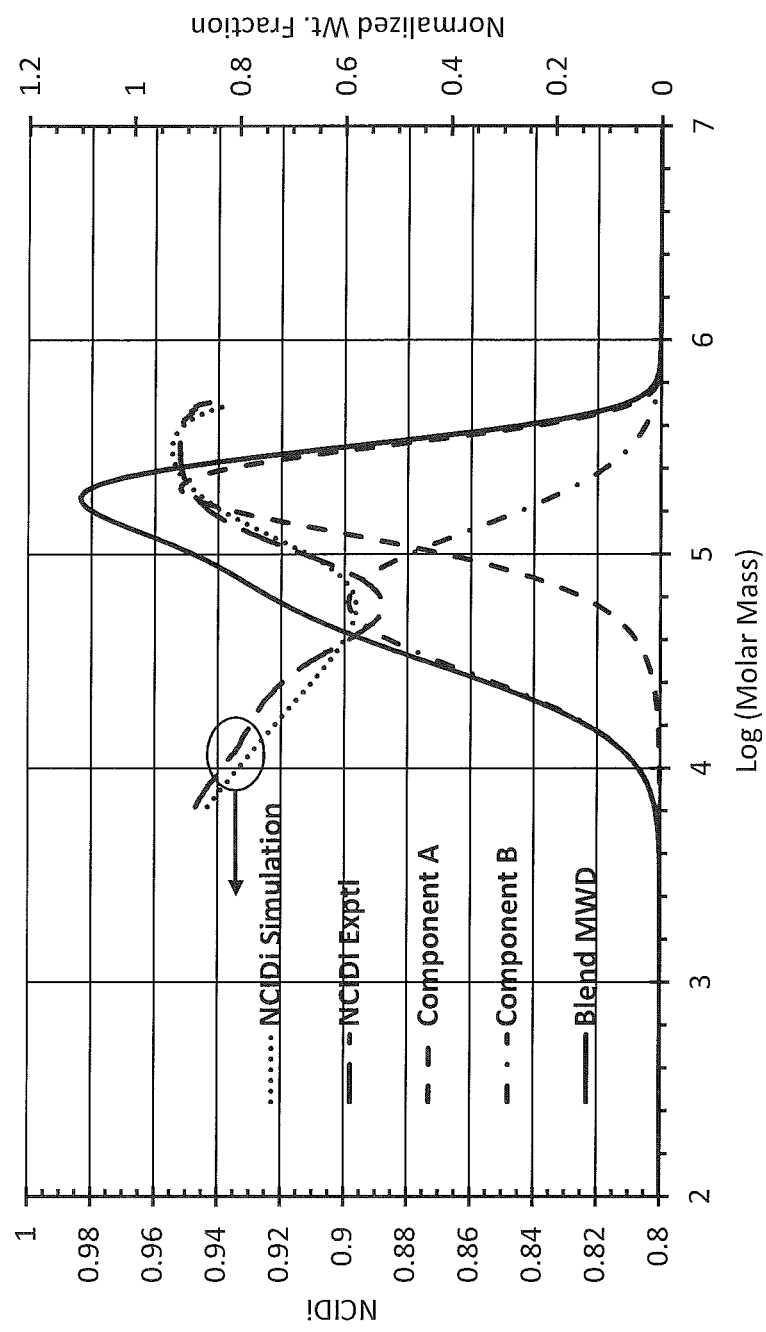

FIG. 16 compares $NCID_i$ values (left axis) of Example 10 ($NCID_i$ Exptl, long dashed curve) with a computer simulated $NCID_i$ ($NCID_i$ Simulation, dotted curve). Simulated Example 10 was a binary blend of: i) 50.0 wt % component A having a constant $NCID_i^A$ of 0.970, $M_r$ of 120000 and φ of 2.600; and ii) 50.0 wt % component B having a $NCID_i^B$ where $\beta_0$, $\beta_1$, $\beta_2$, and $\beta_3$ were 1.0100, −0.0001, 0.0001 and −0.0011, respectively, $M_o$ of 60000 and of 0.2400. The molecular weight distributions of component A, component B and the combined (overall) were also plotted (right axis).

Figure 17:
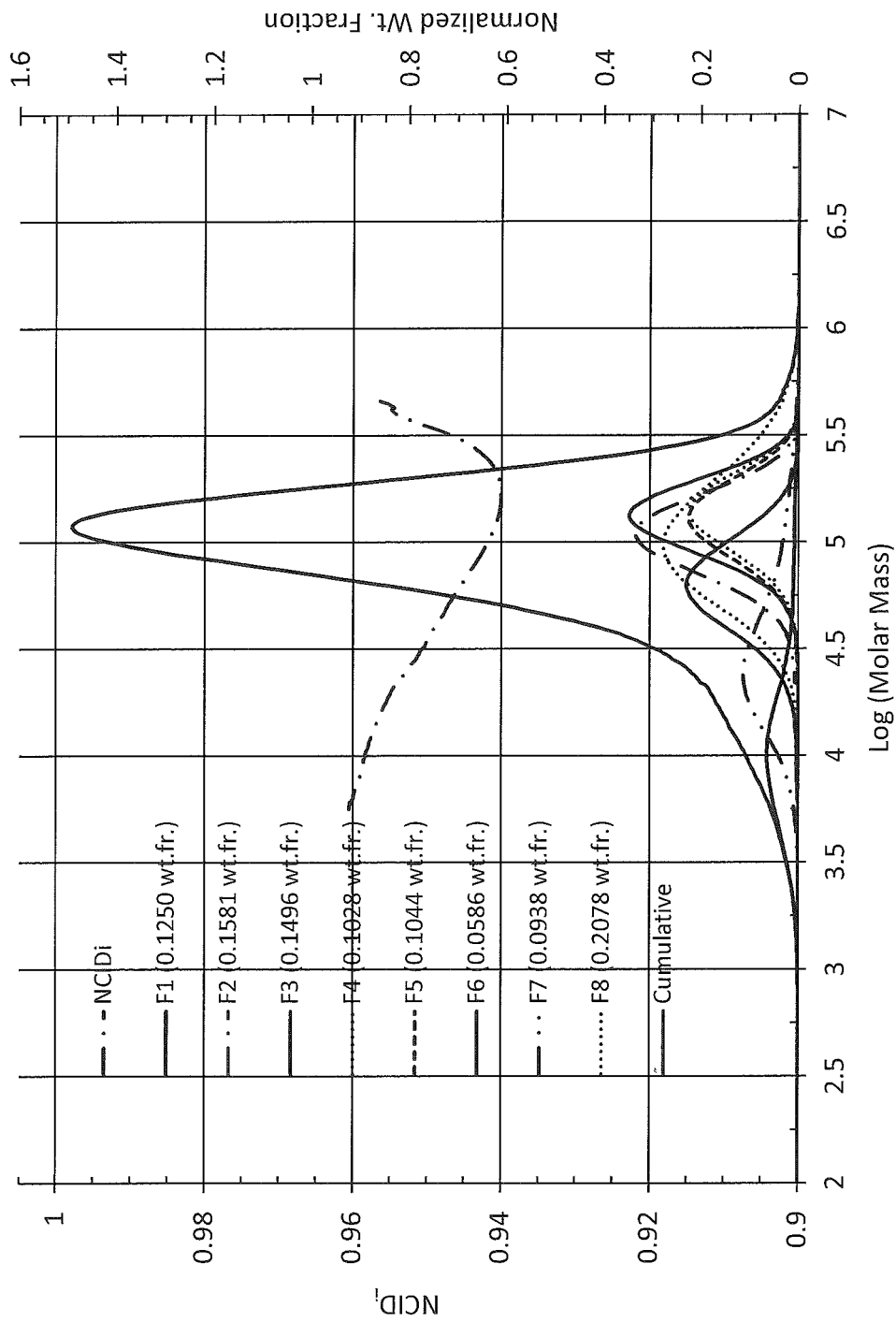

FIG. 17 illustrates the $NCID_i$ of Example 11 on the left axis generated from eight TREF fractions (F1 through F8); the right axis shows the normalized weight fraction of each TREF fraction as well as the cumulative weight fraction.

Figure 18:
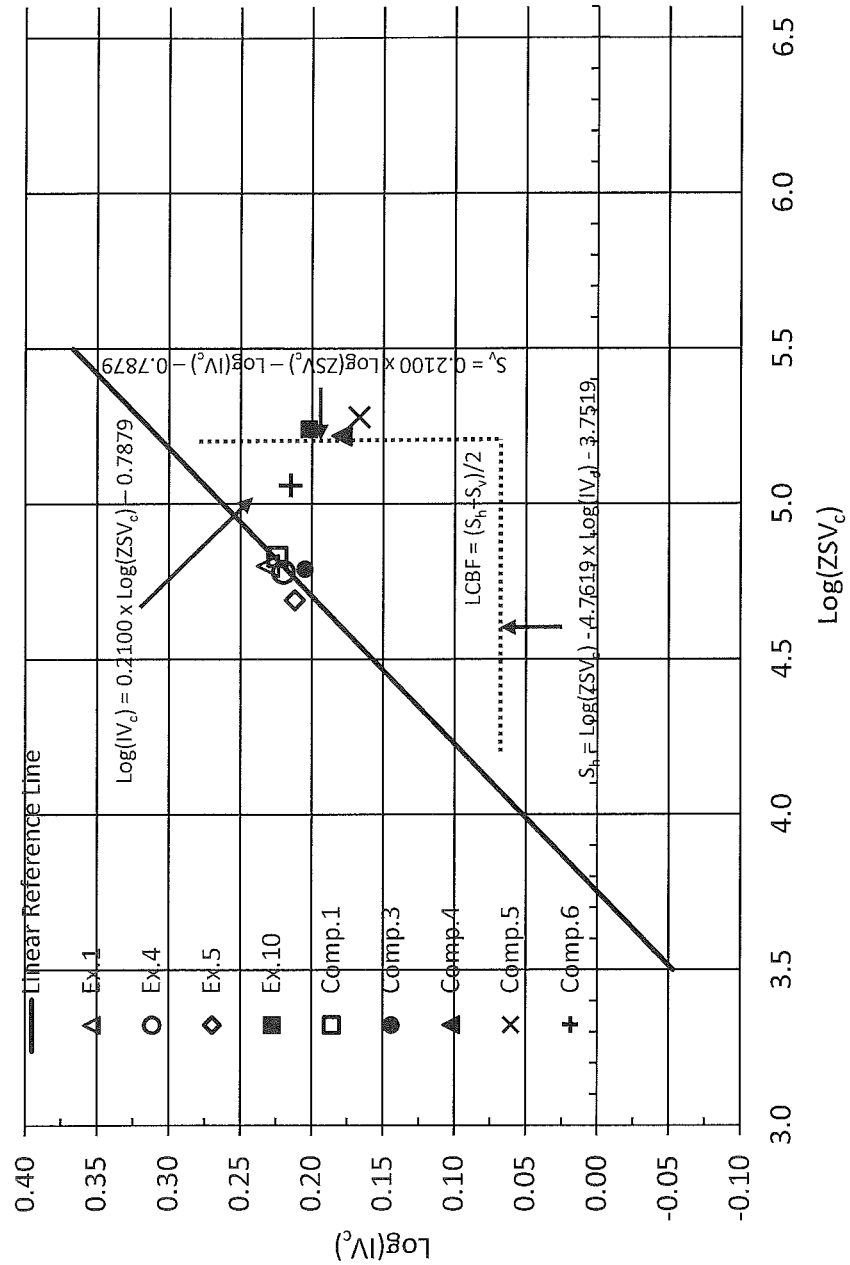

FIG. 18 shows the determination of the Long Chain Branching Factor (LCBF). The abscissa plotted was the log of the corrected Zero Shear Viscosity (log(ZSV$_c$)) and the ordinate plotted was the log of the corrected Intrinsic Viscosity (log(IV$_c$)). Ethylene interpolymer products that do not have LCB, or undetectable LCB, fall on the 'Linear Reference Line'. Ethylene polymers having LCB deviate from the reference line and were characterized by the dimensionless Long Chain Branching Factor (LCBF). LCBF=(S$_h$×S$_v$)/2; where S$_h$ and S$_v$ are horizontal and vertical shift factors, respectively.

Figure 19:
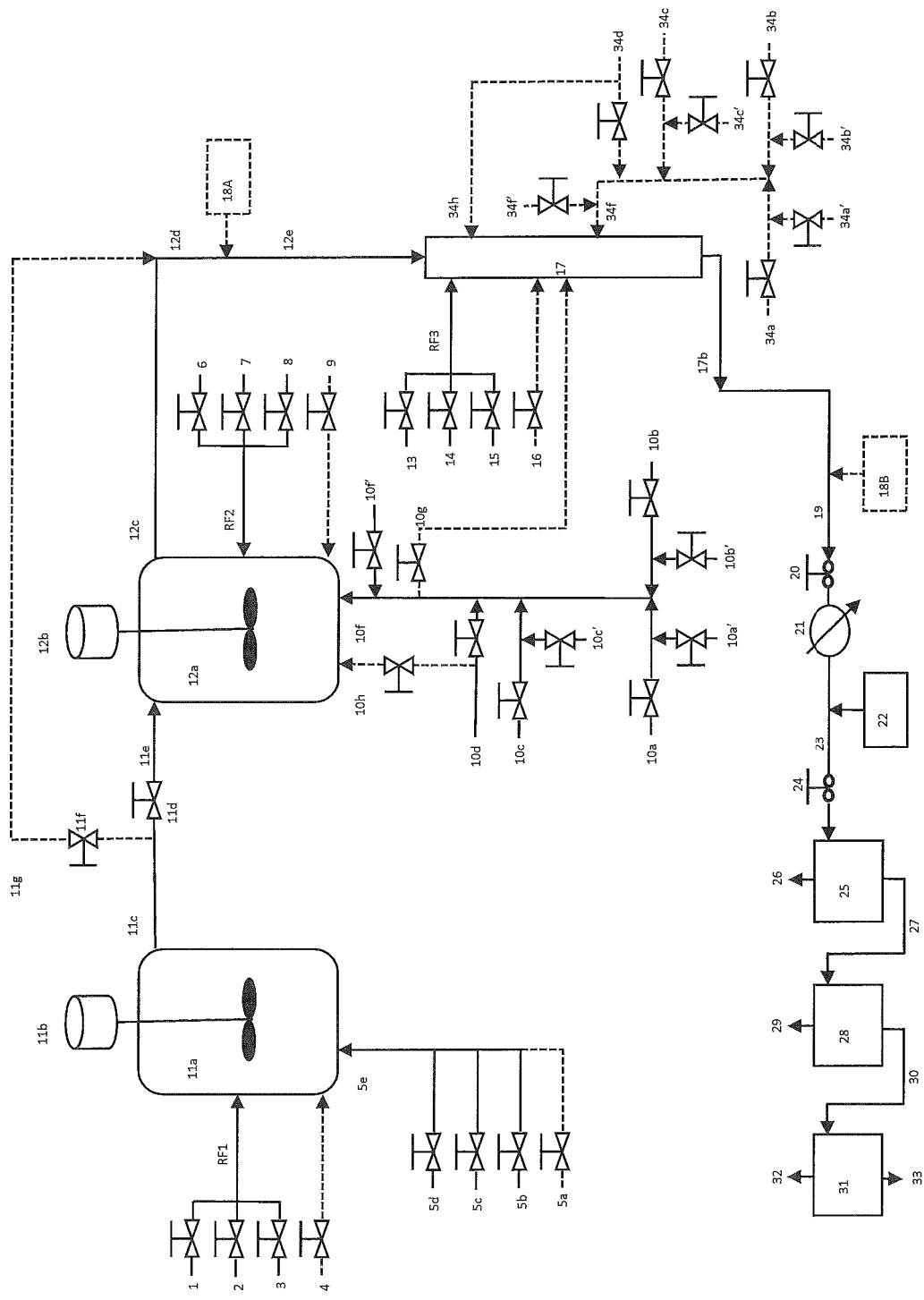

FIG. 19 illustrates non-limiting embodiments of a continuous solution polymerization process employing two continuously stirred reactors (CSTR) wherein an ethylene interpolymer product having intermediate branching may be produced.

Figure 20:
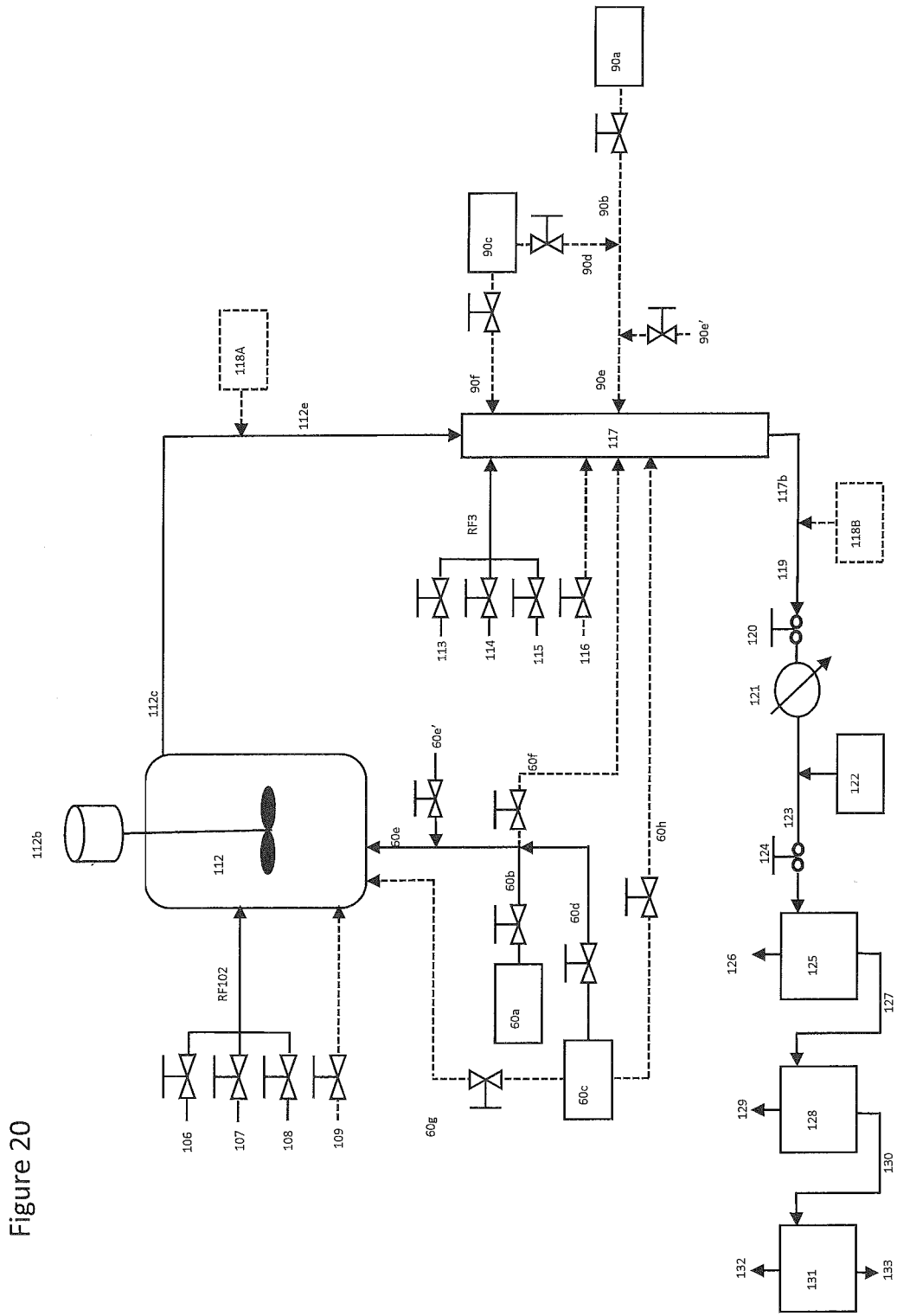

FIG. 20 illustrates non-limiting embodiments of a continuous solution polymerization process employing one continuously stirred reactor (CSTR) wherein an ethylene interpolymer product having intermediate branching may be produced.

DEFINITION OF TERMS

Other than in the examples or where otherwise indicated, all numbers or expressions referring to quantities of ingredients, extrusion conditions, etc., used in the specification and claims are to be understood as modified in all instances by the term "about." Accordingly, unless indicated to the contrary, the numerical parameters set forth in the following specification and attached claims are approximations that can vary depending upon the desired properties that the various embodiments desire to obtain. At the very least, and not as an attempt to limit the application of the doctrine of equivalents to the scope of the claims, each numerical parameter should at least be construed in light of the number of reported significant digits and by applying ordinary rounding techniques. The numerical values set forth in the specific examples are reported as precisely as possible. Any numerical values, however, inherently contain certain errors necessarily resulting from the standard deviation found in their respective testing measurements.

It should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

In order to form a more complete understanding of this disclosure the following terms are defined and should be used with the accompanying figures and the description of the various embodiments throughout.

As used herein, the term "monomer" refers to a small molecule that may chemically react and become chemically bonded with itself or other monomers to form a polymer.

As used herein, the term "α-olefin" is used to describe a monomer having a linear hydrocarbon chain containing from 3 to 20 carbon atoms having a double bond at one end of the chain; an equivalent term is "linear α-olefin".

As used herein, the term "ethylene polymer", refers to macromolecules produced from ethylene and optionally one or more additional monomers; regardless of the specific catalyst or specific process used to make the ethylene polymer. In the polyethylene art, the one or more additional monomers are called "comonomer(s)" and often include α-olefins. The term "homopolymer" refers to a polymer that contains only one type of monomer. Common ethylene polymers include high density polyethylene (HDPE), medium density polyethylene (MDPE), linear low density polyethylene (LLDPE), very low density polyethylene (VLDPE), ultralow density polyethylene (ULDPE), plastomer and elastomers. The term ethylene polymer includes polymers produced in high pressure polymerization processes; non-limiting examples include low density polyethylene (LDPE), ethylene vinyl acetate copolymers (EVA), ethylene alkyl acrylate copolymers, ethylene acrylic acid copolymers and metal salts of ethylene acrylic acid (commonly referred to as ionomers). The term ethylene polymer includes block copolymers which may include 2 to 4 comonomers. The term ethylene polymer includes combinations of, or blends of, the ethylene polymers described in this paragraph.

The term "ethylene interpolymer" refers to a subset of polymers within the "ethylene polymer" group that excludes polymers produced in high pressure polymerization processes; non-limiting examples of polymers produced in high pressure processes include LDPE and EVA.

The term "heterogeneous ethylene interpolymer" refers to a subset of polymers in the ethylene interpolymer group that are produced using heterogeneous catalyst formulations; non-limiting examples of which include well-known Ziegler-Natta or chromium catalyst formulations. This disclosure introduces new heterogeneous ethylene interpolymers, characterized as having intermediate branching and synthesized with an intermediate branching catalyst formulation.

The term "homogeneous ethylene interpolymer" refers to a subset of polymers in the ethylene interpolymer group that are produced using homogeneous catalyst formulations. Typically, homogeneous ethylene interpolymers have narrow molecular weight distributions, for example Size Exclusion Chromatography (SEC) $M_w/M_n$ values of less than 2.8; $M_w$ and $M_n$ refer to weight and number average molecular weights, respectively. In contrast, the $M_w/M_n$ of heterogeneous ethylene interpolymers are typically greater than the $M_w/M_n$ of homogeneous ethylene interpolymers. In general, homogeneous ethylene interpolymers also have a narrow comonomer distribution, i.e. each macromolecule within the molecular weight distribution has similar comonomer content. Frequently, the composition distribution breadth index "CDBI" is used to quantify how the comonomer is distributed within an ethylene interpolymer, as well as to differentiate ethylene interpolymers produced with different catalysts or processes. In this disclosure, "$CDBI_{50}$" is defined as the percent of ethylene interpolymer whose composition is within 50% of the median comonomer composition; this definition is consistent with that described in U.S. Pat. No. 5,206,075 assigned to Exxon Chemical Patents Inc. The $CDBI_{50}$ of an ethylene interpolymer can be calculated from TREF curves (Temperature Rising Elution Fractionation); the TREF method is described in Wild, et al., J. Polym. Sci., Part B, Polym. Phys., Vol. 20 (3), pages 441-455. Typically, the $CDBI_{50}$ of homogeneous ethylene interpolymers are greater than about 70%. In contrast, the $CDBI_{50}$ of α-olefin containing heterogeneous ethylene interpolymers are generally lower than the $CDBI_{50}$ of homogeneous ethylene interpolymers. A blend of two or more homogeneous ethylene interpolymers, that differ in comonomer content, may have a $CDBI_{50}$ less than 70%; in this disclosure such a blend was defined as a homogeneous blend or homogeneous composition. Similarly, a blend of two or more homogeneous ethylene interpolymers, that differ in weight average molecular weight ($M_w$), may have a $M_w/M_n \geq 2.8$; in this disclosure such a blend was defined as a homogeneous blend or homogeneous composition.

In this disclosure, the term "homogeneous ethylene interpolymer" refers to both linear homogeneous ethylene interpolymers and substantially linear homogeneous ethylene interpolymers. In the art, linear homogeneous ethylene interpolymers are generally assumed to have no long chain branches or an undetectable amount of long chain branches; while substantially linear ethylene interpolymers are generally assumed to have greater than about 0.01 to about 3.0 long chain branches per 1000 carbon atoms. A long chain branch is macromolecular in nature, i.e. similar in length to the macromolecule that the long chain branch is attached to. In this disclosure the amount of long chain branching present in an ethylene interpolymer was characterized by the 'Long Chain Branching Factor (LCBF)'. The measurement of LCBF was fully described in this disclosure.

In this disclosure a new class of ethylene interpolymers are disclosed; specifically, ethylene interpolymers having "intermediate branching". Intermediate branching was defined as branching that was longer than the branch length resulting from comonomer incorporation (e.g. $C_4$ or $C_6$ branches resulting from the incorporation of 1-hexene or 1-octene comonomers into a propagating macromolecule, respectively) and shorter than the entanglement molecular weight, $M_e$. $M_e$ is a well-known concept in polymer physics (for example reported to be about 1 kg/mol for polyethylenes, see Fetters et al., Macromolecules 1999, 32, 6847). The amount of intermediate branching in ethylene interpolymers was characterized by the 'Non-Comonomer Index (NCI)', as well as the 'Non-Comonomer Index Distribution ($NCID_i$), which was determined by triple detection cross fractionation chromatography (3D-CFC) analysis, as fully described in this specification.

In this disclosure the term 'ethylene interpolymer product' refers to the final product produced by a polymerization process; wherein the ethylene interpolymer product has intermediate branching, as characterized by the Non-Comonomer Index Distribution ($NCID_i$). The polymerization processes disclosed hereinafter include processes employing one or more polymerization reactor(s). In the case of one reactor employing one intermediate branching catalyst formulation, the final product is an ethylene interpolymer product containing one ethylene interpolymer containing intermediate branching. In the case of two reactors employing the same intermediate branching catalyst formulation, the final product is an ethylene interpolymer product containing two ethylene interpolymers both containing intermediate branching. In the case of two reactors, employing two catalyst formulations where one is an intermediate branching catalyst formulation, the final product is an ethylene interpolymer product containing two ethylene interpolymers; wherein one ethylene interpolymer contains intermediate branching. In the case of a polymerization processes employing three reactors, the ethylene interpolymer product contained a first, second and third ethylene interpolymer; wherein at least one of the first, second or third ethylene interpolymer contained intermediate branching. Intermediate branching was produced by an intermediate branching catalyst formulation(s) disclosed hereinafter.

In this disclosure the term 'component' was also used; the term component applies to an ethylene interpolymer where the molecular weight distribution was defined by a mathematical function; i.e. a 'component A' synthesized employing one catalyst formulation and one reactor. In this disclosure, the term component also referred to chemical compounds required to manufacture a catalyst formulation; e.g. 'component (i)'.

In this disclosure the term 'homogeneous catalyst' refers to the chemical compound containing the catalytic metal which is frequently called a 'metal-ligand complex'. In this disclosure, a homogeneous catalyst is defined by the characteristics of the resulting ethylene interpolymer. More specifically, a catalyst was a homogeneous catalyst if it produced a homogeneous ethylene interpolymer that has a narrow molecular weight distribution (SEC $M_w/M_n$ values of less than 2.8) and a narrow comonomer distribution ($CDBI_{50}$>70%). Homogeneous catalysts are well known in the art. Two subsets of the homogeneous catalysts include unbridged metallocene catalysts and bridged metallocene catalysts. Unbridged metallocene catalysts are characterized by two bulky ligands bonded to the catalytic metal, a non-limiting example includes bis(isopropyl-cyclopentadienyl) titanium dichloride. In this disclosure, an 'unbridged metallocene catalyst formulation' comprised an unbridged metallocene catalyst. In bridged metallocene catalysts the two bulky ligands are covalently bonded (bridged) together, a non-limiting example includes diphenylmethylene (cyclopentadienyl) (2,7-di-t-butylfuorenyl) titanium dichloride; where the diphenylmethylene group bonds, or bridges, the cyclopentadienyl and fluorenyl ligands together. In this disclosure, a 'bridged metallocene catalyst formulation' comprised an bridged metallocene catalyst. Two additional subsets of homogeneous catalysts include unbridged and bridged single site catalysts. In this disclosure, single site catalysts are characterized as having only one bulky ligand bonded to the catalytic metal. A non-limiting example of an unbridged single site catalyst includes cyclopentadienyl tri(tertiary butyl)phosphinimine titanium dichloride; wherein cyclopentadienyl was the bulky ligand. In this disclosure, an 'unbridged single site catalyst formulation' comprised an unbridged single site catalyst. A non-limiting example of a bridged single site catalyst includes $[C_5(CH_3)_4$—$Si(CH_3)_2$—$N(tBu)]$ titanium dichloride, where the —Si $(CH_3)_2$— group functions as the bridging group. In this disclosure, a 'bridged single site catalyst formulation' comprised a bridged single site catalyst.

Herein, the term "polyolefin" includes ethylene polymers and propylene polymers; non-limiting examples of "propylene polymers" include isotactic, syndiotactic and atactic propylene homopolymers, random propylene copolymers containing at least one comonomer (e.g. α-olefins) and impact polypropylene copolymers or heterophasic polypropylene copolymers.

The term "thermoplastic" refers to a polymer that becomes liquid when heated, will flow under pressure and solidify when cooled. Thermoplastic polymers include ethylene polymers as well as other polymers used in the plastic industry; non-limiting examples of other polymers commonly used in film applications include barrier resins (EVOH), tie resins, polyethylene terephthalate (PET), polyamides and the like.

As used herein the term "monolayer film" refers to a film containing a single layer of one or more thermoplastics. The term "multilayer film" refers to a film containing more than one layer; non-limiting processes to produce such films include coextrusion or lamination.

As used herein, the terms "hydrocarbyl", "hydrocarbyl radical" or "hydrocarbyl group" refers to linear, branched, or cyclic, aliphatic, olefinic, acetylenic and aryl (aromatic) radicals comprising hydrogen and carbon that are deficient by one hydrogen.

As used herein, an "alkyl radical" includes linear, branched and cyclic paraffin radicals that are deficient by one hydrogen radical; non-limiting examples include methyl (—$CH_3$) and ethyl (—$CH_2CH_3$) radicals. The term "alkenyl radical" refers to linear, branched and cyclic hydrocarbons containing at least one carbon-carbon double bond that is deficient by one hydrogen radical.

As used herein, the term "aryl" group includes phenyl, naphthyl, pyridyl and other radicals whose molecules have an aromatic ring structure; non-limiting examples include naphthylene, phenanthrene and anthracene. An "arylalkyl" group is an alkyl group having an aryl group pendant there from; non-limiting examples include benzyl, phenethyl and tolylmethyl; an "alkylaryl" is an aryl group having one or more alkyl groups pendant there from; non-limiting examples include tolyl, xylyl, mesityl and cumyl.

As used herein, the phrase "heteroatom" includes any atom other than carbon and hydrogen that can be bound to carbon. A "heteroatom-containing group" is a hydrocarbon radical that contains a heteroatom and may contain one or more of the same or different heteroatoms. In one embodiment, a heteroatom-containing group is a hydrocarbyl group containing from 1 to 3 atoms selected from the group consisting of boron, aluminum, silicon, germanium, nitrogen, phosphorous, oxygen and sulfur. Non-limiting examples of heteroatom-containing groups include radicals of imines, amines, oxides, phosphines, ethers, ketones, oxoazolines heterocyclics, oxazolines, thioethers, and the like. The term "heterocyclic" refers to ring systems having a carbon backbone that comprise from 1 to 3 atoms selected from the group consisting of boron, aluminum, silicon, germanium, nitrogen, phosphorous, oxygen and sulfur.

As used herein the term "unsubstituted" means that hydrogen radicals are bounded to the molecular group that follows the term unsubstituted. The term "substituted" means that the group following this term possesses one or more moieties that have replaced one or more hydrogen radicals in any position within the group; non-limiting examples of moieties include halogen radicals (F, Cl, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Non-limiting examples of substituted alkyls and aryls include: acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals and combinations thereof.

Herein the term "R1" and its superscript form "$^{R1}$" refers to a first polymerization reactor in a continuous solution polymerization process; it being understood that R1 is distinctly different from the symbol $R^1$; the latter is used in chemical formula, e.g. representing a hydrocarbyl group. Similarly, the term "R2" and it's superscript form "$^{R2}$" refers to a second reactor, and; the term "R3" and it's superscript form "$^{R3}$" refers to a third reactor.

DETAILED DESCRIPTION

Non-Comonomer Index (NCI) and Non-Comonomer Index Distribution ($NCID_i$)

Figure 1:
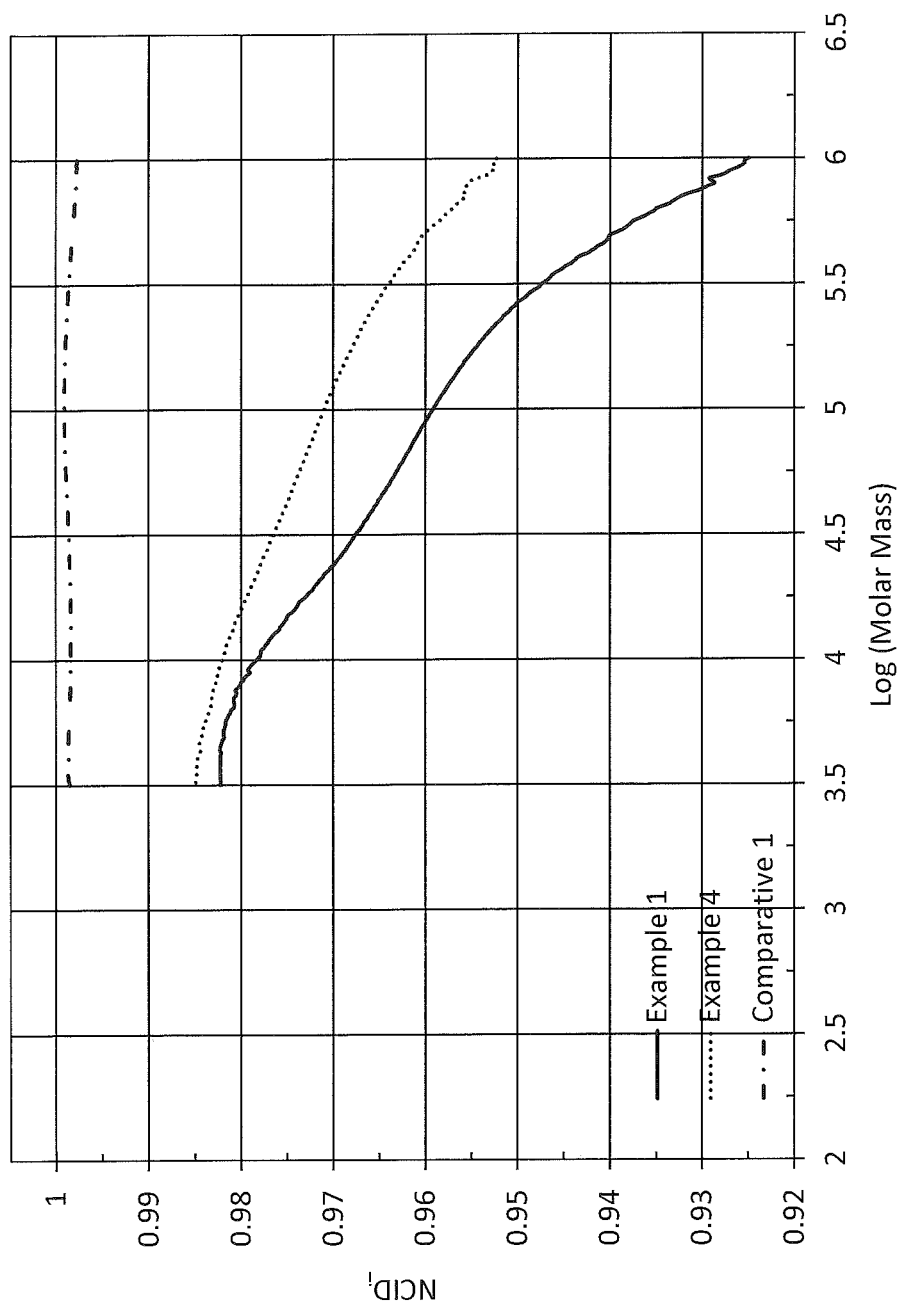
FIG. 1 compares the $NCID_i$ (Non-Comonomer Index Distribution) of Examples 1 and 4 that have intermediate branching, relative to the $NCID_i$ of Comparative 1 that does not contain intermediate branching.

FIG. 1 compared the Non-Comonomer Index Distribution ($NCID_i$) of Examples 1 and 4 with Comparative 1. Examples 1 and 4 as well as Comparative 1 did not contain long chain branching (LCB) (or contained an undetectable level of LCB) as evidenced by the Long Chain Branching Factor (LCBF) discussed below. Examples 1 and 4 contained intermediate branching as evidenced by $NCID_i$ values less than or equal to 0.99. In contrast, Comparative 1 did not contain intermediate branching as evidenced by $NCID_i$ values greater than 0.99. Examples 1 and 4 were ethylene/1-octene interpolymer products (about 0.92 g/cm³ and about 1.0 $I_2$ (melt index, ASTM 1239, 2.16 kg load, 190° C.) produced in a continuous solution polymerization process using different embodiments of intermediate branching catalyst formulations. The solution process conditions required to manufacture Examples 1 and 4 are discussed below and disclosed in Tables 1a and 1b. Comparative 1 was an ethylene/1-octene interpolymer (about 0.92 g/cm³ and about 1.0 $I_2$) produced in a competitive solution polymerization process using a comparative batch Ziegler-Natta catalyst formulation; Comparative 1 was Dowlex 2045G available from The Dow Chemical Company (Midland, Michigan, USA). The physical properties of Examples 1, 2 and 4 and Comparatives 1 and 2 were summarized in Table 2. In this disclosure Comparative 2 was also Dowlex 2045; however, a different lot (or batch) relative to Comparative 1.

In this disclosure, Triple Detection Cross Fractionation Chromatography (3D-CFC) was used to measure NCI and $NCID_i$. NCI and $NCID_i$ were dimensionless parameters. The testing methods section of this disclosure fully described the 3D-CFC technique. NCI was defined as the measured Mark-Houwink constant ($K_m$) of the sample under test (measured in 1,2,4-trichlorobenzene (TCB) at 140° C.) divided by the short chain branching (SCB) corrected Mark-Houwink constant ($K_{co}$) for linear ethylene/α-olefin interpolymers, as defined by Eq. (6).

$$NCI = \frac{K_m}{K_{co}} = \frac{1000000([\eta]/M_v^{0.725})}{(391.98 - A \times SCB)} \quad \text{Eq. (6)}$$

In Eq. (6), [η] was the experimentally measured intrinsic viscosity (dL/g) as determined by 3D-SEC, My was the viscosity average molar mass (g/mol) as determined by 3D-SEC; SCB was the short chain branching content (number of $CH_3$ groups per 1000 carbon atoms [$CH_3$#/1000C]) as determined by FTIR; and A was a constant that depended on the α-olefin present in the ethylene/α-olefin interpolymer under test; A was 2.1626 for 1-octene. In the case of an ethylene homopolymer no correction was required for the Mark-Houwink constant, i.e. SCB is zero.

Using a Polymer Char Crystaf-TREF unit an ethylene/α-olefin interpolymer sample under test was fractionated into a number of fractions (typically from 5 to 20 fractions, in this disclosure superscript f, i.e. $^f$, represents the fraction number) and the Non-Comonomer Index Distribution ($NCID_i$) was determined. Specifically: (i) the NCI of each fraction ($NCI^f$) was calculated using Eq. (4) (Equation (4) was introduced previously and was reproduced below);

$$NCI^f = \frac{K_m^f}{K_{co}} = \frac{1000000([\eta]^f/(M_v^f)^{0.725})}{(391.98 - Ax(BxT^f + C))} \quad \text{Eq. (4)}$$

where A, B and C were constants determined experimentally and $T^f$ was the weight average TREF elution temperature of fraction f (see testing methods section for additional detail), and; (ii) the Non-Comonomer Index Distribution ($NCID_i$) was calculated using Eq. (5) (introduced previously);

$$NCID_i = \Sigma_1^f (wt.fr.)^f (w_i \log(M_i))^f \times NCI^f \quad \text{Eq. (5)}$$

where $(wt.fr.)^f$ represented the weight fraction of $f^{th}$ TREF fraction, and; $(w_i \log(M_i))^f$ represented the weight fraction of the $f^{th}$ TREF fraction having molar mass $M_i$. Clarifying with an example, 3D-CFC results for Example 1 were disclosed in Table 3. As shown in Table 3, Example 1 was fractionated into nine fractions (F1 through F9), the $NCI^f$ of each fraction was calculated using Eq. (4). TREF fraction 1 (F1) was eluted from 30° C. to 60° C. and was 0.1699 weight fraction $\{(wt.fr)^1\}$ of Example 1. Again, $(w_i \log(M_i))^1$ was the weight fraction of F1 having molar mass $M_i$; further, $(w_i \log(M_i))^1$ summed over all i characterized the molecular weight distribution of F1. Typically, the molecular weight distribution of each fraction contained about 300 data points, employing $\log(M_i)$ increments of 0.01. As shown in Table 3, fraction F1 (of Example 1) had a weight average molecular weight ($M_w$) of 72,300 g/mol, a viscosity average molecular weight ($M_v$) of 63,700 g/mol, an intrinsic viscosity [η] of 0.98 dL/g, the amount of short chain branching ($SCB^f$) was 29.03 $CH_3$/1000C and the Non-Comonomer Index of Fraction 1 ($NCI^1$) was 0.983. The 3D-CFC TREF fractions isolated from Example 1 had Non-Comonomer Index values ($NCI^f$) that varied from 0.983 to 0.902.

Figure 2:
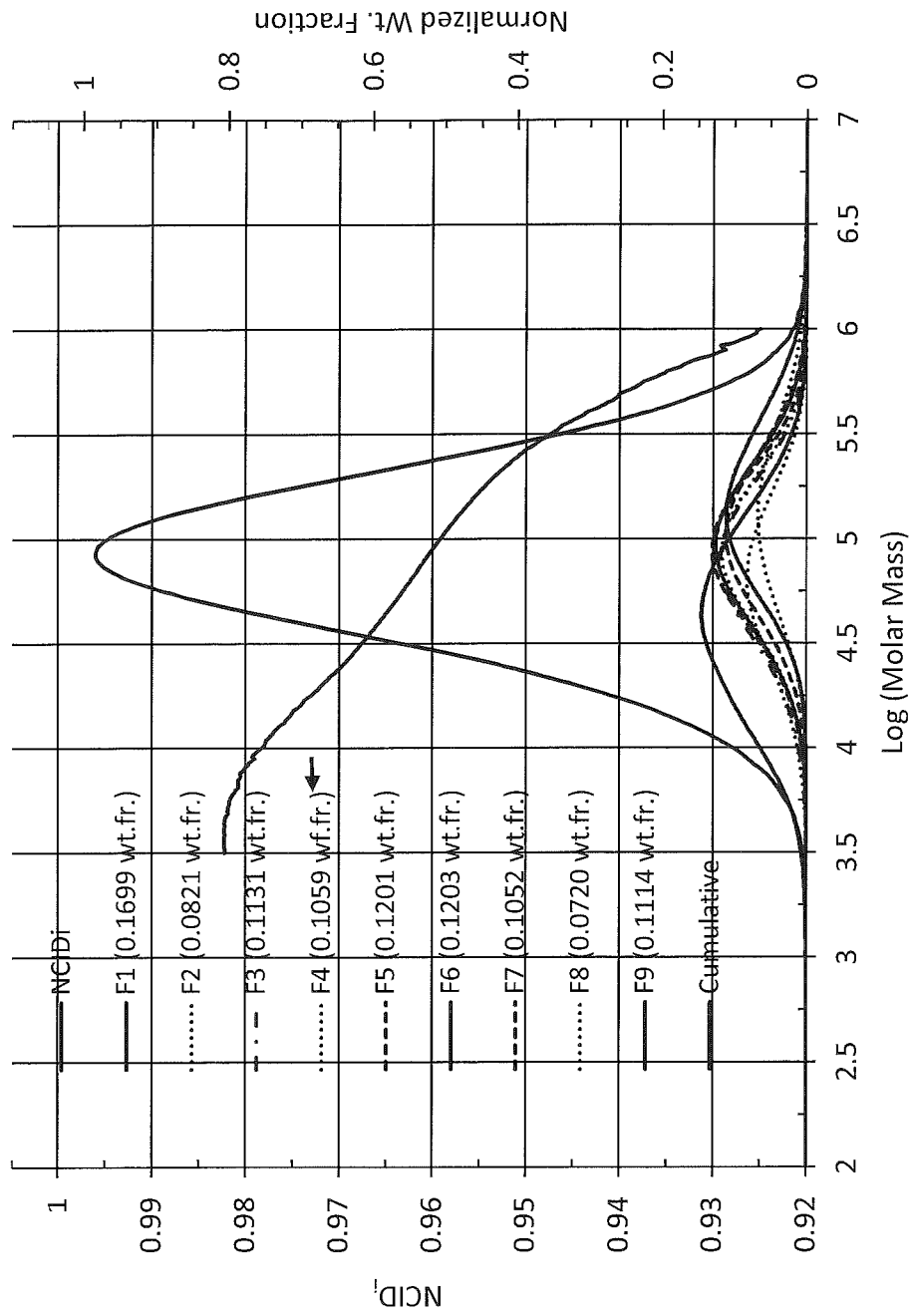
FIG. 2 illustrates the $NCID_i$ of Example 1 on the left axis generated from nine TREF fractions (F1 through F9); the right axis shows the normalized weight fraction of each TREF fraction as well as the cumulative weight fraction.

Graphically, FIG. 2 shows the Non-Comonomer Index Distribution ($NCID_i$) of Example 1 (left y-axis), and; the molecular weight distributions of the nine 3D-CFC TREF fractions and cumulative (overall) molecular weight distribution (right y-axis). Example 1 was an ethylene/1-octene interpolymer containing intermediate branching as evidenced by $NCID_i$ values 0.99. As shown in Tables 1a and 1b, Example 1 was produced by injecting an in-line intermediate branching catalyst formulation into reactor 2 (R2); 80% of the ethylene and 100% of the 1-octene was injected into R2; 20% of the ethylene was injected into reactor 3 (R3); a catalyst formulation was not injected into R3.

Figure 3:
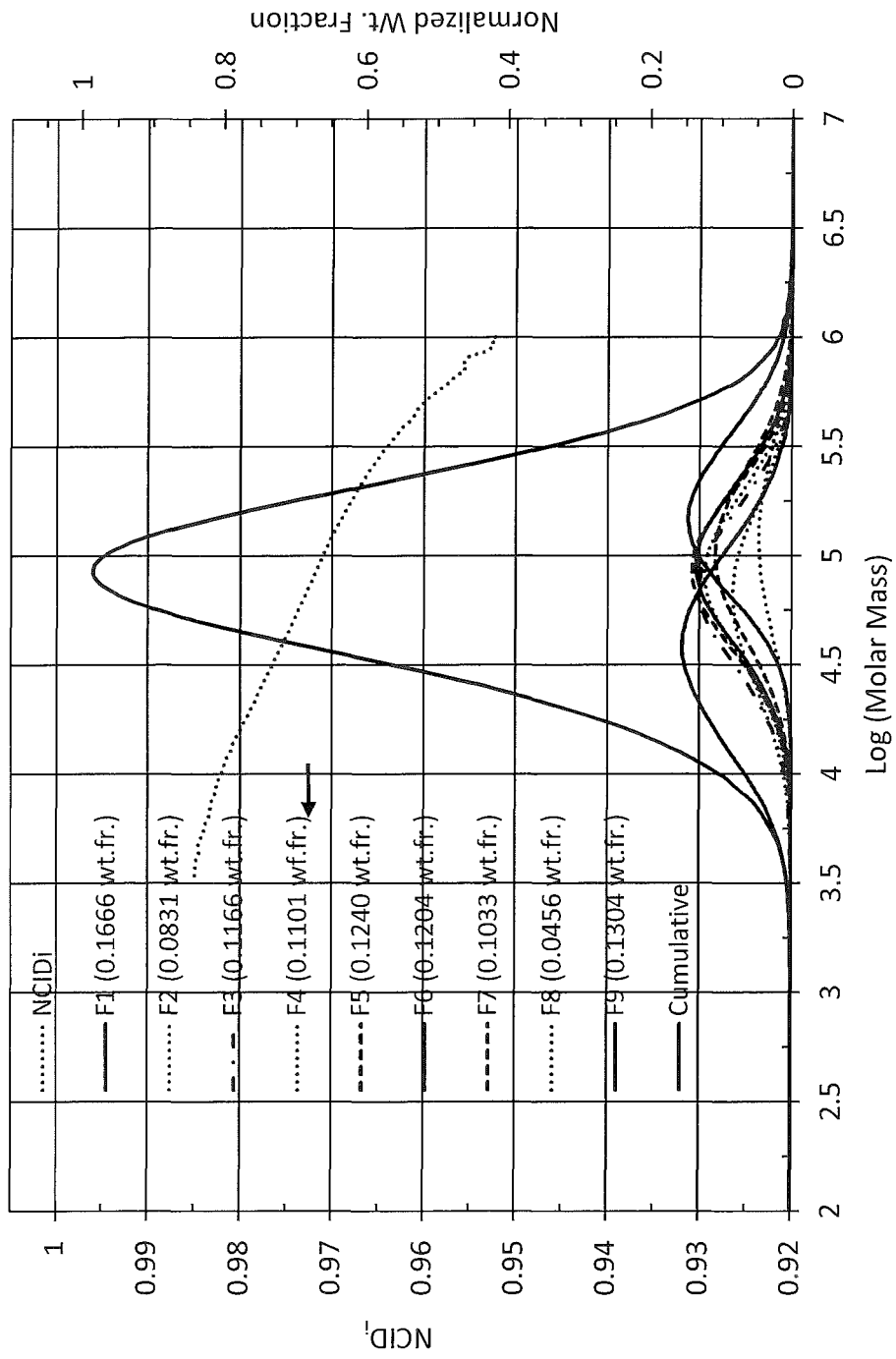
FIG. 3 illustrates the $NCID_i$ of Example 4 on the left axis generated from nine TREF fractions (F1 through F9); the right axis shows the normalized weight fraction of each TREF fraction as well as the cumulative weight fraction.

As shown in Tables 1a and 1b, Example 4 was produced using a batch intermediate branching catalyst formulation; Table 2 summarized the physical characteristics of Example 4. The 3D-CFC analysis of Example 4 was summarized in Table 4. Nine 3D-CFC TREF fractions were collected; fraction 1 (F1) was collected at TREF elution temperatures from 30° C. to 60° C. and was 0.1666 weight fraction $(wt.fr.)^1$ of Example 4. F1 had a weight average molecular weight ($M_w$) of 61,600 g/mol, a viscosity average molecular weight ($M_v$) of 54,400 g/mol, an intrinsic viscosity [1] of 0.88 dL/g, the amount of short chain branching ($SCB^f$) was 29.42 $CH_3$/1000C and the Non-Comonomer Index of Fraction 1 ($NCI^1$) was 0.985. The 3D-CFC TREF fractions isolated from Example 4 had Non-Comonomer Index values ($NCI^f$) that varied from 0.985 to 0.938. FIG. 3 showed the $NCID_i$ of Example 4 as a function of Log(Molar Mass), as well as the molecular weight distributions of the nine 3D-CFC TREF fractions and the cumulative (overall) molecular weight distribution. Example 4 contained intermediate branching as evidenced by $NCID_i$ values ≤0.99.

Figure 4:
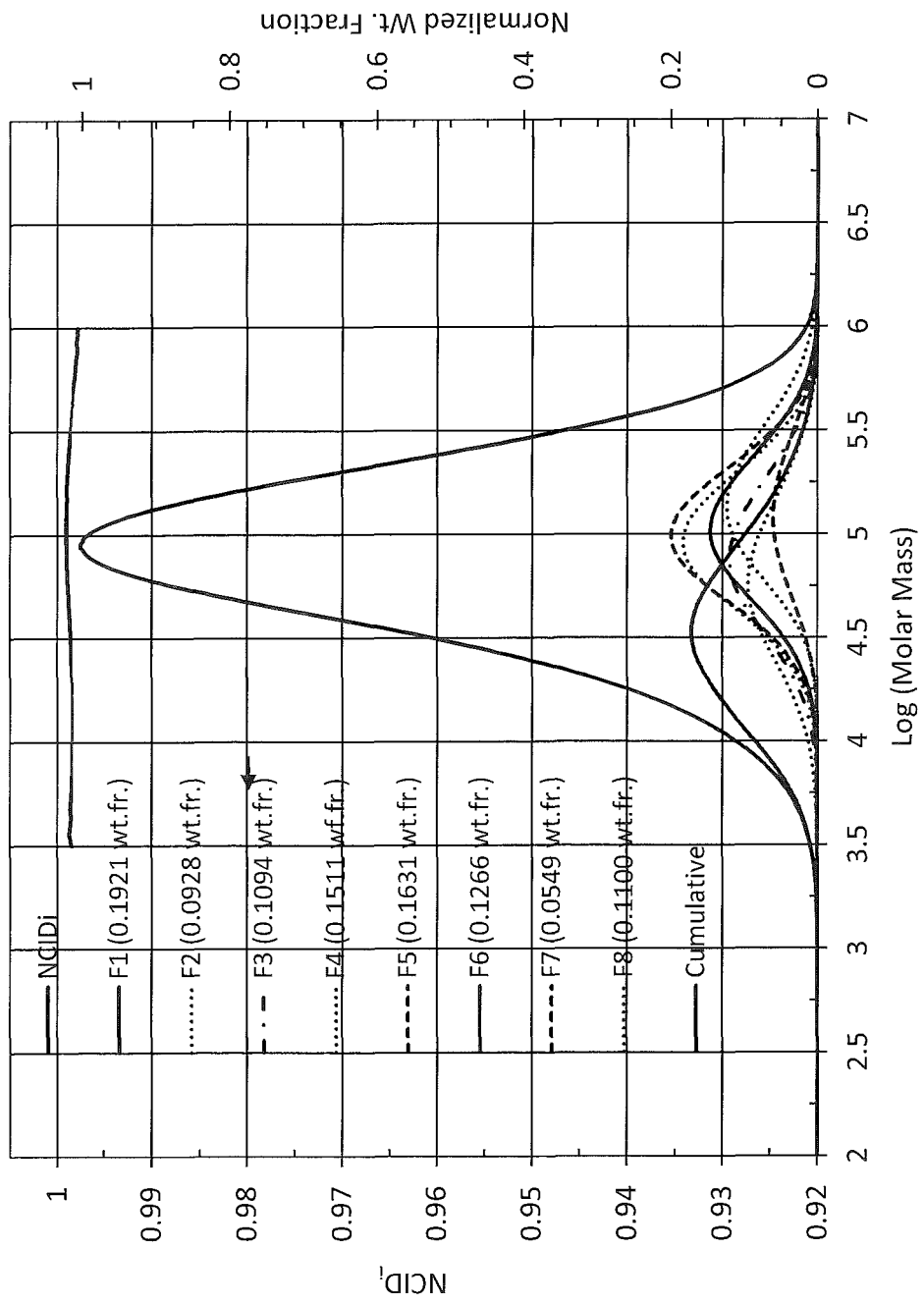
FIG. 4 illustrates the $NCID_i$ of Comparative 1 on the left axis generated from eight TREF fractions (F1 through F8); the right axis shows the normalized weight fraction of each TREF fraction as well as the cumulative weight fraction.

Table 5 summarized 3D-CFC analysis of Comparative 1 and physical characteristics were summarized in Table 2. Comparative 1 was fractionated into eight 3D-CFC TREF fractions; fraction 1 (F1) collected from 30° C. to 65° C. was 0.1921 weight fraction ($(wt.fr.)^1$) of Comparative 1. F1 had a weight average molecular weight ($M_w$) of 60,400 g/mol, a viscosity average molecular weight ($M_v$) of 51,700 g/mol, an intrinsic viscosity [η] of 0.87 dL/g, the amount of short chain branching ($SCB^f$) was 26.63 $CH_3$/1000C and the Non-Comonomer Index value of Fraction 1 ($NCI^1$) was 1.00. Comparative 1 fractions had an average NCI of 0.998±0.005. FIG. 4 plotted the Non-Comonomer Index Distribution ($NCID_i$) of Comparative 1 as a function of Log(Molar Mass), the molecular weight distributions of the eight 3D-CFC TREF fractions and the cumulative molecular weight distribution; $NCID_1$ values were consistently greater than 0.99. Comparative 1 did not contain intermediate branching as evidenced by $NCID_i$ values >0.99.

Figure 5:
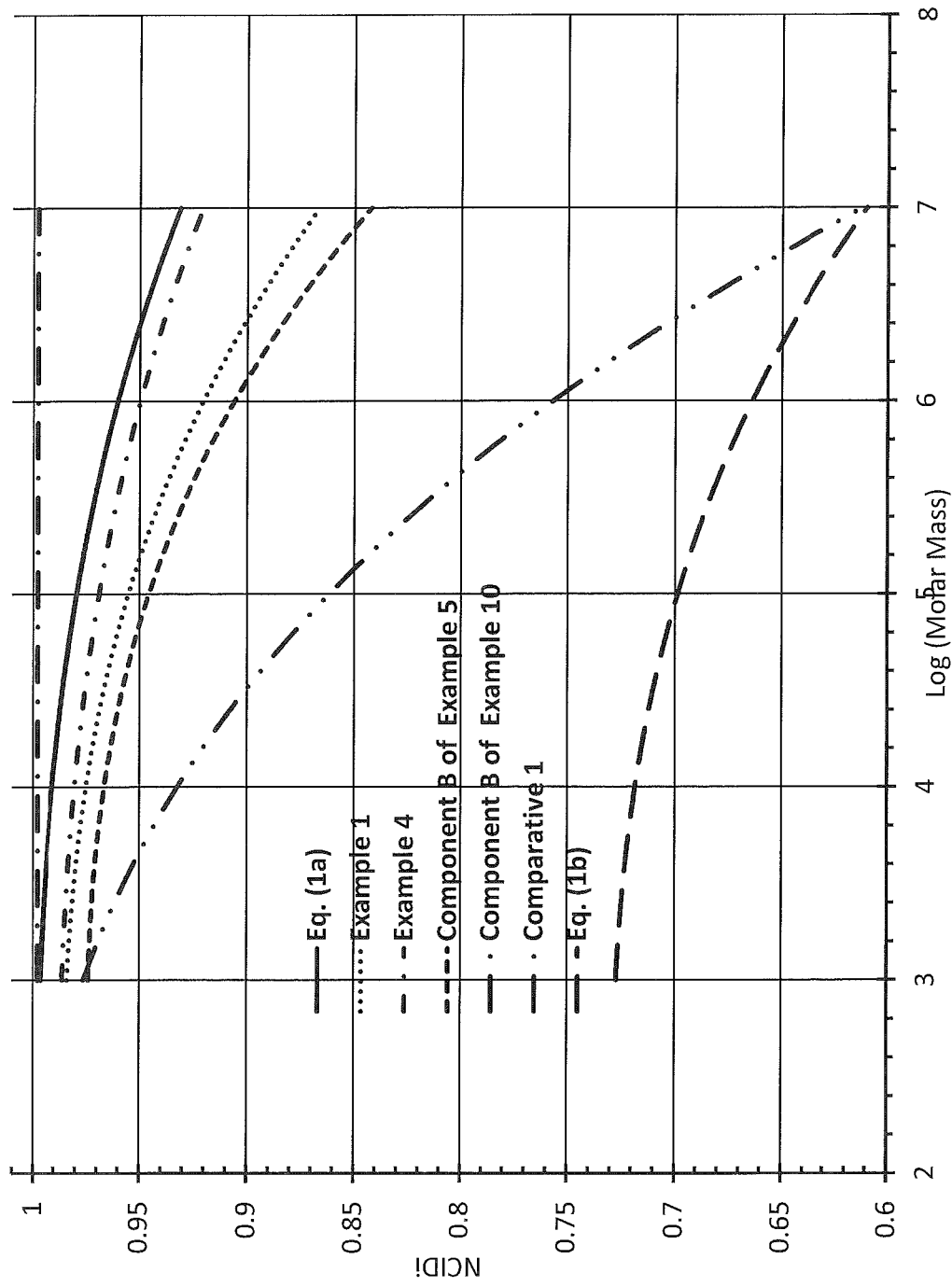
FIG. 5 plots the $NCID_i$ of Example 1, Example 4, Component B of Example 5 and Component B of Example 10 demonstrating that these ethylene interpolymer products contained intermediate branching; in contrast, Comparative 1 did not contain intermediate branching; Equation (1a) and Equation (1b) are also plotted. Note: For a comparison purpose, data plotted in FIG. 5 were horizontally shifted to a same $M_o$ value of 60000, i.e. the $M_o$ value from the component B of Example 10.

Using various embodiments of intermediate branching catalyst formulations, ethylene interpolymer products having a range of intermediate branching were produced. This range in intermediate branching was characterized by the Non-Comonomer Index Distribution ($NCID_i$) as shown in FIG. 5 (again, Comparative 1 in FIG. 5 (long dash-dot line) did not contain intermediate branching, i.e. $NCID_i$ values >0.99). The experimentally measured $NCID_i$ of Example 1 was fit to the following third order polynomial, Eq. (3) (introduced previously):

$$NCID_i = \beta_0 + \beta_1(\log M_i - \log M_o + 4.93) + \beta_2(\log M_i - \log M_o + 4.93)^2 + \beta_3(\log M_i - \log M_o + 4.93)^3 \quad \text{Eq. (3)}$$

and this fit produced the Example 1 curve (dotted curve) plotted in FIG. 5; where $\beta_0$, $\beta_1$, $\beta_2$ and $\beta_3$ were 0.98658, −0.00388, 0.00313 and −0.00069, respectively, and $M_o$ was 85000. $M_o$ was the peak molecular weight that characterized the molecular weight distribution of Example 1 when fit to the log normal distribution (described below). Similarly, the experimentally measured $NCID_i$ of Example 4 was fit to Eq. (3) producing the short dash-dot curve plotted in FIG. 5; where $\beta_0$, $\beta_1$, $\beta_2$ and $\beta_3$ were 0.98945, −0.00201, 0.00137 and −0.00034, respectively, and $M_o$ was 82000. FIG. 5 also plotted the computer simulated $NCID_i$ of component B of Example 5 (short dashed curved); where $\beta_0$, $\beta_1$, $\beta_2$ and $\beta_3$ were 0.97000, −0.00400, 0.00450 and −0.00090, respectively, and $M_o$ was 65000. Example 5 was fully described below, in brief, Example 5 (manufactured in a dual reactor solution process) contained a first and a second ethylene interpolymer, i.e. components A and B, respectively. Example 5's component B contained intermediate branching and component A did not contain intermediate branching. The term 'computer simulated' means the $NCID_i$ of component B (in Example 5) was generated by deconvolution (fully described below). FIG. 5 also plotted the computer simulated $NCDI_i$ of component B in Example 10 (long dash–dot–dot curve); where so, $\beta_1$, $\beta_2$ and $\beta_3$ were 1.0100, −0.0001, 0.0001 and −0.0011, respectively, and $M_o$ was 60000.

Given these examples, intermediately branched ethylene interpolymer products had $NCID_i$ values characterized by Eq. (1a) and Eq. (1b) (both introduced previously):

$$NCID_i \leq 1.000 - 0.00201(\log M_i - \log M_o + 4.93) + 0.00137(\log M_i - \log M_o + 4.93)^2 - 0.00034(\log M_i - \log M_o + 4.93)^3 \quad \text{Eq. (1a)}$$

$$NCID_i \geq 0.730 - 0.00388(\log M_i - \log M_o + 4.93) + 0.00313(\log M_i - \log M_o + 4.93)^2 - 0.00069(\log M_i - \log M_o + 4.93)^3 \quad \text{Eq. (1b)}$$

Eq. (1a) was plotted in FIG. 5 (solid curve), as was Eq. (1b) (long dash curve); where $M_o$ was 60000. In alternative words, ethylene interpolymer products having intermediate branching had $NCID_i$ values characterized as follows: Eq. (1b)≤$NCID_i$≤Eq. (1a).

An additional feature that characterized intermediately branched ethylene interpolymer products was the first derivative of Eq. (3), i.e. Eq. (2) (introduced previously):

$$\frac{dNCID_i}{d\log M_i} = \beta_1 + 2\beta_2(\log M_i - \log M_0 + 4.93) + 3\beta_3(\log M_i - \log M_0 + 4.93)^2 \quad \text{Eq. (2)}$$

Figure 6:
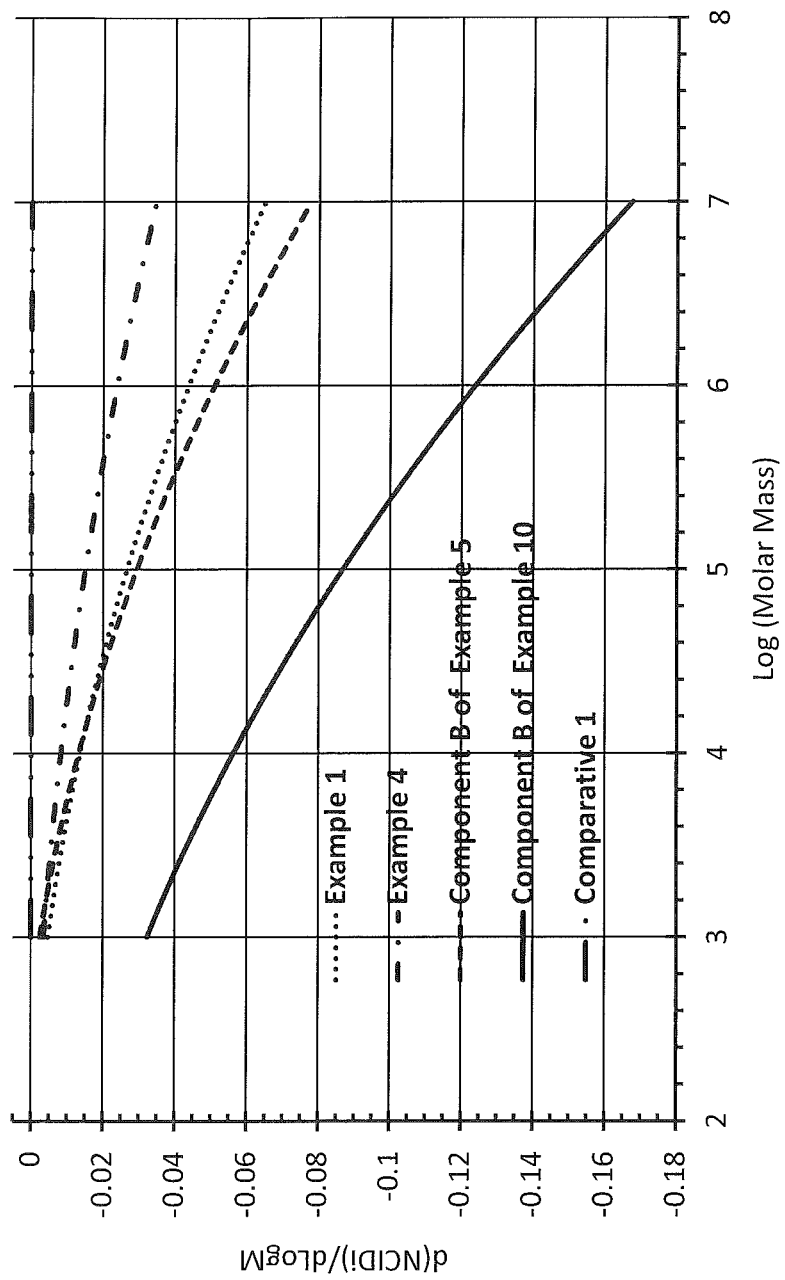
FIG. 6 plots the first derivative of $NCID_i$, $$\frac{dNCID_i}{d\log M_i},$$

FIG. 6 compares the $$\frac{dNCID_i}{d\log M_i}$$

values of Example 1 (dotted curve), Example 4 (dash-dot curve), component B of Example 5 (dash curve), component B of Example 10 (solid curve) with comparative 1 (dash-dot-dot line). Evidently, $$\frac{dNCID_i}{d\log M_i}$$

was negative for intermediately branched ethylene interpolymer products. In contrast, $$\frac{dNCID_i}{d\log M_i}$$

of Comparative 1 was zero; more specifically, statistically the $NCID_i$ values of Comparative 1 shown in FIG. 5 were best represented by a one parameter intercept model (i.e. a constant, the mean 0.998), thus $$\frac{dNCID_i}{d\log M_i}$$

of Comparative 1 was zero. As shown in FIG. 6, $$\frac{dNCID_i}{d\log M_i}$$

of the disclosed ethylene interpolymer products was consistently ≤−0.0001; in contrast, Comparative 1 had $$\frac{dNCID_i}{d\log M_i} \text{ values} > -0.0001.$$

Table 6 summarized the 3D-CFC analysis of Comparative 3 and additional physical and molecular characteristics were shown in Table 7. Comparative 3 was a dual reactor ethylene/1-octene interpolymer manufactured in a dual reactor solution polymerization process using an unbridged single site catalyst formulation comprising cyclopentadienyl tri(tertiary butyl)phosphinimine titanium dichloride, i.e. SURPASS® FPs117-C available from NOVA Chemicals Company (Calgary, Alberta, Canada). In Comparative 3 the comonomer was randomly distributed and Comparative 3 did not contain long chain branching (LCB) (or contained an undetectable level of LCB) as evidenced by the Long Chain Branching Factor (LCBF) (discussed below). Comparative 3 was fractionated into nine 3D-CFC TREF fractions; fraction 1 (F1) was collected from 30° C. to 65° C. and was 0.1527 weight fraction (wt.fr.)[1]. Fraction F1 had a weight average molecular weight ($M_w$) of 23,800 g/mol, a viscosity average molecular weight ($M_v$) of 22,200 g/mol, an intrinsic viscosity [η] of 0.48 dL/g, the amount of short chain branching (SCB$^f$) was 24.98 CH$_3$/1000C and the Non-Comonomer Index value of Fraction 1 (NCI[1]) was 0.998. The 3D-CFC TREF fractions isolated from Comparative 3 had NCI$^f$ values that varied from 1.00 to 0.994. FIG. 7 plotted Comparative 3's NCID$_i$ values as a function of Log(Molar Mass). The NCID$_i$ of Comparative 3 was characterized by a constant (i.e. the mean 0.997); thus $$\frac{dNCID_i}{dM_i}$$

of Comparative 3 was zero. Comparative 3 did not contain intermediate branching as evidenced by NCID$_i$ values >0.99.

Table 8 summarizes 3D-CFC analysis of Comparative 4 and physical characteristics were summarized in Table 7. Comparative 4 was a competitive ethylene/1-octene interpolymer produced using a single-site catalyst formation in a single reactor solution process, i.e. AFFINITY PL1880 available from The Dow Chemical Company (Midland, Michigan, USA). In addition to short chain branching (i.e. C$_6$ branching from the 1-octene comonomer), Comparative 4 also contained long chain branching (LCB); as evidenced by the Long Chain Branching Factor (LCBF) (discussed below). The Non-Comonomer Index (NCI), as defined by Eq. (6), was influenced by the amount of long chain branching; with NCI decreasing as LCB increased. As shown in Table 8, Comparative 4 was fractionated into nine 3D-CFC TREF fractions; fraction 1 (F1) collected from 30° C. to 50° C. was 0.1123 weight fraction (wt.fr.)[1]. Fraction F1 had a weight average molecular weight ($M_w$) of 45,900 g/mol, a viscosity average molecular weight ($M_v$) of 43,900 g/mol, an intrinsic viscosity [η] of 0.70 dL/g, the amount of short chain branching (SCB$^f$) was 33.91 CH$_3$/1000C and the Non-Comonomer Index value of Fraction 1 (NCI[1]) was 0.944. The 3D-CFC TREF fractions isolated from Comparative 4 had consistent NCI$^f$ values, i.e. 0.945±0.003. FIG. 8 plotted Comparative 4's NCID$_i$ values as a function of Log(Molar Mass); statistically these NCID$_i$ values were best represented by a one parameter (the mean, 0.945) intercept model thus $$\frac{dNCID_i}{d\log M_i}$$

was zero.

Table 9 summarizes 3D-CFC analysis of Comparative 5 and physical characteristics were summarized in Table 7. Comparative 5 was an ethylene/1-octene interpolymer produced in the solution pilot plant disclosed herein using one reactor and a bridged metallocene catalyst formulation comprising diphenylmethylene (cyclopentadienyl) (2,7-di-t-butylfuorenyl) hafnium dimethyl. Comparative 5 contained long chain branching (LCB); as evidenced by LCBF data (discussed below). Comparative 5 was fractionated into six 3D-CFC TREF fractions; fraction 1 (F1) collected from 30° C. to 55° C. was 0.1153 weight fraction (wt.fr.)[1]. Fraction F1 had a weight average molecular weight ($M_w$) of 37,700 g/mol, a viscosity average molecular weight ($M_v$) of 35,900 g/mol, an intrinsic viscosity [η] of 0.64 dL/g, the amount of short chain branching (SCB$^f$) was 30.95 CH$_3$/1000C and the Non-Comonomer Index value of Fraction 1 (NCI[1]) was 0.976. The 3D-CFC TREF fractions isolated from Comparative 5 had consistent NCI$^f$ values, i.e. 0.975±0.002. The flat (constant) Non-Comonomer Index Distribution (NCID$_i$) of Comparative 5 was plotted in FIG. 9; statistically these NCID$_i$ values were best represented by a one parameter (the mean, 0.975) intercept model thus Comparative 5's $$\frac{dNCID_i}{d\log M_i}$$

was zero.

In some cases the polymer sample under test contained one component. The term 'component' referred to an ethylene interpolymer having a distribution of molecular weights produced by one catalyst system injected into one reactor. In other cases, the polymer sample contained more than one component; for example, a polymer sample produced by injecting more than one catalyst formulation into one reactor, or a polymer sample produced using more than one reactor (where the same or different catalyst(s) are used in the multiple reactors).

Tables 10a and 10b summarized the solution process conditions used to manufacture Example 5 and Table 11 disclosed the physical characteristics. Example 5 was a dual reactor and dual catalyst ethylene/1-octene interpolymer product containing: about 44% of a component A produced in a first reactor (R1) using an unbridged single site catalyst formulation, and; about 56% of a component B produced in a second reactor (R2) using an embodiment of an in-line intermediate branching catalyst formulation. In Example 5, the two reactors (R1 and R2) were operated in series mode. Table 12 summarized 3D-CFC analysis of Example 5. Example 5 was fractionated into eleven 3D-CFC TREF fractions; fraction 5 (F5) collected from 71° C. to 73° C. was 0.0992 weight fraction (wt.fr.)[5]. Fraction F5 had a weight average molecular weight ($M_w$) of 140,600 g/mol, a viscosity average molecular weight ($M_v$) of 132,100 g/mol, an intrinsic viscosity [η] of 1.84 dL/g, the amount of short chain branching (SCB$^f$) was 15.10 CH$_3$/1000C and the Non-Comonomer Index value of Fraction 5 (NCI[5]) was 0.992. The NCID$_i$ of Example 5 was plotted in FIG. 10 (left vertical axis), as well as the molecular weight distributions of eleven 3D-CFC TREF fractions and cumulative (overall) molecular weight distribution (right vertical axis). Component B in Example 5 contained intermediate branching produced by an embodiment of an in-line intermediate branching catalyst formulation. The shape of the $NCID_i$ in FIG. 10 reflected the following facts: (1) component B's intermediate branching tended to reduce NCI values monotopically as Log(Molar Mass) increased as shown in FIG. 5 and $$\frac{dNCID_i}{d\log M_i}$$

of component B was $\leq -0.0001$ as shown in FIG. 6, and; (2) the $NCID_i$ of component A was a constant 0.997 and $$\frac{dNCID_i}{d\log M_i}$$

of component A was zero (>−0.0001).

In FIG. 10 the peak in Example 5's $NCID_i$ at about 5.5 Log(Molar Mass) reflected the fact that component A was higher molecular weight than component B; as supported by FIG. 11. FIG. 11 illustrated a computer simulation of Example 5 showing the $NCID_i$ distribution of a binary blend of: i) 44.0 wt % component A having a constant $NCID_i^A$ of 0.997, and, ii) 56.0 wt % component B having a $NCID_i^B$ defined by Eq. (3), where $\beta_0$, $\beta_1$, $\beta_2$, and $\beta_3$ were 0.97000, −0.00400, 0.00450 and −0.00090, respectively, and $M_o$ was 65000; component B was also characterized by $$\frac{dNCID_i}{d\log M_i} \text{ values} \leq -0.0001.$$

The computer simulation was a good representation of Example as evidenced by the similarity between the experimentally measured $NCID_i$ values (long dash curve) and the simulated $NCID_i$ values (dotted curve) in FIG. 11.

The simulated $NCID_i$ values shown in FIG. 11 were generated using Eq. (7)

$$NCID_i = \sum_i (wt.fr.)^A (w_i M_i)^A NCID_i^A + (wt.fr.)^B (w_i M_i)^B NCID_i^B \quad \text{Eq. (7)}$$

where $(wt.fr.)^A$ and $(wt.fr.)^B$ represented the weight fractions of components A and B, respectively, with the proviso that $((wt.fr.)^A + (wt.fr.)^B = 1.0)$; $(w_i M_i)^A$ was the weight fraction of component A having molecular weight $M_i$ defined by a modified Flory-Schultz distribution Eq. (8); $NCID_i^A$ was the Non-Comonomer Index Distribution of component A (in the case of Example 5's component A, $NCID_i$ was a constant 0.997); $(w_i M_i)^B$ was the weight fraction of component B having molecular weight $M_i$ defined by a log normal distribution Eq. (9) and; $NCID_i^B$ was the Non-Comonomer Index Distribution of component B as defined above.

The modified Flory-Shultz distribution was defined as follows:

$$(w_i M_i)^A = \ln(10) \times \left(\frac{M_i}{M_r}\right) \exp\left(\varphi - \frac{M_i}{M_r}\right) \quad \text{Eq. (8)}$$

where $M_r$ and $\varphi$ were fitting parameters, i.e. $M_r$ was a reference molecular weight and $\varphi$ a breadth parameter. In the case of Example 5's component A, $M_r$ was 160000 and $\varphi$ was 0.850.

The log-normal distribution was defined as follows:

$$(w_i M_i)^B = \frac{1}{\xi(2\pi)^{\frac{1}{2}}} \exp\left(-\left(\frac{1}{2}\right)((\log M_i - \log M_o)/\xi)^2\right) \quad \text{Eq. (9)}$$

where $M_o$ and $\zeta$ were fitting parameters, i.e. $M_o$ was the peak molecular weight and $\zeta$ was a breadth parameter. In the case of Example 5's component B, $M_o$ was 65000 and $\zeta$ was 0.2620.

In this disclosure the $NCID_i$ of an ethylene interpolymer product may be 'experimentally measured' or 'computer simulated'. FIG. 2 and Table 3 demonstrated how to determine the 'experimentally measured' $NCID_i$ for Example 1; in this case, $NCID_i$ could be measured directly (i.e. experimentally measured) because Example 1 contained only one ethylene interpolymer. However, in the case of an ethylene interpolymer product containing more than one ethylene interpolymer, the $NCID_i$ was determined by computer simulation, or deconvolution, as demonstrated by Example 5 in FIG. 11; i.e. a computer was used to fit Eq. (7) to the experimentally measured $NCID_i$ of Example 5 to determine the $\beta_0$, $\beta_1$, $\beta_2$ and $\beta_3$ values of Example 5's component B for use in Eq. (2) and Eq. (3).

The 3D-CFC analysis of Example 6 was summarized in Table 13 and FIG. 12; the physical characteristics of Example 6 were summarized in Table 11. Example 6 was a dual reactor ethylene/1-octene interpolymer produced in a commercial solution polymerization plant. Example 6 contained about 40 wt % of a component A and about 60 wt % of a component B; component A was produced in a first reactor (R1) using an unbridged single site catalyst formulation and component B was produced in a second reactor (R2) using an embodiment of an in-line intermediate branching catalyst formulation; R1 and R2 were operated in series mode. As shown in Table 13, Example 6 was fractionated into eleven 3D-CFC TREF fractions; fraction 1 (F1) collected at TREF elution temperatures from 30° C. to 51° C. was 0.0993 weight fraction (wt.fr.)[1]. Fraction F1 had a weight average molecular weight ($M_w$) of 61,800 g/mol, a viscosity average molecular weight ($M_v$) of 56,400 g/mol, an intrinsic viscosity [η] of 0.88 dL/g, the amount of short chain branching ($SCB^f$) was 33.39 $CH_3/1000C$ and the Non-Comonomer Index value of Fraction 1 ($NCI^i$) was 0.983.

The $NCID_i$ of Example 6 was plotted in FIG. 12, as well as the molecular weight distributions of eleven 3D-CFC TREF fractions and cumulative (overall) molecular weight distribution. The component B portion of Example 6 contained intermediate branching produced by the in-line intermediate branching catalyst formulation. As shown in FIG. 12, Example 6's Non-Comonomer Index Distribution ($NCID_i$) was similar to Example 5 (FIG. 11); which reflected the similarity in the design of these two examples.

The 3D-CFC analysis of Example 7 was summarized in Table 14 and FIG. 13; and physical characteristics were summarized in Table 11. Example 7 was a dual reactor ethylene/1-octene interpolymer produced in a commercial solution polymerization plant; containing about 40 wt % of a component A and about 60 wt % of a component B. Component A was produced in a first reactor (R1) using an unbridged single site catalyst formulation and component B was produced in a second reactor (R2) using an in-line intermediate branching catalyst formulation; R1 and R2 were operated in series mode. Given similar product design, the shape of Example 7's Non-Comonomer Index Distribution (NCID$_i$), shown in FIG. 13, was similar relative to Examples 5 and 6 shown in FIGS. 10 and 12, respectively.

Table 15 and FIG. 14 summarized the 3D-CFC analysis of Comparative 6; and physical characteristics were disclosed in Table 11. Comparative 6 was a multicomponent ethylene interpolymer product produced using a single site catalyst formation in a first reactor (producing a component A) and a comparative batch Ziegler-Natta catalyst formulation in a second reactor (producing a component B). Comparative 6 was Elite 5100G available from The Dow Chemical Company (Midland, Michigan, USA). Component A in Comparative 6 was believed to be produced by the same single site catalyst formulation used to manufacture Comparative 4; further, the component A portion of Example 6 contained long chain branching as evidenced by the Long Chain Branching Factor (LCBF) discussion (below). The component B portion of Comparative 6 was believed to be produced by the same comparative batch ZN catalyst formulation used to manufacture Comparatives 1 and 2; further, component B does not contain intermediate branching as evidenced by FIGS. 1, 4 and 6 and did not contain LCB (see LCBF discussion). As shown in Table 15, Comparative 6 was fractionated into nine 3D-CFC TREF fractions; fraction 1 (F1) collected from 30° C. to 55° C. was 0.1268 weight fraction (wt.fr.)$^1$. Fraction F1 had a weight average molecular weight ($M_w$) of 97,400 g/mol, a viscosity average molecular weight ($M_v$) of 91,100 g/mol, an intrinsic viscosity [η] of 1.216 dL/g, the amount of short chain branching (SCB$^f$) was 31.02 CH$_3$/1000C and the Non-Comonomer Index value of Fraction 1 (NCI$^1$) was 0.950. Comparative 6's NCID$_i$ plotted in FIG. 14 showed a monotonically decreasing NCID$_i$.

Tables 10a and 10b summarized the solution process conditions used to manufacture Examples 10 and 11; and the resulting physical characteristics were summarized in Table 16. Example 10 was a dual reactor and dual catalyst ethylene/1-octene interpolymer product containing: about 50% of a component A produced in a first reactor (R1) using a bridged metallocene catalyst formulation, and; about 50% of a component B produced in a second reactor (R2) using an in-line intermediate branching catalyst formulation that produced intermediate branching. Example 10 was produced with R1 and R2 operated in series mode. Example 11 was a dual reactor and dual catalyst ethylene/1-octene interpolymer product containing: about 60% of a component A produced in a first reactor (R1) using a bridged metallocene catalyst formulation, and; about 40% of a component B produced in a second reactor (R2) using and an in-line intermediate branching catalyst formulation that produced intermediate branching. Example 11 was manufactured with R1 and R2 operated in parallel mode.

Table 17 summarized 3D-CFC analysis of Example 10. Example 10 was fractionated into nine 3D-CFC TREF fractions; fraction 1 (1) collected from 30° C. to 50° C. was 0.0812 weight fraction (wt.fr.)$^1$. Fraction F1 had a weight average molecular weight ($M_w$) of 98,300 g/mol, a viscosity average molecular weight ($M_v$) of 93,200 g/mol, an intrinsic viscosity [η] of 1.23 dL/g, the amount of short chain branching (SCB$^f$) was 33.60 CH$_3$/1000C and the Non-Comonomer Index value of Fraction 1 (NCI$^1$) was 0.961. The NCID$_i$ of Example 10 was plotted in FIG. 15, as well as the molecular weight distributions of nine 3D-CFC TREF fractions and cumulative (overall) molecular weight distribution. Component B in Example 10 contained intermediate branching produced by an in-line intermediate branching catalyst formulation. The shape of the NCID$_i$ in FIG. 15 reflected the following facts: (1) component B's intermediate branching reduced NCID$_i^B$ values monotonically as Log(Molar Mass) increased as shown in FIG. 5 and the $$\frac{dNCID_i}{d\log M_i}$$

of component B was ≤−0.0001 as shown in FIG. 6, and; (2) component A contained long chain branching and had a constant NCID$_i^A$ and the $$\frac{dNCID_i}{d\log M_i}$$

of component A was zero, or >−0.0001. These facts were supported by FIG. 16. FIG. 16 illustrated a simulation of Example 10 showing the NCID$_i$ distribution of a binary blend of: i) 50 wt % of long chain branched component A having a constant NCID$_i^A$ of 0.970, and, ii) 50 wt % component B having a NCID$_i^B$ defined by Eq. (3), where β$_0$, β$_1$, β$_2$, and β$_3$ were 1.0100, −0.0001, 0.0001 and −0.0011, respectively, and M$_o$ was 60000; component B was also characterized by $$\frac{dNCID_i}{d\log M_i} \text{ values} \leq -0.0001.$$

The computer simulation was a reasonable representation of Example 10 as evidenced by the similarity between the experimentally measured NCID$_i$ values (long dash curve) and the simulated NCID$_i$ values (dotted curve) in FIG. 16.

The 3D-CFC analysis of Example 11 is summarized in Table 18 and FIG. 17. Example 11 was produced in parallel reactor mode and contained about 40 wt % of a component A and about 60 wt % of a component B. The shape of Example 11's NCID$_i$ (FIG. 17) reflected intermediate branching in component B and long chain branching in component A.

Comparatives 7 and 8 were dual reactor products produced using the solution pilot plant (disclosed herein) employing the bridged metallocene catalyst formulation comprising diphenylmethylene (cyclopentadienyl) (2,7-di-t-butylfuorenyl) hafnium dimethyl in both reactors. Similar to Comparative 5 (FIG. 9 and Table 9), the NCID$_i$ values of Comparatives 7 and 8 were best represented by one parameter (i.e. the mean, 0.954 and 0.929, respectively) intercept models; thus Comparative 7 and Comparative 8 had $$\frac{dNCID_i}{d\log M_i}$$

values of zero.

Long Chain Branching Factor (LCBF)

The Long Chain Branching Factor, hereinafter LCBF, was used to quantify the amount of Long Chain Branching (LCB) in ethylene/α-olefin interpolymers. Some embodiments of the disclosed ethylene/α-olefin interpolymer products did not contain LCB (or an undetectable level of LCB).

Other embodiments of the disclosed ethylene/α-olefin interpolymer products contained LCB.

LCB is a structural phenomenon in polyethylenes and well-known to those of ordinary skill. In this disclosure, a long chain branch was equal to, or greater than, the entanglement molecular weight, $M_e$. $M_e$ is a well-known concept in polymer physics (e.g. reported to be about 1 kg/mol for polyethylenes, see Fetters et al., Macromolecules 1999, 32, 6847). In this disclosure, long chain branches were characterized as 'rheologically active'; the term rheologically active means the presence of long chain branches in a sample was evident after comparing rheological test results with a comparative sample that did not contain long chain branches. Non-limiting examples of rheological test results include, flow activation energy (Eact), shear thinning or viscosity ratios, melt flow ratios ($I_{21}/I_2$, $I_{10}/I_2$, etc.), melt strength and long chain branching factor (LCBF), etc.

Typically, in the art, three methods have been used for LCB analysis, i.e.: nuclear magnetic resonance spectroscopy (NMR), for example see J. C. Randall, J Macromol. Sci., Rev. Macromol. Chem. Phys. 1989, 29, 201; triple detection SEC equipped with a DRI, a viscometer and a low-angle laser light scattering detector, for example see W. W. Yau and D. R. Hill, Int. J. Polym. Anal. Charact. 1996; 2:151; and rheology, for example see W. W. Graessley, Acc. Chem. Res. 1977, 10, 332-339.

A limitation with LCB analysis via NMR is that it cannot distinguish branch length for branches equal to or longer than six carbon atoms (thus, NMR cannot be used to characterize LCB in ethylene/1-octene copolymers, which have hexyl groups as side branches).

The triple detection SEC method measures the intrinsic viscosity ([q]) (see W. W. Yau, D. Gillespie, Analytical and Polymer Science, TAPPI Polymers, Laminations, and Coatings Conference Proceedings, Chicago 2000; 2: 699 or F. Beer, G. Capaccio, L. J. Rose, J. Appl. Polym. Sci. 1999, 73: 2807 or P. M. Wood-Adams, J. M. Dealy, A. W. deGroot, O. D. Redwine, Macromolecules 2000; 33: 7489). By referencing the intrinsic viscosity of a branched polymer ($[\eta]_b$) to that of a linear one ($[\eta]_l$), at the same molecular weight, the viscosity branching index factor g' (g'=$[\eta]_b/[\eta]_l$) was used for branching characterization. However, both short chain branching (SCB) and long chain branching (LCB) make contribution to the intrinsic viscosity ([η]), effort was made to isolate the SCB contribution for ethylene/1-butene and ethylene/1-hexene copolymers but not ethylene/1-octene copolymers (see Lue et al., U.S. Pat. No. 6,870,010). In this disclosure, a systematical investigation was performed to look at the SCB impact on the Mark-Houwink constant K for three types of ethylene/1-olefin interpolymers, i.e. octene, hexene and butene interpolymers. After correction for SCB, triple detection SEC data was used to calculate the Long Chain Branching Factor (LCBF).

In the art, rheology has been an effective method to measure the amount of LCB, or lack of, in ethylene interpolymers. Several rheological methods to quantify LCB have been disclosed. One commonly-used method was based on zero-shear viscosity ($\eta_0$) and weight average molar mass ($M_w$) data. The 3.41 power dependence ($\eta_0=K \times M_w^{3.41}$) has been established for monodisperse polyethylene solely composed of linear chains, for example see R. L. Arnett and C. P. Thomas, J. Phys. Chem. 1980, 84, 649-652. An ethylene polymer with a $\eta_0$ exceeding what was expected for a linear ethylene polymer, with the same $M_w$, was considered to contain long-chain branches. However, there is a debate in the field regarding the influence of polydispersity, e.g. $M_w/M_n$. A dependence on polydispersity was observed in some cases (see M. Ansari et al., Rheol. Acta, 2011, 5017-27) but not in others (see T. P. Karjala et al., Journal of Applied Polymer Science 2011, 636-646).

Another example of LCB analysis via rheology was based on zero-shear viscosity ($\eta_0$) and intrinsic viscosity ([η]) data, for example see R. N. Shroff and H. Mavridis, Macromolecules 1999, 32, 8454; which is applicable for essentially linear polyethylenes (i.e. polyethylenes with very low levels of LCB). A limitation of this method is the contribution of the SCB to the intrinsic viscosity. It is well known that [η] decreases with increasing SCB content.

In this disclosure, a systematical investigation was performed to look at the impact of both SCB and molar mass distribution on LCB characterization. After the deduction of the contribution of both SCB and molar mass distribution (polydispersity), a Long Chain Branching Factor (LCBF) was introduced to characterize the amount of LCB in ethylene/α-olefin interpolymers, as described in the following paragraphs.

FIG. 18 illustrated the calculation of LCBF. The solid 'Linear Reference Line' shown in FIG. 18 characterized ethylene/α-olefin interpolymers that did not contain LCB (or undetectable LCB). Ethylene/α-olefin interpolymers containing LCB deviate from this Reference Line. For example, Example 10 and Comparatives 4, 5 and 6 deviated horizontally and vertically from the Reference Line.

LCBF calculation requires the polydispersity corrected Zero Shear Viscosity ($ZSV_c$) and the SCB corrected Intrinsic Viscosity ($IV_c$).

The correction to the Zero Shear Viscosity, $ZSV_c$, having dimensions of poise, was performed as shown in equation Eq. (10), $$ZSV_c = \frac{1.8389 \times \eta_0}{2.4110^{Ln(Pd)}} \qquad \text{Eq. (10)}$$

where $\eta_0$, the zero shear viscosity (poise), was measured by DMA as described in the Testing Methods section of this disclosure; Pd was the dimensionless polydispersity (i.e. $M_w/M_n$) as measured using conventional SEC (see Testing Methods) and 1.8389 and 2.4110 are dimensionless constants.

The correction to the Intrinsic Viscosity, $IV_0$, having dimensions of dL/g, was performed as shown in equation Eq. (11), $$IV_c = [\eta] + \frac{A \times SCB \times M_v^{0.725}}{1000000} \qquad \text{Eq. (11)}$$

where the intrinsic viscosity [q] (dL/g) was measured using 3D-SEC (see Testing Methods); SCB having dimensions of ($CH_3\#/1000C$) was determined using FTIR (see Testing Methods), and; $M_v$, the viscosity average molar mass (g/mole), was determined using 3D-SEC (see Testing Methods). The comonomer dependent constant A was defined above. In the case of an ethylene homopolymer no correction is required for the Mark-Houwink constant, i.e. SCB is zero.

As shown in FIG. 18, linear ethylene/α-olefin interpolymers (which do not contain LCB or undetectable levels of LCB) fall on the Reference Line, e.g. Examples 1, 4 and 5 and Comparatives 1 and 3, as defined by Eq. (12).

$$Log(IV_c)=0.2100 \times Log(ZSV_c)-0.7879 \qquad \text{Eq. (12)}$$

Tables 19a and 19b disclosed Reference Resins having $M_w/M_n$ (Pd) values that ranged from 1.68 to 9.23 containing 1-octene, 1-hexene or 1-butene α-olefins. Reference Resins included ethylene interpolymers produced in solution, gas phase or slurry processes with comparative Ziegler-Natta, homogeneous and mixed (comparative Ziegler-Natta+homogeneous) catalyst formulations. Reference resins, having no LCB (or undetectable LCB), were characterized by LCBF values less than 0.001 (dimensionless), as supported by the LCBF values reported in Table 19b where LCBF values ranged from 0.000426 to 1.47×10$^{-9}$.

As shown in FIG. 18, the calculation of the LCBF was based on the Horizontal-Shift ($S_h$) and Vertical-Shift ($S_v$) from the linear reference line, as defined by the following equations:

$$S_h = \text{Log}(ZSV_c) - 4.7619 \times \text{Log}(IV_c) - 3.7519 \quad \text{Eq. (13)}$$

$$S_v = 0.2100 \times \text{Log}(ZSV_c) - \text{Log}(IV_c) - 0.7879 \quad \text{Eq. (14)}$$

In Eq. (13) and Eq. (14), it was required that $ZSV_c$ and $IV_c$ have dimensions of poise and dL/g, respectively. The Horizontal-Shift ($S_h$) was a shift in $ZSV_c$ at constant Intrinsic Viscosity ($IV_c$), if one removes the Log function its physical meaning is apparent, i.e. a ratio of two Zero Shear Viscosities, the $ZSV_c$ of the sample under test relative to the $ZSV_c$ of a linear ethylene polymer having the same $IV_c$. The Horizontal-Shift ($S_h$) was dimensionless. The Vertical-Shift ($S_v$) was a shift in $IV_c$ at constant Zero Shear Viscosity ($ZSV_c$), if one removes the Log function its physical meaning is apparent, i.e. a ratio of two Intrinsic Viscosities, the $IV_c$ of a linear ethylene polymer having the same $ZSV_c$ relative to the $IV_c$ of the sample under test. The Vertical-Shift ($S_v$) was dimensionless.

In this disclosure a dimensionless Long Chain Branching Factor (LCBF) was defined by Eq. (15):

$$LCBF = \frac{S_h \times S_v}{2} \quad \text{Eq. (15)}$$

Given the data in Table 20 the LCBF of Examples 1, 4, 5-7, 10 and 11 were calculated. To be more clear: the $S_h$ and $S_v$ of Example 1 were −0.0487 and −0.0102, respectively, thus the LCBF was 0.000249 ((−0.0487 x −0.0102)/2), i.e. Example 1 did not contain LCB; in contrast, Examples 10 and 11 contained LCB given the LCBF values of 0.0291 and 0.0205, respectively.

Examples 1 and 4-7, having LCBF values less than 0.001, did not contain LCB (or undetectable LCB); but did contain intermediate branching (as discussed above). FIG. 18 showed Examples 1, 4 and 5 falling on the Reference Line defined by Eq. (12), i.e. no LCB. Examples 1 and 4 were manufactured as disclosed in Tables 1a and 1b using embodiments of an intermediate branching catalyst formulation; physical characteristics of Examples 1 and 4 were disclosed in Table 2.

Examples 5-7 contained two components: component A was produced in a first reactor using an unbridged single site catalyst formulation that produced interpolymer that did not contain LCB or intermediate branching, and; component B was produced in a second reactor using an in-line intermediate branching catalyst formulation that produced interpolymer that did not contain LCB but did contain intermediate branching. The solution process conditions required to manufacture Example 5 were summarized in Tables 10a and 10b and the physical characteristics were summarized in Table 11.

As shown in Table 20, Examples 10 and 11 contained LCB as evidenced by LCBF values of 0.0291 and 0.0205, respectively; i.e. LCBF ≥0.001. FIG. 18 showed the significant deviation of Example 10 from the Linear Reference Line. Examples 10 and 11 contained two components: LCB containing component A was produced in a first reactor employing a bridged metallocene catalyst formulation; and; component B was produced in a second reactor using an in-line intermediate branching catalyst formulation producing an interpolymer that did not contain LCB but did contain intermediate branching. The solution process conditions required to manufacture Examples 10 and 11 were summarized in Tables 10a and 10b and physical characteristics were summarized in Table 16.

As shown in Table 21, Comparatives 1 and 3 did not contain LCB (LCBF was <0.001). Comparatives 1 and 3 did not contain intermediate branching. Comparative 1 was produced in a solution process using a comparative batch Ziegler-Natta catalyst formulation, physical properties were summarized in Table 2. Comparative 3 was produced in a solution process using an unbridged single site catalyst formulation; physical properties were summarized in Table 7.

As evidenced by the LCBF values shown in Table 21, Comparatives 4 through 8 contained LCB. To be more clear: Comparative 4 contained LCB as evidenced by the LCBF value of 0.0406 disclosed in Table 21 (LCBF ≥0.001), as well as the significant deviation from the Linear Reference Line shown in FIG. 18. Comparative 4 was an ethylene/1-octene copolymer produced in a solution polymerization process employing a constrained geometry catalyst; physical characteristics were summarized in Table 7. Comparative 5 contained LCB as evidenced by the LCBF value of 0.0563. Comparative 5 was an ethylene/1-octene copolymer produced in the solution pilot plant (disclosed herein) employing a bridged metallocene catalyst formulation; physical characteristics were disclosed in Table 7.

Comparative 6 was a competitive ethylene/1-octene interpolymer produced in a dual reactor solution process. Comparative 6 contained two components: long chain branched component A was produced in a first reactor using a constrained geometry catalyst formulation, and; component B was produced in a second reactor using a comparative batch ZN catalyst formulation that produced an interpolymer that did not contain LCB or intermediate branching. Comparative 6 contained LCB as evidenced by the LCBF value of 0.00883 disclosed in Table 21 (LCBF ≥0.001). Further: component A in Comparative 6 was believed to be produced by the same constrained geometry catalyst that was used to manufacture Comparative 4 (Comparative 4 contained LCB), and; component B in Comparative 6 was believed to be produced by the same comparative batch ZN catalyst formulation used to manufacture Comparative 1 (Comparative 1 did not contain LCB or intermediate branching). The physical characteristics of Comparative 6 were summarized in Table 11.

Comparatives 7 and 8 were dual reactor products produced using the solution pilot plant (disclosed herein) and the same catalyst formulation was employed in both reactors; more specifically, the bridged metallocene catalyst formulation, containing diphenylmethylene (cyclopentadienyl) (2,7-di-t-butylfuorenyl) hafnium dimethyl, was injected into both reactors 1 and 2. As shown in Table 21, Comparatives 7 and 8 contained long chain branching, i.e. the dimensionless LCBF was 0.0438 and 0.0541, respectively. The physical characteristics of Comparatives 7 and 8 were summarized in Table 16, these interpolymers had a melt index (12) of about 1.0 dg/min; polydispersities ($M_w/M_n$) were 3.32 and 2.51, respectively.

In this disclosure, resins having LCB were characterized by a LCBF of 0.001 (dimensionless); and resins having no LCB (or undetectable LCB) were characterized by a LCBF of less than 0.001.

Solution Polymerization Process

Non-limiting embodiments of continuous solution polymerization processes wherein ethylene interpolymer products having intermediate branching may be produced are shown in FIGS. 19 and 20. These Figures are not to be construed as limiting, it being understood that embodiments are not limited to the precise arrangement of, or number of, vessels shown.

Intermediate Branching Catalyst Formulations

Embodiments are described where an in-line intermediate branching catalyst formulation and a batch intermediate branching catalyst formation were used. The term 'in-line' referred to the continuous synthesis of a small quantity of catalyst and immediately injecting this catalyst into at least one continuously operating reactor wherein an ethylene interpolymer was formed. The terms 'batch' referred to the synthesis of a much larger quantity of catalyst or procatalyst in one or more mixing vessels that are external to, or isolated from, the continuously operating solution polymerization process. Once prepared, the batch catalyst formulation, or batch procatalyst, was transferred to a catalyst storage tank. The term 'procatalyst' referred to an inactive catalyst formulation (inactive with respect to ethylene polymerization); procatalyst was converted to an active catalyst by adding an alkyl aluminum co-catalyst. As needed, the procatalyst was pumped from the storage tank to at least one continuously operating reactor wherein an ethylene interpolymer was formed. The procatalyst may be converted into an active catalyst in the reactor or external to the reactor.

As described in the following paragraph a wide variety of chemical compounds can be used to synthesize an in-line intermediate branching catalyst formulation; it being understood that disclosed embodiments were not limited to the specific chemical compounds disclosed.

An in-line intermediate branching catalyst formulation may be formed from: component (v), a magnesium compound; component (vi), a chloride compound; component (vii), a metal compound; component (viii), an alkyl aluminum co-catalyst; and component (ix), an aluminum alkyl. A non-limiting example of an intermediate branching catalyst formulation may be prepared as follows. In the first step, a solution of a magnesium compound (component (v)) was reacted with a solution of chloride compound (component (vi)) forming a magnesium chloride support suspended in solution. Non-limiting examples of magnesium compounds included $Mg(R^1)_2$; wherein the $R^1$ groups may be the same or different, linear, branched or cyclic hydrocarbyl radicals containing 1 to 10 carbon atoms. Non-limiting examples of chloride compounds include $R^2Cl$; where $R^2$ represents a hydrogen atom, or a linear, branched or cyclic hydrocarbyl radical containing 1 to 10 carbon atoms. In the first step, the solution of magnesium compound may also contain an aluminum alkyl (component (ix)). Non-limiting examples of aluminum alkyl include $Al(R^3)_3$, wherein the $R^3$ groups may be the same or different, linear, branched or cyclic hydrocarbyl radicals containing from 1 to 10 carbon atoms. In the second step a solution of the metal compound (component (vii)) was added to the solution of magnesium chloride and the metal compound was supported on the magnesium chloride. Non-limiting examples of suitable metal compounds included $M(X)_n$ or $MO(X)_n$; where M represents a metal selected from Group 4 through Group 8 of the Periodic Table, or mixtures of metals selected from Group 4 through Group 8; O represents oxygen, and; X represents chloride or bromide; n is an integer from 3 to 6 that satisfies the oxidation state of the metal. Additional non-limiting examples of suitable metal compounds include Group 4 to Group 8 metal alkyls, metal alkoxides (which may be prepared by reacting a metal alkyl with an alcohol) and mixed-ligand metal compounds that contain a mixture of halide, alkyl and alkoxide ligands. In the third step a solution of an alkyl aluminum co-catalyst (component (viii)) was added to the metal compound supported on the magnesium chloride. A wide variety of alkyl aluminum co-catalysts were suitable, as expressed by Formula (I):

$$Al(R^4)_p(OR^5)_q(X)_r \qquad (I)$$

wherein $R^4$ groups may be the same or different, hydrocarbyl groups having from 1 to 10 carbon atoms; $OR^5$ groups may be the same or different, alkoxy or aryloxy groups wherein $R^5$ is a hydrocarbyl group having from 1 to 10 carbon atoms bonded to oxygen; X is chloride or bromide, and; (p+q+r)=3, with the proviso that p is greater than 0. Non-limiting examples of suitable alkyl aluminum co-catalysts include trimethyl aluminum, triethyl aluminum, tributyl aluminum, dimethyl aluminum methoxide, diethyl aluminum ethoxide, dibutyl aluminum butoxide, dimethyl aluminum chloride or bromide, diethyl aluminum chloride or bromide, dibutyl aluminum chloride or bromide and ethyl aluminum dichloride or dibromide. Further, to produce a highly active in-line intermediate branching catalyst formulation the quantity and mole ratios of components (v) through (ix) were optimized as described below; where the term 'highly active' means the catalyst formulation was very efficient in converting olefins to an ethylene interpolymer having intermediate branching, i.e. maximizing the following ratio: (pounds of ethylene interpolymer product produced) per (pounds of catalyst consumed).

In-line intermediate branching catalyst formulation synthesis may be carried out in a variety of solvents; non-limiting examples of solvents include linear or branched $C_5$ to $C_{12}$ alkanes or mixtures thereof.

A batch intermediate branching procatalyst may be prepared by sequentially added the following components to a stirred mixing vessel: (a) a solution of a magnesium compound (component (v)); (b) a solution of a chloride compound (component (vi)); (c) optionally a solution of an aluminum alkyl halide, and; (d) a solution of a metal compound (component (vii)). Suitable, non-limiting examples of aluminum alkyl halides are defined by the formula $(R^6)_vAlX_{3-v}$; where $R^6$ groups may be the same or different hydrocarbyl group having from 1 to 10 carbon atoms, X represents chloride or bromide, and; v is 1 or 2. Suitable, non-limiting examples of the magnesium compound, the chloride compound and the metal compound were described earlier in this disclosure. Suitable solvents within which to prepare the procatalyst include linear or branched $C_5$ to $C_{12}$ alkanes or mixtures thereof.

Individual mixing times and mixing temperatures may be used in each of steps (a) through (d). The upper limit on mixing temperatures for steps (a) through (d) in some case may be 160° C., in other cases 130° C. and in still other cases 100° C. The lower limit on mixing temperatures for steps (a) through (d) in some cases may be 10° C., in other cases 20° C. and in still other cases 30° C. The upper limit on mixing time for steps (a) through (d) in some case may be 6 hours, in other cases 3 hours and in still other cases 1 hour. The lower limit on mixing times for steps (a) through (d) in some cases may be 1 minute, in other cases 10 minutes and in still other cases 30 minutes.

Batch intermediate branching procatalyst formulations can have various catalyst component mole ratios. The upper limit on the (chloride compound)/(magnesium compound) molar ratio in some cases may be about 3, in other cases about 2.7 and is still other cases about 2.5; the lower limit in some cases may be about 2.0, in other cases about 2.1 and in still other cases about 2.2. The upper limit on the (magnesium compound)/(metal compound) molar ratio in some cases may be about 10, in other cases about 9 and in still other cases about 8; the lower limit in some cases may be about 5, in other cases about 6 and in still other cases about 7. The upper limit on the (aluminum alkyl halide)/(magnesium compound) molar ratio in some cases may be about 0.5, in other cases about 0.4 and in still other cases about 0.3; the lower limit in some cases may be 0, in other cases about 0.1 and in still other cases about 0.2. A batch intermediate branching catalyst formulation was formed when the procatalyst was combined with an alkyl aluminum co-catalyst. Suitable co-catalysts were described earlier in this disclosure. The procatalyst may be activated external to the reactor or in the reactor; in the latter case, the procatalyst and an effective amount of alkyl aluminum co-catalyst were independently injected at least one reactor.

Homogeneous Catalyst Formulations

This disclosure is not limited to any specific genus of bulky ligand-metal complex; rather, a wide variety of bulky ligand-metal complexes may be used to form a homogeneous ethylene interpolymer that may comprise a portion of the ethylene interpolymer product having intermediate branching. Homogeneous catalyst formulations produce a homogeneous ethylene interpolymer characterized by a narrow molecular weight distribution ($M_w/M_n$<2.8), a narrow comonomer distribution ($CDBI_{50}$>70%) and devoid of intermediate branching. The following paragraphs disclose two examples of homogeneous catalyst formulations; specifically, an unbridged single site catalyst formulation and a bridged metallocene catalyst formulation; these examples are not to be construed as limiting.

The unbridged single site catalyst formulation employed the following bulky ligand-metal complex Formula (II);

(II)

wherein ($L^A$) represents a bulky ligand; M represents a metal atom; Pl represents a phosphinimine ligand; Q represents a leaving group; a is 0 or 1; b is 1 or 2; (a+b)=2; n is 1 or 2, and; the sum of (a+b+n) equals the valance of the metal M.

Non-limiting examples of the bulky ligand $L^A$ in Formula (II) include unsubstituted or substituted cyclopentadienyl ligands or cyclopentadienyl-type ligands, heteroatom substituted and/or heteroatom containing cyclopentadienyl-type ligands. Additional non-limiting examples include, cyclopentaphenanthreneyl ligands, unsubstituted or substituted indenyl ligands, benzindenyl ligands, unsubstituted or substituted fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine, pyrrolyl ligands, pyrozolyl ligands, carbazolyl ligands, borabenzene ligands and the like, including hydrogenated versions thereof, for example tetrahydroindenyl ligands. In other embodiments, $L^A$ may be any other ligand structure capable of q-bonding to the metal M, such embodiments include both $\eta^3$-bonding and $\eta^5$-bonding to the metal M. In other embodiments, $L^A$ may comprise one or more heteroatoms, for example, nitrogen, silicon, boron, germanium, sulfur and phosphorous, in combination with carbon atoms to form an open, acyclic, or a fused ring, or ring system, for example, a heterocyclopentadienyl ancillary ligand. Other non-limiting embodiments for $L^A$ include bulky amides, phosphides, alkoxides, aryloxides, imides, carbolides, borollides, porphyrins, phthalocyanines, corrins and other polyazomacrocycles.

Non-limiting examples of metal M in Formula (II) include Group 4 metals, titanium, zirconium and hafnium.

The 'leaving group' Q in Formula (II) is any ligand that can be abstracted forming a catalyst species capable of polymerizing one or more olefin(s). An equivalent term for Q is an 'activatable ligand', i.e. equivalent to the term "leaving group". In some embodiments, Q is a monoanionic labile ligand having a sigma bond to M. Depending on the oxidation state of the metal, the value for n is 1 or 2 such that Formula (II) represents a neutral bulky ligand-metal complex. Non-limiting examples of Q ligands include a hydrogen atom, halogens, $C_{1-20}$ hydrocarbyl radicals, $C_{1-20}$ alkoxy radicals, $C_{5-10}$ aryl oxide radicals; these radicals may be linear, branched or cyclic or further substituted by halogen atoms, $C_{1-10}$ alkyl radicals, $C_{1-10}$ alkoxy radicals, $C_{6-10}$ aryl or aryloxy radicals. Further non-limiting examples of Q ligands include weak bases such as amines, phosphines, ethers, carboxylates, dienes, hydrocarbyl radicals having from 1 to 20 carbon atoms. In another embodiment, two Q ligands may form part of a fused ring or ring system.

The phosphinimine ligand, Pl, is defined by Formula (III):

(III)

wherein the RP groups are independently selected from: a hydrogen atom; a halogen atom; $C_{1-20}$ hydrocarbyl radicals which are unsubstituted or substituted with one or more halogen atom(s); a $C_{1-20}$ alkoxy radical; a $C_{6-10}$ aryl radical; a $C_{6-10}$ aryloxy radical; an amido radical; a silyl radical of formula —Si($R^s$)$_3$, wherein the $R^s$ groups are independently selected from, a hydrogen atom, a $C_{1-8}$ alkyl or alkoxy radical, a $C_{6-10}$ aryl radical, a $C_{6-10}$ aryloxy radical, or a germanyl radical of formula —Ge($R^G$)$_3$, wherein the $R^G$ groups are defined as $R^s$ is defined in this paragraph.

Further embodiments of Formula (II) include structural, optical or enantiomeric isomers (meso and racemic isomers) and mixtures thereof. While not to be construed as limiting, the species of Formula (II) employed in this disclosure was cyclopentadienyl tri(tertiary butyl)phosphinimine titanium dichloride, (Cp[(t-Bu)$_3$PN]TiCl$_2$); abbreviated PIC-1 in this disclosure.

The non-limiting example of the bridged metallocene catalyst formulation employed in this disclosure employed the following bulky ligand-metal complex Formula (IV);

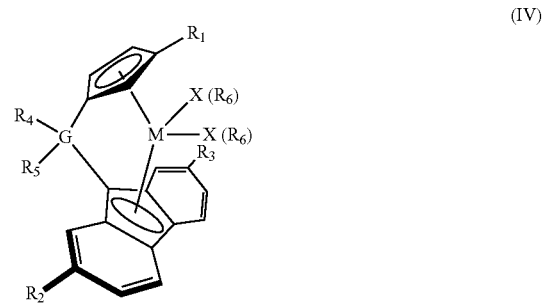

(IV)

In Formula (IV): non-limiting examples of M include Group 4 metals, i.e. titanium, zirconium and hafnium; non-limiting examples of G include Group 14 elements, carbon, silicon, germanium, tin and lead; X represents a halogen atom, fluorine, chlorine, bromine or iodine; the $R^6$ groups are independently selected from a hydrogen atom, a $C_{1-20}$ hydrocarbyl radical, a $C_{1-20}$ alkoxy radical or a $C_{6-10}$ aryl oxide radical (these radicals may be linear, branched or cyclic or further substituted with halogen atoms, $C_{1-10}$ alkyl radicals, $C_{1-10}$ alkoxy radicals, $C_{6-10}$ aryl or aryloxy radicals); $R_1$ represents a hydrogen atom, a $C_{1-20}$ hydrocarbyl radical, a $C_{1-20}$ alkoxy radical, a $C_{6-10}$ aryl oxide radical or alkylsilyl radicals containing at least one silicon atom and $C_{3-30}$ carbon atoms; $R^2$ and $R^3$ are independently selected from a hydrogen atom, a $C_{1-20}$ hydrocarbyl radical, a $C_{1-20}$ alkoxy radical, a $C_{6-10}$ aryl oxide radical or alkylsilyl radicals containing at least one silicon atom and $C_{3-30}$ carbon atoms, and; $R^4$ and $R^5$ are independently selected from a hydrogen atom, a $C_{1-20}$ hydrocarbyl radical, a $C_{1-20}$ alkoxy radical a $C_{6-10}$ aryl oxide radical, or alkylsilyl radicals containing at least one silicon atom and $C_{3-30}$ carbon atoms.

In Formula (IV) the $X(R^6)$ group was a 'leaving group' or 'activatable ligand'; as described above in Formula (II), i.e. equivalent to the group Q illustrated in Formula (II).

Further embodiments of Formula (IV) include structural, optical or enantiomeric isomers (meso and racemic isomers) and mixtures thereof. While not to be construed as limiting, the species of Formula (IV) employed in this disclosure was diphenylmethylene(cyclopentadienyl)(2,7-di-t-butylfuorenyl)hafnium dimethyl, [(2,7-tBu$_2$Flu)Ph$_2$C(Cp)HfMe$_2$]; abbreviated CpF-2 in this disclosure.

The catalyst components required to fabricate a homogeneous catalyst formulation are not particularly limited, i.e. a wide variety of catalyst components can be used. One non-limiting example of a homogeneous catalyst formulation comprises the following components: component (i), a bulky ligand-metal complex; component (ii), an alumoxane co-catalyst; 'component (iii), an ionic activator; and optionally component (iv), a hindered phenol. In this disclosure: if a species of Formula (II) was employed as component (i) an unbridged single site catalyst formulation results; in contrast, if a species of Formula (IV) was employed as component (i) a bridged metallocene catalyst formulation results.

A non-limiting example of component (ii) in the homogeneous catalyst formulation was an alumoxane co-catalyst that activates component (i) to a cationic complex. An equivalent term for "alumoxane" is "aluminoxane"; although the exact structure of this co-catalyst is uncertain, subject matter experts generally agree that it is an oligomeric species that contain repeating units of the general Formula (V):

(R)$_2$AlO—(Al(R)—O)$_n$—Al(R)$_2$  (V)

where the R groups may be the same or different linear, branched or cyclic hydrocarbyl radicals containing 1 to 20 carbon atoms and n is from 0 to about 50. A non-limiting example of an alumoxane is methyl aluminoxane (or MAO) wherein each R group in formula (V) is a methyl radical.

A non-limiting example of component (iii) of the homogeneous catalyst formulation was an ionic activator. In general, ionic activators are comprised of a cation and a bulky anion; wherein the latter is substantially non-coordinating. Non-limiting examples of ionic activators are boron ionic activators that are four coordinate with four ligands bonded to the boron atom. Non-limiting examples of boron ionic activators include the following Formulas (VI) and (VII) shown below;

[R$^5$]$^+$[B(R$^7$)$_4$$^-$]  (VI)

where B represents a boron atom, $R^5$ is an aromatic hydrocarbyl (e.g. triphenyl methyl cation) and each $R^7$ is independently selected from phenyl radicals which are unsubstituted or substituted with from 3 to 5 substituents selected from fluorine atoms, $C_{1-4}$ alkyl or alkoxy radicals which are unsubstituted or substituted by fluorine atoms; and a silyl radical of formula —Si(R$^9$)$_3$, where each $R^9$ is independently selected from hydrogen atoms and $C_{1-4}$ alkyl radicals, and; compounds of Formula (VII);

[(R$^8$)$_t$ZH]$^+$[B(R$^7$)$_4$]$^-$  (VII)

where B is a boron atom, H is a hydrogen atom, Z is a nitrogen or phosphorus atom, t is 2 or 3 and $R^8$ is selected from $C_{1-8}$ alkyl radicals, phenyl radicals which are unsubstituted or substituted by up to three $C_{1-4}$ alkyl radicals, or one $R^a$ taken together with the nitrogen atom may form an anilinium radical and $R^7$ is as defined above in Formula (VI).

In both Formula (VI) and (VII), a non-limiting example of $R^7$ is a pentafluorophenyl radical. In general, boron ionic activators may be described as salts of tetra(perfluorophenyl) boron; non-limiting examples include anilinium, carbonium, oxonium, phosphonium and sulfonium salts of tetra(perfluorophenyl)boron with anilinium and trityl (or triphenylmethylium). Additional non-limiting examples of ionic activators include: triethylammonium tetra(phenyl) boron, tripropylammonium tetra(phenyl)boron, tri(n-butyl) ammonium tetra(phenyl)boron, trimethylammonium tetra (p-tolyl)boron, trimethylammonium tetra(o-tolyl)boron, tributylammonium tetra(pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tributylammonium tetra(pentafluorophenyl)boron, tri(n-butyl)ammonium tetra(o-tolyl)boron, N,N-dimethylanilinium tetra(phenyl)boron, N,N-diethylanilinium tetra(phenyl)boron, N,N-diethylanilinium tetra(phenyl)$_n$-butylboron, N,N-2,4,6-pentamethylanilinium tetra(phenyl)boron, di-(isopropyl)ammonium tetra(pentafluorophenyl)boron, dicyclohexylammonium tetra(phenyl)boron, triphenylphosphonium tetra(phenyl)boron, tri(methylphenyl)phosphonium tetra(phenyl)boron, tri(dimethylphenyl)phosphonium tetra(phenyl)boron, tropillium tetrakispentafluorophenyl borate, triphenylmethylium tetrakispentafluorophenyl borate, benzene(diazonium)tetrakispentafluorophenyl borate, tropillium tetrakis(2,3,5,6-tetrafluorophenyl)borate, triphenylmethylium tetrakis(2,3,5,6-tetrafluorophenyl)borate, benzene(diazonium) tetrakis(3,4, 5-trifluorophenyl)borate, tropillium tetrakis(3,4,5-trifluorophenyl)borate, benzene(diazonium) tetrakis(3,4,5-trifluorophenyl)borate, tropillium tetrakis(1,2,2-trifluoroethenyl)borate, triphenylmethylium tetrakis(1,2,2-trifluoroethenyl)borate, benzene(diazonium) tetrakis(1,2,2-trifluoroethenyl)borate, tropillium tetrakis(2,3,4,5-tetrafluorophenyl)borate, triphenylmethylium tetrakis(2,3,4, 5-tetrafluorophenyl)borate, and benzene(diazonium) tetrakis (2,3,4,5 tetrafluorophenyl)borate. Readily available commercial ionic activators include N,N-dimethylanilinium tetrakispentafluorophenyl borate, and triphenylmethylium tetrakispentafluorophenyl borate.

A non-limiting example of optional component (iv) of the homogeneous catalyst formulation was a hindered phenol. Non-limiting example of hindered phenols include butylated phenolic antioxidants, butylated hydroxytoluene, 2,4-di-tertiarybutyl-6-ethyl phenol, 4,4'-methylenebis (2,6-di-tertiary-butylphenol), 1,3,5-trimethyl-2,4,6-tris (3,5-di-tert-butyl-4-hydroxybenzyl) benzene and octadecyl-3-(3',5'-di-tert-butyl-4'-hydroxyphenyl) propionate.

An active homogeneous catalyst formulation was produced by optimizing the proportion of each of the four catalyst components: component (i), component (ii), component (iii) and component (iv). In the case of one reactor (R1), the quantity of component (i) added to the reactor was expressed as the parts per million (ppm) of component (i) in the total mass of reactor solution, i.e. 'R1 (i) catalyst (ppm)' as recited in Table 10a. The upper limit on R1 (i) catalyst (ppm) may be 5 ppm, in some cases 3 ppm and in other cases 2 ppm. The lower limit on R1 (i) catalyst (ppm) may be 0.02 ppm, in some cases 0.05 ppm and in other cases 0.1 ppm. An effective proportion of component (iii) to prepare a homogeneous catalyst formulation was determined by optimizing the [component(iii)]/[(component (i)] molar ratio in the reactor solution, e.g. R1 (iii)/(i) as recited in Table 10a. The upper limit on R1 (iii)/(i) may be 10, in some cases 5 and in other cases 2. The lower limit on R1 (iii)/(i) may be 0.3, in some cases 0.5 and in other cases 1.0. An effective proportion of component (ii) to prepare a homogeneous catalyst formulation was determined by optimizing the [component (ii)]/[component (i)] molar ratio, e.g. R1 (ii)/(i) as recited in Table 10a. Alumoxane was generally added in a molar excess relative to component (i). The upper limit on R1 (ii)/(i) may be 1000, in some cases 500 and is other cases 200. The lower limit on R1 (ii)/(i) may be 1, in some cases and in other cases 30. An effective proportion of component (iv) to prepare a homogeneous catalyst formulation was determined by optimizing the [component (iv)]/[component (ii)] molar ratio, e.g. R1 (iv)/(ii) as recited in Table 10a. The upper limit on R1 (iv)/(ii) may be 1, in some cases 0.75 and in other cases 0.5. The lower limit on R1 (iv)/(ii) may be 0.0, in some cases 0.1 and in other cases 0.2.

In embodiments employing two CSTR's and two homogeneous catalyst assemblies a second bridged metallocene catalyst formulation may be prepared independently of the first bridged metallocene catalyst formulation and optimized as described above. Optionally, a bridged metallocene catalyst formulation may be employed in the tubular reactor and optimized as described above.

Embodiments in this disclosure include the use of one or more homogeneous catalyst formulations in more than one reactor.

Solution Polymerization Process In-Line Catalyst Formulation

FIG. 19 illustrates several embodiments were two or three reactors may be employed to produce an ethylene interpolymer product having intermediate branching. FIG. 19 illustrates a first reactor 11a; in this disclosure an equivalent term for the first reactor was 'R1'. FIG. 19 also showed a second reactor 12a; an equivalent term for the second reactor was 'R2'. R1 was a continuously stirred tank reactor (CSTR) agitated by stirring assembly 11b which includes a motor external to the reactor and an agitator within the reactor. Similarly, R2 was agitated by stirring assembly 12b. FIG. 19 also showed an optional tubular reactor 17; in this disclosure, equivalent terms for the tubular reactor were 'the third reactor' or 'R3'. The third reactor need not be tubular, i.e. a wide variety of reactor designs may be employed. The embodiment shown in FIG. 19 may be used to produce a first ethylene interpolymer in R1, a second ethylene interpolymer in R2 and a third ethylene interpolymer in R3. Optionally, polymerization may be terminated prior to R3; in this case a third ethylene interpolymer was not produced. FIG. 19 illustrates an embodiment where an in-line intermediate branching catalyst formulation was employed in R2 producing a second ethylene interpolymer having intermediate branching. Optionally, the in-line intermediate branching catalyst formulation may also be employed in R3 producing a third ethylene interpolymer having intermediate branching. In an alternative embodiment, a second in-line intermediate branching catalyst formulation may be employed in R3 producing a third ethylene interpolymer having intermediate branching. In an alternative embodiment, a comparative Ziegler-Natta catalyst formulation may be employed in R3 producing a third ethylene interpolymer that did not contain intermediate branching.

In this disclosure, a variety of catalysts may be employed in the first reactor; for example, a homogeneous catalyst formulation, a heterogeneous catalyst formulation, a ZN catalyst formulation or an intermediate branching catalyst formulation; the latter produces a first ethylene interpolymer having intermediate branching.

Not to be construed as limiting, FIG. 19 illustrates an embodiment where a homogeneous catalyst formulation was employed in the first reactor R1. In FIG. 19, process solvent 1, ethylene 2 and α-olefin 3 were combined to produce reactor feed stream RF1 which was injected into reactor 11a, or R1. In FIG. 19 optional streams, or optional embodiments, were denoted with dotted lines. It was not particularly important that combined reactor feed stream RF1 be formed; i.e. reactor feed streams can be combined in all possible combinations, including an embodiment where streams 1 through 3 were independently injected into reactor 11a. Optionally hydrogen may be injected into reactor 11a through stream 4; hydrogen was generally added to control the molecular weight of the first ethylene interpolymer.

FIG. 19 illustrated an embodiment where a homogeneous catalyst formulation was injected into reactor 11a through stream 5e. Homogeneous catalyst component streams 5d, 5c, 5b and optional 5a refer to an ionic activator (component (iii)), a bulky ligand-metal complex (component (i)), an alumoxane co-catalyst (component (ii)) and an optional hindered phenol (component (iv)), respectively. Homogeneous catalyst component streams can be arranged in all possible configurations, including an embodiment where streams 5a through 5d were independently injected into reactor 11a. Each homogeneous catalyst component was dissolved in a catalyst component solvent. Catalyst component solvents, for component (i) through (iv), may be the same or different. Catalyst component solvents were selected such that the combination of catalyst components did not produce a precipitate in any process stream; for example, precipitation of a portion of the homogeneous catalyst formulation in the conduit or stream 5e. The optimization of the homogeneous catalyst formulation was described below. Reactor 11a produced a first exit stream, stream 11c, that contained the first ethylene interpolymer dissolved in process solvent, as well as unreacted ethylene, unreacted α-olefins (if present), unreacted hydrogen (if present), active homogeneous catalyst, deactivated homogeneous catalyst, residual catalyst components and other impurities (if present). Melt index ranges and density ranges of the first ethylene interpolymer produced were described below.

FIG. 19 illustrated embodiments where reactors 11a and 12a can be operated in series or parallel modes. In series mode 100% of stream 11c (a first exit stream) passes through flow controller 11d forming stream 11e which enters reactor 12a. In contrast, in parallel mode 100% of stream 11c passes through flow controller 11f forming stream 11g. Stream 11g by-passes reactor 12a and is combined with stream 12c (the second exit stream) forming stream 12d (the third exit stream).

Fresh reactor feeds were injected into R2, reactor 12a, i.e.; process solvent 6, ethylene 7 and α-olefin 8 were combined to produce reactor feed stream RF2. It was not important that stream RF2 be formed; i.e. reactor feed streams can be combined in all possible combinations, including independently injecting each stream into the reactor. Optionally hydrogen may be injected into reactor 12a through stream 9 to control the molecular weight of the second ethylene interpolymer having intermediate branching.

FIG. 19 illustrated an embodiment where an in-line intermediate branching catalyst formulation (capable of producing a second ethylene interpolymer having intermediate branching) was injected into reactor 12a through stream 10f. The catalyst components that comprised the in-line intermediate branching catalyst formulation were introduced through streams 10a, 10b, 10c and 10d; streams 10a', 10b', 10c' represent streams containing process solvent for diluting the respective catalyst components and controlling stream temperatures. In this disclosure, the term 'a first heterogeneous catalyst assembly', defined by the conduits and flow controllers associated with streams 10a through 10h, was operated as described in this paragraph. The first heterogeneous catalyst assembly produced an in-line intermediate branching catalyst formulation by optimizing feed flow rates, temperatures and the following molar ratios: (aluminum alkyl)/(magnesium compound) or (ix)/(v); (chloride compound)/(magnesium compound) or (vi)/(v); (alkyl aluminum co-catalyst)/(metal compound) or (viii)/(vii), and; (aluminum alkyl)/(metal compound) or (ix)/(vii); as well as the time these compounds have to react and equilibrate. Stream 10a contained a binary blend of a magnesium compound, component (v) and an aluminum alkyl, component (ix), in process solvent. The upper limit on the (aluminum alkyl)/(magnesium compound) molar ratio in stream 10a may be about 70, in some cases about 50 and is other cases about 30. The lower limit on the (aluminum alkyl)/ (magnesium compound) molar ratio may be about 3.0, in some cases about 5.0 and in other cases about 10. Stream 10b contained a solution of a chloride compound, component (vi), in process solvent. Stream 10b (and associated solvent stream 10b') were combined with stream 10a (and associated solvent stream 10a') and the intermixing of these streams produced a magnesium chloride catalyst support. The in-line intermediate branching catalyst formulation was produced by optimizing the (chloride compound)/(magnesium compound) molar ratio. The upper limit on the (chloride compound)/(magnesium compound) molar ratio may be about 4, in some cases about 3.5 and is other cases about 3.0. The lower limit on the (chloride compound)/(magnesium compound) molar ratio may be about 1.0, in some cases about 1.5 and in other cases about 1.9. The time between the addition of the chloride compound and the addition of the metal compound (component (vii)) via stream 10c was controlled; hereafter HUT-1 (the first Hold-Up-Time). HUT-1 was the time for streams 10a and 10b to form a magnesium chloride support and equilibrate. The upper limit on HUT-1 may be about 70 seconds, in some cases about 60 seconds and is other cases about 50 seconds. The lower limit on HUT-1 may be about 5 seconds, in some cases about seconds and in other cases about 20 seconds. HUT-1 was controlled by adjusting the length of the conduit between the combination of streams 10a and 10b and the downstream injection of stream 10c (plus 10c') injection, as well as controlling the flow rates of these streams. The temperature of the solution during HUT-1, i.e. "$T^{HUT-1}$", was controlled; the upper limit on $T^{HUT-1}$ may be about 100° C., in some cases about 90° C. and is other cases about 80° C.; the lower limit on $T^{HUT-1}$ may be about 30° C., in some cases about 40° C. and in other cases about 50° C. Following HUT-1, stream 10c containing component (vii) (and associated solvent stream 10c') was injected into the solution containing the magnesium chloride support. The time between the addition of component (vii) and the addition of the alkyl aluminum co-catalyst, component (viii), via stream 10d was controlled; hereafter HUT-2 (the second Hold-Up-Time). HUT-2 was the time for the magnesium chloride support and the component (vii) in stream 10c to react and equilibrate. The upper limit on HUT-2 may be about 50 seconds, in some cases about 35 seconds and is other cases about 25 seconds. The lower limit on HUT-2 may be about 2 seconds, in some cases about 6 seconds and in other cases about seconds. HUT-2 was controlled by adjusting the length of the conduit between stream 10c (plus 10c') injection and stream 10d injection, as well as controlling the flow rates of these streams. The temperature of the solution during HUT-2, i.e. "$T^{HUT-2}$", was also controlled; the upper limit on $T^{HUT-2}$ may be about 100° C., in some cases about 90° C. and is other cases about 80° C.; the lower limit on $T^{HUT-2}$ may be about 30° C., in some cases about 40° C. and in other cases about 50° C. The quantity of the alkyl aluminum co-catalyst added was optimized to produce an efficient catalyst; this was accomplished by adjusting the (alkyl aluminum, co-catalyst)/(metal compound) molar ratio, or (viii)/(vii) molar ratio. The upper limit on the (alkyl aluminum co-catalyst)/ (metal compound) molar ratio may be about 10, in some cases about 7.5 and is other cases about 6.0. The lower limit on the (alkyl aluminum co-catalyst)/(metal compound) molar ratio may be 0, in some cases about 1.0 and in other cases about 2.0. In addition, the time between the addition of the alkyl aluminum co-catalyst and the injection of the in-line intermediate branching catalyst formulation into reactor 12a via stream 10f was controlled; hereafter HUT-3 (the third Hold-Up-Time). HUT-3 was the time for stream 10d to intermix and equilibrate to form the in-line intermediate branching catalyst formulation. Prior to reactor injection, additional process solvent may be added to stream 10f via stream 10f'. The upper limit on HUT-3 may be about 15 seconds, in some cases about 10 seconds and is other cases about 8 seconds. The lower limit on HUT-3 may be about 0.5 seconds, in some cases about 1 seconds and in other cases about 2 seconds. HUT-3 was controlled by adjusting the length of the conduit between stream 10d injection and the catalyst injection port on reactor 12a, and by controlling the flow rates of associated streams. The R2 catalyst inlet temperature was controlled, the upper limit on R2 catalyst inlet temperature may be about 70° C., in some cases about 60° C. and is other cases about 50° C.; and the lower limit on R2 catalyst inlet temperature may be about 10° C., in some cases about 20° C. and in other cases about 30° C. As shown in FIG. 19, optionally, 100% of stream 10d, the alkyl aluminum co-catalyst, may be injected directly into reactor 12a via stream 10h. Optionally, a portion of stream 10d may be injected directly into reactor 12a via stream 10h and the remaining portion of stream 10d injected into reactor 12a via stream 10f. The quantity of in-line intermediate branching catalyst formulation added to R2 is expressed as the parts-per-million (ppm) of metal compound (component (vii)) in the reactor solution, hereafter "R2 (vii) (ppm)". The upper limit on R2 (vii) (ppm) may be about 10 ppm, in some cases about 8 ppm and in other cases about 6 ppm. The lower limit on R2 (vii) (ppm) in some cases may be about 0.5 ppm, in other cases about 1 ppm and in still other cases about 2 ppm. The (aluminum alkyl)/(metal compound) molar ratio in reactor 12a, or the (ix)/(vii) molar ratio, is also controlled. The upper limit on the (aluminum alkyl)/(metal compound) molar ratio in the reactor may be about 2, in some cases about 1.5 and is other cases about 1.0. The lower limit on the (aluminum alkyl)/(metal compound) molar ratio may be about 0.05, in some cases about 0.075 and in other cases about 0.1. Any combination of the streams employed to prepare and deliver the in-line intermediate branching catalyst formulation to R2 may be heated or cooled, i.e. streams 10a through 10h (including stream 10g (optional R3 delivery) discussed below); in some cases the upper temperature limit of streams 10a through 10g may be about 90° C., in other cases about 80° C. and in still other cases about 70° C. and; in some cases the lower temperature limit may be about 10° C.; in other cases about 20° C. and in still other cases about 30° C.

As shown in FIG. 19, if reactors 11a and 12a were operated in a series mode, the second exit stream 12c contains the second ethylene interpolymer having intermediate branching and the first ethylene interpolymer dissolved in process solvent; as well as unreacted ethylene, unreacted α-olefins (if present), unreacted hydrogen (if present), active catalysts, deactivated catalysts, catalyst components and other impurities (if present). Optionally the second exit stream 12c was deactivated by adding a catalyst deactivator A from catalyst deactivator tank 18A forming a deactivated solution A, stream 12e; in this case, FIG. 19 defaults to a dual reactor solution process. If the second exit stream 12c was not deactivated the second exit stream enters tubular reactor 17. Catalyst deactivator A is discussed below.

If reactors 11a and 12a were operated in parallel mode, the second exit stream 12c contains the second ethylene interpolymer having intermediate branching dissolved in process solvent. The second exit stream 12c was combined with stream 11g forming a third exit stream 12d, the latter contains the second ethylene interpolymer and the first ethylene interpolymer dissolved in process solvent; as well as unreacted ethylene, unreacted α-olefins (if present), unreacted hydrogen (if present), active catalyst, deactivated catalyst, catalyst components and other impurities (if present). Optionally the third exit stream 12d was deactivated by adding catalyst deactivator A from catalyst deactivator tank 18A forming deactivated solution A, stream 12e; in this case, FIG. 19 defaults to a dual reactor solution process. If the third exit stream 12d was not deactivated the third exit stream 12d enters tubular reactor 17.

The term "tubular reactor" was meant to convey its conventional meaning, namely a simple tube; wherein the length/diameter (L/D) ratio is at least 10/1. Optionally, one or more of the following reactor feed streams may be injected into tubular reactor 17; process solvent 13, ethylene 14 and optional α-olefin 15. As shown in FIG. 19, streams 13, 14 and 15 may be combined forming reactor feed stream RF3 and the latter was injected into reactor 17. It is not particularly important that stream RF3 be formed; i.e. reactor feed streams can be combined in all possible combinations. Optionally hydrogen may be injected into reactor 17 through stream 16. Optionally, the in-line intermediate branching catalyst formulation may be injected into reactor 17 via stream 10g; i.e. a portion of the in-line intermediate branching catalyst formulation enters reactor 12a through stream 10f and the remaining portion enters reactor 17 through stream 10g. Although not shown in FIG. 19, an optional process may be the injection of stream 10g upstream of reactor 17.

FIG. 19 shows an optional embodiment where reactor 17 was supplied with a second in-line intermediate branching catalyst formulation produced in a second heterogeneous catalyst assembly. The second heterogeneous catalyst assembly refers to the combination of conduits and flow controllers that include streams 34a-34f and 34h. The chemical composition of the first and second in-line intermediate branching catalyst formulations may be the same, or different. For example, the catalyst components ((v) through (ix)) mole ratios and hold-up-times may differ in the first and second heterogeneous catalyst assemblies. Relative to the first heterogeneous catalyst assembly, the second heterogeneous catalyst assembly was operated in a similar manner, i.e. the second heterogeneous catalyst assembly may be employed to produce a second in-line intermediate branching catalyst formulation capable of producing a third ethylene interpolymer having intermediate branching by optimizing feed flow rates, feed temperatures and the molar ratios of the catalyst components, i.e.: (aluminum alkyl)/(magnesium compound), (chloride compound)/-(magnesium compound), (alkyl aluminum co-catalyst/(metal compound, and (aluminum alkyl)/(metal compound). To be more clear: stream 34a contained a binary blend of magnesium compound (component (v)) and aluminum alkyl (component (ix)) in process solvent; stream 34b contained a chloride compound (component (vi)) in process solvent; stream 34c contained a metal compound (component (vii)) in process solvent; stream 34d contained an alkyl aluminum co-catalyst (component (viii)) in process solvent; and streams stream 34a', 34b', 34c' and 34f contained process solvent. Once prepared, the second in-line intermediate branching catalyst formulation was injected into reactor 17 through stream 34f; optionally, additional alkyl aluminum co-catalyst may be injected into reactor 17 through stream 34h. As shown in FIG. 19, optionally, 100% of stream 34d, the alkyl aluminum co-catalyst, was injected directly into reactor 17 via stream 34h. Optionally, a portion of stream 34d was injected directly into reactor 17 via stream 34h and the remaining portion of stream 34d injected into reactor 17 via stream 34f. In FIG. 19, the first or the second heterogeneous catalyst assembly supplies 100% of the catalyst to reactor 17. Any combination of the streams that comprise the second heterogeneous catalyst assembly may be heated or cooled, i.e. streams 34a through 34h; in some cases, the upper temperature limit of streams 34a through 34h may be about 90° C., in other cases about 80° C. and in still other cases about 70° C. and; in some cases the lower temperature limit may be about 10° C.; in other cases about 20° C. and in still other cases about 30° C.

In reactor 17 a third ethylene interpolymer may, or may not, form. If embodiments of the in-line, or batch intermediate branching catalyst formulations disclosed herein were employed in reactor 17, the third ethylene interpolymer was characterized as having intermediate branching. If a comparative Ziegler-Natta catalyst formulation was injected into reactor 17, the third ethylene interpolymer did not contain intermediate branching. A third ethylene interpolymer will not form if catalyst deactivator A was added upstream of reactor 17 via catalyst deactivator tank 18A. A third ethylene interpolymer will be formed if catalyst deactivator B is added downstream of reactor 17 via catalyst deactivator tank 18B.

The optional third ethylene interpolymer produced in reactor 17 may be formed using a variety of operational modes; with the proviso that catalyst deactivator A was not added upstream of reactor 17. Non-limiting examples of operational modes include: (a) residual ethylene, residual optional α-olefin and residual active catalyst entering reactor 17 via stream 12e react to form the optional third ethylene interpolymer having intermediate branching, or; (b) a fresh portion of the first in-line intermediate branching catalyst formulation was added to reactor 17 via stream 10g to polymerize residual ethylene forming a third ethylene interpolymer having intermediate branching, or; (c) fresh ethylene 14, optional process solvent 13 and optional α-olefin 15 were added to reactor 17 and the residual active catalyst entering reactor 17 forms the third ethylene interpolymer having intermediate branching, or; (d) a fresh portion of the first in-line intermediate branching catalyst formulation was added to reactor 17 via stream 10g to polymerize freshly injected ethylene and optional α-olefin forming the third ethylene interpolymer having intermediate branching. Further, in operational modes (b) and (d), the first in-line intermediate branching catalyst formulation may be replaced with a second in-line intermediate branching catalyst formulation injected into reactor 17 via stream 34f. In any one of these operational modes, fresh hydrogen 16 may be injected into reactor 17 to reduce the molecular weight of the optional third optional ethylene interpolymer.

In series mode, reactor 17 produced a third exit stream 17b containing the first ethylene interpolymer, the second ethylene interpolymer and optionally the third ethylene interpolymer. As shown in FIG. 19, catalyst deactivator B may be added to the third exit stream 17b via catalyst deactivator tank 18B producing a deactivated solution B, stream 19; with the proviso that catalyst deactivator B was not added if catalyst deactivator A was added upstream of reactor 17. Deactivated solution B may also contain unreacted ethylene, unreacted α-olefin, unreacted hydrogen and impurities if present. As indicated above, if catalyst deactivator A was added, deactivated solution A (stream 12e) exits tubular reactor 17 as shown in FIG. 19.

In parallel mode operation, reactor 17 produced a fourth exit stream 17b containing the first ethylene interpolymer, the second ethylene interpolymer and optionally a third ethylene interpolymer. As indicated above, in parallel mode, stream 12d was the third exit stream. As shown in FIG. 19, in parallel mode, catalyst deactivator B was added to the fourth exit stream 17b via catalyst deactivator tank 18B producing a deactivated solution B, stream 19; with the proviso that catalyst deactivator B was not added if catalyst deactivator A was added upstream of reactor 17.

In FIG. 19, deactivated solution A (stream 12e) or B (stream 19) passed through pressure let down device 20, heat exchanger 21 and a passivator was added via tank 22 forming a passivated solution 23; the passivator was described below. The passivated solution passed through pressure let down device 24 and entered a first vapor/liquid separator 25. Hereinafter, "V/L" is equivalent to vapor/liquid. Two streams were formed in the first V/L separator: a first bottom stream 27 comprising a solution rich in ethylene interpolymers and; a first gaseous overhead stream 26 comprising ethylene, process solvent, optional α-olefins, optional hydrogen, oligomers and light-end impurities if present.

The first bottom stream entered a second V/L separator 28. In the second V/L separator two streams were formed: a second bottom stream 30 comprising a solution that was richer in ethylene interpolymer and leaner in process solvent relative to the first bottom stream 27, and; a second gaseous overhead stream 29 comprising process solvent, optional α-olefins, ethylene, oligomers and light-end impurities if present.

The second bottom stream 30 flowed into a third V/L separator 31. In the third V/L separator two streams were formed: a product stream 33 comprising an ethylene interpolymer product, deactivated catalyst residues and less than 5 weight % of residual process solvent, and; a third gaseous overhead stream 32 comprised essentially of process solvent, optional α-olefins and light-end impurities if present.

Embodiments also include the use of one or more V/L separators operating at reduced pressure, i.e. the operating pressure is lower than atmospheric pressure and/or embodiments where heat is added during the devolitization process, i.e. one or more heat exchangers are employed upstream of, or within, one or more of the V/L separators. Such embodiments facilitate the removal of residual process solvent and comonomer such that the residual volatiles in ethylene interpolymer products are less than 500 ppm.

Product stream 33 proceeded to polymer recovery operations. Non-limiting examples of polymer recovery operations included one or more gear pump, single screw extruder or twin screw extruder that forced the molten ethylene interpolymer product through a device to form pellets. Embodiments include the use of a devolatilizing extruder, where residual process solvent and optional α-olefin may be removed such that the volatiles in the ethylene interpolymer product is less than 500 ppm. Once pelletized the solidified ethylene interpolymer product is typically transported to a product silo.

The first, second and third gaseous overhead streams shown in FIG. 19 (streams 26, 29 and 32, respectively) may be sent to a distillation operation where solvent, ethylene and optional α-olefin were separated for recycling, or; the first, second and third gaseous overhead streams may be recycled to the reactors, or; a portion of the first, second and third gaseous overhead streams may be recycled to the reactors and the remaining portion sent to the distillation operation.

Solution Polymerization Process Batch Catalyst Formulation

An additional embodiment includes a process to manufacture an ethylene interpolymer product having intermediate branching, wherein a batch intermediate branching catalyst formulation was employed as illustrated in FIG. 20. It being understood that the arrangement of, or number of vessels shown in FIG. 20 are not limiting. To maintain a consistent lexicon in this disclosure CSTR reactor 112 in FIG. 20 was referred to as the second reactor, or R2, and this reactor produced a second ethylene interpolymer; and tubular reactor 117 was referred to as the third reactor or R3 and this reactor produced an optional third ethylene interpolymer.

Referring to FIG. 20: process solvent was injected into reactor 112 (reactor R2) and tubular reactor 117 (reactor R3) via streams 106 and 113, respectively; ethylene was injected into reactors 112 and 117 via streams 107 and 114, respectively; α-olefin(s) were injected into reactors 112 and 117 via streams 108 and 115, respectively; and optional hydrogen was injected into reactors 112 and 117 via streams 109 and 116, respectively. FIG. 20 shows a reactor 112 with stirring assembly 112b. In FIG. 20, a first batch heterogeneous catalyst assembly, i.e. vessels and streams 60a through 60e, was employed to produce a first batch intermediate branching catalyst formulation within reactor 112. Vessel 60a contained a solution or slurry of a first batch intermediate branching procatalyst in process solvent and vessel 60c contained a solution of alkyl aluminum co-catalyst in process solvent. A batch intermediate branching catalyst formulation or a batch intermediate branching procatalyst formulation was injected into reactor 112 via stream 60e and a second ethylene interpolymer having intermediate branching was formed in reactor 112. The synthesis of an embodiment of the batch intermediate branching procatalyst formulation was fully described below; process solvent was used to pump the batch intermediate branching procatalyst formulation to procatalyst storage tank 60a. Tank 60a may, or may not, be agitated. Storage tank 60c contained an alkyl aluminum co-catalyst; non-limiting examples of suitable alkyl aluminum co-catalysts were described in this disclosure. A batch intermediate branching catalyst formulation stream 60e was formed by mixing the batch intermediate branching procatalyst formulation stream 60b with alkyl aluminum co-catalyst stream 60d; optionally, prior to reactor injection additional process solvent may be added via stream 60e'. Stream 60e was injected into reactor 112 where the second ethylene interpolymer having intermediate branching was formed; Embodiments include the following operational modes: (a) 100% of the alkyl aluminum co-catalyst was injected directly into reactor 112 through stream 60g and the batch intermediate branching procatalyst formulation was injected directly into reactor 112 through stream 60e, or; (b) a portion of the alkyl aluminum co-catalyst was injected into reactor 12a via stream 60g and the remaining portion passing through stream 60d was combined with stream 60b to form the batch intermediate branching catalyst formulation in stream 60e.

As shown in FIG. 20, additional optional embodiments include: (a) injecting the batch intermediate branching procatalyst formulation into tubular reactor 117 through stream 60f, or; (b) injecting the batch intermediate branching catalyst formulation into tubular reactor 117 through stream 60f. In the case of option (a), 100% of the alkyl aluminum co-catalyst was injected directly into reactor 117 via stream 60h. An additional embodiment included the injection of a portion of the alkyl aluminum co-catalyst through stream 60f and the remaining portion flows through stream 60h. Any combination of vessels or streams 60a through 60h may be heated or cooled. Employing the first batch intermediate branching catalyst formulation in reactor 117 produced a third ethylene interpolymer characterized as having intermediate branching.

FIG. 20 illustrates further embodiments were a second heterogeneous catalyst assembly, i.e. vessels and streams 90a through 90f, may be employed. The second heterogeneous catalyst assembly allows one to: employ a second batch intermediate catalyst formulation in reactor 117 to synthesize a third ethylene interpolymer having intermediate branching; or employ a comparative batch ZN catalyst formulation in reactor 117 to synthesize a third ethylene interpolymer that does not have intermediate branching. This disclosure also contemplates the use of a heterogeneous catalyst formulation in reactor 117 that produces a third ethylene interpolymer that does not contain intermediate branching; for example by loading a comparative batch Ziegler-Natta catalyst formulation into vessel 90a.

Once prepared the second batch intermediate branching procatalyst was pumped to procatalyst storage tank 90a using process solvent. Tank 90a may, or may not, be agitated. Storage tank 90c contained an alkyl aluminum co-catalyst. A batch intermediate branching catalyst formulation stream 90e was formed by combining the second batch intermediate branching procatalyst stream 90b with alkyl aluminum co-catalyst stream 90d; optionally additional process solvent may be added to stream 90e via stream 90e'. Stream 90e was injected into reactor 117, wherein a third ethylene interpolymer having intermediate branching was formed. FIG. 20 includes additional embodiments where: (a) the batch intermediate branching procatalyst was injected directly into reactor 117 through stream 90e and the procatalyst was activated inside reactor 117 by injecting 100% of the aluminum co-catalyst directly into rector 117 via stream 90f, or; (b) a portion of the aluminum co-catalyst flowed through stream 90e with the remaining portion flowing through stream 90f. Any combination of tanks or streams 90a through 90f may be heated or cooled. The first and second intermediate branching procatalyst formulations may be the same, or different.

The time between the addition of the alkyl aluminum co-catalyst and the injection of the first batch intermediate branching catalyst formulation into reactor 112 was controlled; i.e. HUT-4 (the fourth Hold-Up-Time). Referring to FIG. 20, HUT-4 was the time for stream 60d to intermix and equilibrate with stream 60b to form the first batch intermediate branching catalyst formulation prior to injection into reactor 112 via in stream 60e; optionally this batch intermediate branching catalyst formulation may be injected into reactor 117 via stream 60f. The upper limit on HUT-4 may be about 300 seconds, in some cases about 200 seconds and in other cases about 100 seconds. The lower limit on HUT-4 may be about 0.1 seconds, in some cases about 1 seconds and in other cases about 10 seconds. The second heterogeneous catalyst assembly was operated in a similar manner, i.e. the HUT-4 (time for stream 90d to intermix and equilibrate with stream 90b to form the second batch intermediate branching catalyst formulation prior to injection into reactor 112 via in stream 90e) was controlled; where HUT-4 varied from about 0.1 to 300 seconds.

The quantity of batch intermediate branching procatalyst formulation or batch intermediate branching catalyst formulation added to reactor 112 was expressed as 'R2 batch (vii) (ppm)', i.e. the parts-per-million (ppm) of metal compound, or component (vii), in the reactor solution, as shown in Table 1a. The upper limit on R2 batch (vii) may be about 10 ppm, in some cases about 8 ppm and in other cases about 6 ppm. The lower limit on R2 batch (vii) may be about 0.1 ppm, in some cases about 0.2 ppm and in other cases about 0.5 ppm. The quantity of the alkyl aluminum co-catalyst added to reactor 112 was optimized to produce an efficient catalyst; this was accomplished by adjusting the (alkyl aluminum co-catalyst)/(metal compound) molar ratio, i.e. 'R2 batch (viii)/(vii) (mol ratio)' as shown in Table 1a. The upper limit on R2 batch (viii)/(vii) may be about 10, in some cases about 8.0 and is other cases about 6.0. The lower limit on R2 batch (viii)/(vii) may be 0.5, in some cases about 0.75 and in other cases about 1.

Referring to FIG. 20, the batch intermediate branching catalyst formulation in exit stream 112c may be deactivated upstream of reactor 117 by adding a catalyst deactivator A via deactivator storage tank 118A to form a deactivated solution A (stream 112e); in this case deactivated solution A exits reactor 17 and proceeds to pressure let down device 120. Optionally, exit stream 112c enters reactor 117 (i.e. catalyst deactivator A was not added): in this case, a wide variety of catalyst formulation may, or may not, be added to reactor 117 and stream 117b exits reactor 117; stream 117b was then deactivated downstream of reactor 117 by adding a catalyst deactivator B via deactivator storage tank 118B to form a deactivated solution B (stream 119). Deactivated solution B then enters pressure let down device 120. Deactivated solution A or B was then passed through heat exchanger 121 and a passivator was added via passivator tank 122 forming a passivated solution 123. The remaining vessels 124, 125, 128 and 131 and streams 126, 127, 129, 130, 132 and 133 and associated process conditions have been described previously; to be more clear, these vessels and streams were equivalent to vessels 24, 25, 28 and 31, respectively, and the streams 26, 27, 29, 30, 32 and 33, respectively, described above. Ethylene interpolymer product stream 133 proceeded to polymer recovery and was processed as described above.

The quantity of batch intermediate branching procatalyst produced and/or the size of procatalyst storage tanks 60a and 90a was not particularly important. However, a large quantity of procatalyst allows one to operate the continuous solution polymerization plant for an extended period: the upper limit on this time in some cases may be about 3 months, in other cases for about 2 months and in still other cases for about 1 month; the lower limit on this time in some cases may be about 1 day, in other cases about 1 week and in still other cases about 2 weeks.

Additional Solution Polymerization Parameters

In embodiments of the continuous solution polymerization process that produced an intermediately branched ethylene interpolymer a variety of solvents may be used as the 'process solvent'; non-limiting examples include linear, branched or cyclic $C_5$ to $C_{12}$ alkanes. Non-limiting examples of α-olefins include 1-propene, 1-butene, 1-pentene, 1-hexene, 1-octene, 1-nonene and 1-decene. Suitable catalyst component solvents include aliphatic and aromatic hydrocarbons. Non-limiting examples of aliphatic catalyst component solvents include linear, branched or cyclic $C_{5-12}$ aliphatic hydrocarbons, e.g. pentane, methyl pentane, hexane, heptane, octane, cyclohexane, methylcyclohexane, hydrogenated naphtha or combinations thereof. Non-limiting examples of aromatic catalyst component solvents include benzene, toluene (methylbenzene), ethylbenzene, o-xylene (1,2-dimethylbenzene), m-xylene (1,3-dimethylbenzene), p-xylene (1,4-dimethylbenzene), mixtures of xylene isomers, hemellitene (1,2,3-trimethylbenzene), pseudocumene (1,2,4-trimethylbenzene), mesitylene (1,3,5-trimethylbenzene), mixtures of trimethylbenzene isomers, prehenitene (1,2,3,4-tetramethylbenzene), durene (1,2,3,5-tetramethylbenzene), mixtures of tetramethylbenzene isomers, pentamethylbenzene, hexamethylbenzene and combinations thereof.

Reactor feed streams (solvent, monomer, α-olefin, hydrogen, catalyst formulation etc.) must be essentially free of catalyst deactivating poisons; non-limiting examples of poisons include trace amounts of oxygenates such as water, fatty acids, alcohols, ketones and aldehydes. Such poisons are removed from reactor feed streams using standard purification practices; non-limiting examples include molecular sieve beds, alumina beds and oxygen removal catalysts for the purification of solvents, ethylene and α-olefins, etc.

Referring to FIGS. 19 and 20 any combination of the reactor feed streams may be heated or cooled: for example, reactor 11a feed streams 1-4 (in FIG. 19). The upper limit on reactor feed stream temperatures may be 90° C.; in other cases 80° C. and in still other cases 70° C. The lower limit on reactor feed stream temperatures may be 20° C.; in other cases 35° C. and in still other cases 50° C. Any combination of the streams feeding tubular reactors 17 and 117 may be heated or cooled; i.e. streams 13-16 and 113-116, respectively. In some cases, tubular reactor feed streams were tempered, i.e. the tubular reactor feed streams were heated to at least above ambient temperature. The upper temperature limit on the tubular reactor feed streams in some cases was 200° C., in other cases 170° C. and in still other cases 140° C.; the lower temperature limit on the tubular reactor feed streams in some cases was 60° C., in other cases 90° C. and in still other cases 120° C.; with the proviso that the temperature of the tubular reactor feed streams are lower than the temperature of the process stream that enters the tubular reactor.

The operating temperature of the polymerization reactors can vary over a wide range. For example, the upper limit on reactor temperatures in some cases was 300° C., in other cases 280° C. and in still other cases 260° C.; and the lower limit in some cases was 80° C., in other cases 100° C. and in still other cases 125° C. In FIG. 19, the second reactor, reactor 12a (R2), was operated at a higher temperature than the first reactor 11a (R1). The maximum temperature difference between these two reactors ($T^{R2}-T^{R1}$) in some cases was 120° C., in other cases 100° C. and in still other cases 80° C.; the minimum ($T^{R2}-T^{R1}$) in some cases was 1° C., in other cases 5° C. and in still other cases 10° C. The optional tubular reactor, reactors 17 and 117 (also referred to as R3) in FIGS. 19 and 20, respectively, was operated in some cases 100° C. higher than R2; in other cases 60° C. higher than R2, in still other cases 10° C. higher than R2 and in alternative cases 0° C. higher, i.e. the same temperature as R2. The temperature within optional R3 may increase along its length. The maximum temperature difference between the inlet and outlet of R3 in some cases was 100° C., in other cases 60° C. and in still other cases 40° C. The minimum temperature difference between the inlet and outlet of R3 was in some cases may be 0° C., in other cases 3° C. and in still other cases 10° C. In some cases R3 was operated an adiabatic fashion and in other cases R3 was heated.

The pressure in the polymerization reactors should be high enough to maintain a single phase solution and to provide the upstream pressure to force the polymer solution from the reactors through a heat exchanger and on to polymer recovery operations. The operating pressure of the solution polymerization reactors can vary over a wide range. For example, the upper limit on reactor pressure in some cases was 45 MPag, in other cases 30 MPag and in still other cases 20 MPag; and the lower limit in some cases was 3 MPag, in other some cases 5 MPag and in still other cases 7 MPag. Prior to entering the first V/L separator, deactivated solution A or deactivated solution B may have a maximum temperature in some cases of 300° C., in other cases 290° C. and in still other cases 280° C.; the minimum temperature may be in some cases 150° C., in other cases 200° C. and in still other cases 220° C. Immediately prior to entering the first V/L separator, deactivated solution A, deactivated solution B or the passivated solution in some cases may have a maximum pressure of 40 MPag, in other cases 25 MPag and in still cases 15 MPag; the minimum pressure in some cases may be 1.5 MPag, in other cases 5 MPag and in still other cases 6 MPag.

The first V/L separator (vessels 25 and 125 in FIGS. 19 and 20, respectively) may be operated over a relatively broad range of temperatures and pressures. For example, the maximum operating temperature of the first V/L separator in some cases was 300° C., in other cases 285° C. and in still other cases 270° C.; the minimum operating temperature in some cases was 100° C., in other cases 140° C. and in still other cases 170° C. The maximum operating pressure of the first V/L separator in some cases was 20 MPag, in other cases 10 MPag and in still other cases 5 MPag; the minimum operating pressure in some cases was 1 MPag, in other cases 2 MPag and in still other cases 3 MPag.

The second V/L separator (vessels 28 and 128 in FIGS. 19 and 20, respectively) may be operated over a relatively broad range of temperatures and pressures. For example, the maximum operating temperature of the second V/L separator in some cases was 300° C., in other cases 250° C. and in still other cases 200° C.; the minimum operating temperature in some cases was 100° C., in other cases 125° C. and in still other cases 150° C. The maximum operating pressure of the second V/L separator in some cases was 1000 kPag, in other cases 900 kPag and in still other cases 800 kPag; the minimum operating pressure in some cases was 10 kPag, in other cases 20 kPag and in still other cases 30 kPag.

The third V/L separator (vessels 31 and 131 in FIGS. 19 and 20, respectively) may be operated over a relatively broad range of temperatures and pressures. For example, the maximum operating temperature of the third V/L separator in some cases was 300° C., in other cases 250° C., and in still other cases 200° C.; the minimum operating temperature in some cases may be 100° C., in other cases 125° C. and in still other cases 150° C. The maximum operating pressure of the third V/L separator in some cases was 500 kPag, in other cases 150 kPag and in still other cases 100 kPag; the minimum operating pressure in some cases was 1 kPag, in other cases 10 kPag and in still other cases 25 kPag.

Embodiments of the continuous solution polymerization process shown in FIGS. 19 and 20 show three V/L separators. However, continuous solution polymerization embodiments may include configurations comprising at least one V/L separator.

Any reactor shape or design may be used for solution polymerization reactors, i.e. reactors 11a (R1), 12a (R2) and 17 (R3) in FIG. 19; and reactors 112 (R2) and 117 (R3) in FIG. 20; non-limiting examples include unstirred or stirred spherical, cylindrical or tank-like vessels, as well as tubular reactors or recirculating loop reactors. At commercial scale the maximum volume of R1 in some cases may be about 20,000 gallons (about 75,710 L), in other cases about 10,000 gallons (about 37,850 L) and in still other cases about 5,000 gallons (about 18,930 L). At commercial scale the minimum volume of R1 in some cases may be about 100 gallons (about 379 L), in other cases about 500 gallons (about 1,893 L) and in still other cases about 1,000 gallons (about 3,785 L). At commercial scale the maximum volume of R2 in some cases may be about 120,000 gallons (about 454,000 L), in other cases about 60,000 gallons (about 227,000 L) and in still other cases about 30,000 gallons (about 114,000 L).

At commercial scale the minimum volume of R2 in some cases may be about 6000 gallons (about 22,700 L), in other cases about 2,000 gallons (about 7,570 L) and in still other cases about 200 gallons (about 757 L). At pilot plant scales reactor volumes were typically much smaller, for example the volume of R1 at pilot scale could be less than about 2 gallons (less than about 7.6 L). In the case of continuously stirred tank reactors the stirring rate may vary over a wide range; in some cases from about 10 rpm to about 2000 rpm, in other cases from about 100 to about 1500 rpm and in still other cases from about 200 to about 1300 rpm. In this disclosure the volume of R3, the tubular reactor, was expressed as a percent of the volume of reactor R2. The upper limit on the volume of R3 in some cases may be about 500% of R2, in other cases about 300% of R2 and in still other cases about 100% of R2. The lower limit on the volume of R3 in some cases may be about 3% of R2, in other cases about 10% of R2 and in still other cases about 50% of R2.

The 'average reactor residence time', a well-known parameter in the chemical engineering art, was defined by the first moment of the reactor residence time distribution; the reactor residence time distribution was a probability distribution function that describes the amount of time that a fluid element spends inside the reactor. The average reactor residence time varied widely depending on process flow rates and reactor mixing, design and capacity. The upper limit on the average reactor residence time of the solution in R1 in some cases may be 600 seconds, in other cases 360 seconds and in still other cases 180 seconds. The lower limit on the average reactor residence time of the solution in R1 in some cases may be 10 seconds, in other cases 20 seconds and in still other cases 40 seconds. The upper limit on the average reactor residence time of the solution in R2 in some cases may be 720 seconds, in other cases 480 seconds and in still other cases 240 seconds. The lower limit on the average reactor residence time of the solution in R2 in some cases may be 10 seconds, in other cases 30 seconds and in still other cases 60 seconds. The upper limit on the average reactor residence time of the solution in R3 in some cases may be 600 seconds, in other cases 360 seconds and in still other cases 180 seconds. The lower limit on the average reactor residence time of the solution in R3 in some cases may be 1 second, in other cases 5 seconds and in still other cases 10 seconds.

Optionally, additional reactors (e.g. CSTRs, loops or tubes, etc.) could be added to the continuous solution polymerization process embodiments shown in FIG. 19. In this disclosure, the number of reactors was not particularly important; with the proviso that the continuous solution polymerization process comprises at least one reactor that employs an intermediate branching catalyst formulation that produces an ethylene interpolymer product having intermediate branching.

In operating the continuous solution polymerization process embodiments shown in FIG. 19 the total amount of ethylene supplied to the process can be portioned or split between the three reactors R1, R2 and R3. This operational variable was called the Ethylene Split (ES), i.e. "$ES^{R1}$", "$ES^{R2}$" and "$ES^{R3}$" refer to the weight percent of ethylene injected in R1, R2 and R3, respectively; with the proviso that $ES^{R1}+ES^{R2}+ES^{R3}=100\%$. This was accomplished by adjusting the ethylene flow rates in the following streams: stream 2 (R1), stream 7 (R2) and stream 14 (R3). The upper limit on $ES^{R1}$ in some cases was about 60%, in other cases about 55% and in still other cases about 50%; the lower limit on $ES^{R1}$ in some cases was about 5%, in other cases about 10% and in still other cases about 20%. The upper limit on $ES^{R2}$ in some cases was about 90%, in other cases about 80% and in still other cases about 70%; the lower limit on $ES^{R2}$ in some cases was about 20%, in other cases about 30% and in still other cases about 40%. The upper limit on $ES^{R3}$ in some cases was about 30%, in other cases about 25% and in still other cases about 20%; the lower limit on $ES^{R3}$ in some cases was 0%, in other cases about 5% and in still other cases about 10%. Similarly, in FIG. 20 the ethylene may be apportioned between R2 (reactor 112) and R3 (reactor 117); where $ES^{R2}+ES^{R3}=100\%$.

In operating the continuous solution polymerization process embodiments shown in FIGS. 19 and 20 the ethylene concentration in each reactor was also controlled. The ethylene concentration in R1, i.e. $EC^{R1}$, was defined as the weight of ethylene in reactor 1 divided by the total weight of everything added to reactor 1; $EC^{R2}$ and $EC^{R3}$ were defined similarly. Ethylene concentrations in the reactors ($EC^{R1}$ or $EC^{R2}$ or $EC^{R3}$) in some cases varied from about 7 weight percent (wt %) to about 25 wt %, in other cases from about 8 wt % to about 20 wt % and in still other cases from about 9 wt % to about 17 wt %.

In operating the continuous solution polymerization process embodiments shown in FIGS. 19 and 20 the total amount of ethylene converted in each reactor was monitored. The term '$Q^{R1}$' referred to the percent of the ethylene added to R1 that was converted into a first ethylene interpolymer by the catalyst formulation. Similarly, $Q^{R2}$ and $Q^{R3}$ represented the percent of the ethylene added to R2 and R3 that was converted into the second and third ethylene interpolymer, respectively. Ethylene conversions varied significantly depending on a variety of process conditions, e.g. catalyst concentration, catalyst formulation, impurities and poisons. The upper limit on both $Q^{R1}$ and $Q^{R2}$ in some cases was about 99%, in other cases about 95% and in still other cases about 90%; the lower limit on both $Q^{R1}$ and $Q^{R2}$ in some cases was about 65%, in other cases about 70% and in still other cases about 75%. The upper limit on $Q^{R3}$ in some cases was about 99%, in other cases about 95% and in still other cases about 90%; the lower limit on $Q^{R3}$ in some cases was 0%, in other cases about 5% and in still other cases about 10%. The term "$Q^T$" represented the total or overall ethylene conversion across the entire continuous solution polymerization plant; i.e. $Q^T=100\times$[weight of ethylene in the interpolymer product]/([weight of ethylene in the interpolymer product]+[weight of unreacted ethylene]). The upper limit on $Q^T$ in some cases was about 99%, in other cases about 95% and in still other cases about 90%; the lower limit on $Q^T$ in some cases was about 75%, in other cases about 80% and in still other cases about 85%.

Referring to FIG. 19, α-olefin was added to the continuous solution polymerization process; and was proportioned or split between R1, R2 and R3. This operational variable was called the Comonomer (α-olefin) Split (CS), i.e. '$CS^{R1}$', '$CS^{R2}$' and '$CS^{R3}$' referred to the weight percent of α-olefin comonomer that was injected in R1, R2 and R3, respectively; with the proviso that $CS^{R1}+CS^{R2}+CS^{R3}=100\%$. This was accomplished by adjusting α-olefin flow rates in the following streams: stream 3 (R1), stream 8 (R2) and stream 15 (R3). The upper limit on $CS^{R1}$ in some cases was 100% (i.e. 100% of the α-olefin was injected into R1), in other cases about 95% and in still other cases about 90%. The lower limit on $CS^{R1}$ in some cases was 0% (i.e. the first ethylene interpolymer was an ethylene homopolymer), in other cases about 5% and in still other cases about 10%. The upper limit on $CS^{R2}$ in some cases was about 100% (i.e. 100% of the α-olefin was injected into reactor 2), in other cases about 95% and in still other cases about 90%. The lower limit on $CS^{R2}$ in some cases was 0%, in other cases about 5% and in still other cases about 10%. The upper limit on $CS^{R3}$ in some cases was 100%, in other cases about 95% and in still other cases about 90%. The lower limit on $CS^{R3}$ in some cases was 0%, in other cases about 5% and in still other cases about 10%. Similarly, in FIG. 20 the comonomer may be apportioned between R2 (reactor 112) and R3 (reactor 117); where $CS^{R2}+CS^{R3}=100\%$.

In the continuous polymerization processes described in this disclosure, polymerization was terminated by adding a catalyst deactivator. Embodiments in FIG. 19 shows catalyst deactivation occurring either: (a) upstream of tubular reactor 17 by adding a catalyst deactivator A from catalyst deactivator tank 18A, or; (b) downstream of tubular reactor 17 by adding a catalyst deactivator B from catalyst deactivator tank 18B. Similarly, FIG. 20 shows catalyst deactivation occurring either: (a) upstream of tubular reactor 117 by adding a catalyst deactivator A from catalyst deactivator tank 118A, or; (b) downstream of tubular reactor 117 by adding a catalyst deactivator B from catalyst deactivator tank 118B. Catalyst deactivator tanks may contain neat (100%) catalyst deactivator, a solution of catalyst deactivator in a solvent, or a slurry of catalyst deactivator in a solvent. The chemical composition of catalyst deactivator A and B may be the same, or different. Non-limiting examples of suitable solvents included linear or branched $C_5$ to $C_{12}$ alkanes. In this disclosure, how the catalyst deactivator was added was not particularly important. Once added, the catalyst deactivator substantially stopped the polymerization reaction by changing active catalyst species to inactive forms. Suitable deactivators are well known in the art, non-limiting examples include: amines (e.g. U.S. Pat. No. 4,803,259 to Zboril et al.); alkali or alkaline earth metal salts of carboxylic acid (e.g. U.S. Pat. No. 4,105,609 to Machan et al.); water (e.g. U.S. Pat. No. 4,731,438 to Bernier et al.); hydrotalcites, alcohols and carboxylic acids (e.g. U.S. Pat. No. 4,379,882 to Miyata); or a combination thereof (U.S. Pat. No. 6,180,730 to Sibtain et al.). In this disclosure the quantify of catalyst deactivator added was determined by the following catalyst deactivator molar ratio: 0.3≤(catalyst deactivator)/((total catalytic metal)+(alkyl aluminum co-catalyst)+(aluminum alkyl))≤2.0; where the total catalytic metal was the total moles of catalytic metal added to the solution process. The upper limit on the catalyst deactivator molar ratio was 2, in some cases 1.5 and in other cases 0.75. The lower limit on the catalyst deactivator molar ratio was 0.3, in some cases 0.35 and in still other cases 0.4. In general, the catalyst deactivator was added in a minimal amount such that the catalyst was deactivated and the polymerization reaction was quenched.

Prior to entering the first V/L separator, a passivator or acid scavenger was added to deactivated solution A or B forming a passivated solution, i.e. passivated solution streams 23 and 123 shown in FIGS. 19 and 20, respectively. Passivator tanks 22 and 122 may contain neat (100%) passivator, a solution of passivator in a solvent, or a slurry of passivator in a solvent. Non-limiting examples of suitable solvents include linear or branched $C_5$ to $C_{12}$ alkanes. In this disclosure, how the passivator was added was not particularly important. Suitable passivators are well-known in the art, non-limiting examples included alkali or alkaline earth metal salts of carboxylic acids or hydrotalcites. The quantity of passivator added varied over a wide range. The quantity of passivator added was determined by the total moles of chloride compounds added to the solution process, i.e. the chloride compound "compound (vi)" plus the metal compound "compound (vii)" that was used to manufacture the catalyst formulation. The upper limit on the (passivator)/(total chlorides) molar ratio was 15, in some cases 13 and in other cases 11. The lower limit on the (passivator)/(total chlorides) molar ratio was about 5, in some cases about 7 and in still other cases about 9. In general, the passivator was added in the minimal amount to substantially passivate the deactivated solution.

Ethylene Interpolymer Products

The intermediately branched ethylene interpolymer products of this disclosure were characterized by a Non-Comonomer Index Distribution, $NCID_i$, having values characterized by Eq. (1a) and Eq. (1b), i.e. Eq. (1b) s $NCID_i$<Eq. (1a); and a first derivative of $NCID_i$, $dNCID_i/d \log M_i$, Eq. (2), having values ≤−0.0001.

To maintain a consistent lexicon and avoid confusion between various embodiments (e.g. FIGS. 19 and 20) the 'second ethylene interpolymer' in the ethylene interpolymer product was consistently characterized as having intermediate branching. It being understood that, in the case of one reactor running one intermediate branching catalyst formulation, the ethylene interpolymer product consists of a solitary ethylene interpolymer, i.e. the second ethylene interpolymer having intermediate branching.

The disclosed ethylene interpolymer products may consist of two ethylene interpolymers, i.e. a first and a second ethylene interpolymer where the second interpolymer contains intermediate branching and the first ethylene interpolymer may or may not contain intermediate branching. The first ethylene interpolymer may be produced with a variety of catalyst formulations; including, homogeneous catalyst formulations, heterogeneous catalyst formulations or intermediate branching catalyst formulations.

The disclosed ethylene interpolymer products may consist of three ethylene interpolymers, i.e. a first, a second and a third ethylene interpolymer; the second ethylene interpolymer contains intermediate branching; while the first and third ethylene interpolymers may or may not contain intermediate branching. The first and third ethylene interpolymers were independently synthesized using a variety of catalyst formulations; including homogeneous catalyst formulations, heterogeneous catalyst formulations or an intermediate branching catalyst formulations.

The disclosed ethylene interpolymer products may consist of more than three ethylene interpolymers, e.g. a first, a second, a third and a fourth ethylene interpolymer (etc.); again, the second interpolymer contains intermediate branching; while the first, third and fourth (etc.) ethylene interpolymers may or may not contain intermediate branching. The first, third and fourth (etc.) ethylene interpolymers were independently synthesized using a variety of catalyst formulations; including homogeneous catalyst formulations, heterogeneous catalyst formulations or intermediately branching catalyst formulations.

The second ethylene interpolymer was also characterized as having no long chain branching (or an undetectable level) as characterized by a Long Chain Branching Factor (LCBF) value <0.001. The first, the third, the fourth (etc.) ethylene interpolymers may or may not contain long chain branching; if present, long chain branching was characterized by a LCBF value ≥0.001.

Ethylene interpolymer products have a density ($6f$); where the superscript '$f$' refers to the 'final' density, i.e. the final product may comprise several ethylene interpolymers. In some cases, the upper limit on density ($\sigma^f$) may be about 0.965 g/cm$^3$, in other cases about 0.955 g/cm$^3$ and in still other cases about 0.945 g/cm$^3$; while the lower density limit ($\sigma^f$) may be about 0.862 g/cm$^3$, in other cases about 0.875 g/cm$^3$, and; in still other cases about 0.885 g/cm$^3$. In this disclosure, the symbol '$\sigma^2$' refers to the density of the second ethylene interpolymer. The lower limit on the density of the second ethylene interpolymer (62) may be 0.890 g/cm$^3$, in other cases 0.900 g/cm$^3$ and in still other cases 0.910 g/cm$^3$; and upper limit on density of the second ethylene interpolymer may be about 0.965 g/cm$^3$, in other cases about 0.955 g/cm$^3$ and in still other cases about 0.945 g/cm$^3$.

The comonomer to ethylene mole ratio in the second reactor (R2) was used to control density, i.e. $((\alpha\text{-olefin})/(\text{ethylene}))^{R2}$. The upper limit on $((\alpha\text{-olefin})/(\text{ethylene}))^{R2}$ may be about 3, in other cases about 2 and in still other cases about 1; while the lower limit on $((\alpha\text{-olefin})/(\text{ethylene}))^{R2}$ may be 0; in other cases about 0.25 and in still other cases about 0.5.

Ethylene interpolymer products having intermediate branching may have an upper limit on melt index ($I_2^f$) of about 500 dg/min, in some cases about 400 dg/min; in other cases about 300 dg/min, and; in still other cases about 200 dg/min. The lower limit on the melt index of ethylene interpolymer products ($I_2^f$) may be about 0.3 dg/min, in some cases about 0.4 dg/min; in other cases about 0.5 dg/min, and; in still other cases about 0.6 dg/min.

In blends the upper limit on the melt index of the second ethylene interpolymer ($I_2^2$) having intermediate branching may be about 1000 dg/min, in some cases about 750 dg/min, in other cases about 500 dg/min and in still other cases about 200 dg/min; the lower limit on the melt index of the second ethylene interpolymer ($I_2^2$) having intermediate branching may be about 0.001 dg/min, in some cases about 0.005 dg/min, in other cases about 0.01 dg/min and in still other cases about 0.05 dg/min. The hydrogen content in R2 was used to control melt index of the second ethylene interpolymer, i.e. $H_2^{R2}$ (ppm); $H_2^{R2}$ (ppm) may range from about 50 ppm to 0 ppm, in other cases from about 25 ppm to 0 ppm, in still other cases from about 10 to 0 and or from about 2 ppm to 0 ppm.

Methods to determine the $CDBI_{50}$ (Composition Distribution Branching Index) of an ethylene interpolymer are well known to those skilled in the art. The $CDBI_{50}$, expressed as a percent, is defined as the percent of the ethylene interpolymer whose comonomer composition is within 50% of the median comonomer composition. Ethylene interpolymer products having intermediate branching may have an upper limit on $CDBI_{50}$ of about 98%, in other cases about 90% and in still other cases about 85%; while the lower limit on the $CDBI_{50}$ of an ethylene interpolymer product may be about 10%, in other cases about 15% and in still other cases about 20%. The second ethylene interpolymer having intermediate branching may have a $CDBI_{50}$ that ranges from: an upper $CDBI_{50}$ limit of about 70%, in other cases about 65% and in still other cases about 60%; and a lower $CDBI_{50}$ limit of about 20%, in other cases about 45% and in still other cases about 55%.

The upper limit on the $M_w/M_n$ of the ethylene interpolymer product having intermediate branching may be about 25, in other cases about 15 and in still other cases about 9. The lower limit on the $M_w/M_n$ of the ethylene interpolymer product may be 2.0, in other cases about 2.2 and in still other cases about 2.4. The $M_w/M_n$ of second ethylene interpolymer having intermediate branching may be characterized by: an upper $M_w/M_n$ limit of about 5.0, in other cases about 4.5 and in still other cases about 4.0; and a lower $M_w/M_n$ limit of about 2.2, in other cases about 2.4 and in still other cases about 2.6.

In the case of ethylene interpolymer products containing more than one ethylene interpolymer; the upper limit on the weight percent (wt %) of the second ethylene interpolymer having intermediate branching in the ethylene interpolymer product may be about 99 wt %, in other cases about 95 wt % and in still other cases about 90 wt %. The lower limit on the wt % of the second ethylene interpolymer in the ethylene interpolymer product may be about 10 wt %; in other cases about 15 wt % and in still other cases about 20 wt %. The specific volume blending rule was used to calculate the final density ($\sigma_f$) of a multicomponent ethylene interpolymer product; e.g. in the case of a blend of two ethylene interpolymers the final blend density ($\sigma^f$) was $\sigma^f = 1/(wt^1/\sigma^1 + wt^2/\sigma 2)$; where $wt^1$ and $wt^2$ represent weight fractions of the first and second ethylene interpolymer, respectively, and the following melt index blending rule was used to the calculate blend melt index, $\log(I_2^f)$ $wt^1 \log(I_2^1) + wt^2 \log(I_2^2)$.

Ethylene interpolymer products containing intermediate branching contain catalyst residues that reflect the chemical compositions of the catalyst formulation used. In the case of the second ethylene interpolymer having intermediate branching, catalyst residues were quantified by the parts per million of catalytic metal originating from 'component (vii)' in the second ethylene interpolymer; in this disclosure this metal was referred to as "metal B". Non-limiting examples of metal B include metals selected from Group 4 through Group 8 of the Periodic Table, or mixtures of metals selected from Group 4 through Group 8. The upper limit on the ppm of metal B in the second ethylene interpolymer having intermediate branching may be about 12 ppm, in other cases about 10 ppm and in still other cases about 8 ppm. The lower limit on the ppm of metal B in the ethylene interpolymer having intermediate branching may be about 0.5 ppm, in other cases about 1 ppm and in still other cases about 2 ppm.

The ethylene interpolymer product may also contain (optionally) additional catalytic metals. For example, as described below, a metal A used to synthesize a first ethylene interpolymer and/or a metal C used to synthesize a third ethylene interpolymer. Catalytic metals A, B and C may be the same or different. In this disclosure the term "total catalytic metal" was equivalent to the sum of catalytic metals A+B+C. The upper and lower limits on catalytic metal A, or metal B or metal C in the ethylene interpolymer product can be calculated from the weight fractions of the first, the second and the third ethylene interpolymer, respectively, in the ethylene interpolymer product; given the disclosed upper and lower limits on the respective catalytic metal in the first, second and third ethylene interpolymer.

First Ethylene Interpolymer

In this disclosure, the term 'first ethylene interpolymer' refers to an ethylene interpolymer synthesized in a first reactor. This disclosure described several embodiments of intermediately branched ethylene interpolymer products; and the first ethylene interpolymer may, or may not, be present in the product. If present, the first ethylene interpolymer may be an intermediately branched ethylene interpolymer and characterized as described above (e.g. via Eq. (1a), Eq. (1b) and Eq. (2), etc.). If present, the first ethylene interpolymer may also be produced using a heterogeneous catalyst formulation, e.g. a comparative batch Ziegler-Natta catalyst formulation that does not produce intermediate branching. If present, the first ethylene interpolymer may also be produced using a homogeneous catalyst formulation that does not produce intermediate branching and may, or may not, produce long chain branching.

The first ethylene interpolymer may have an upper density limit of about 0.975 g/cm³, in other cases about 0.965 g/cm³ and in still other cases about 0.955 g/cm³; while the lower density may be about 0.855 g/cm³, in other cases about 0.865 g/cm³, and; in still other cases about 0.875 g/cm³. In this disclosure the symbol 'a' refers to the density of the first ethylene interpolymer. The (($\alpha$-olefin)/(ethylene)) ratio in the first reactor (R1) was used to control the density of the first ethylene interpolymer.

The upper limit on the melt index of the first ethylene interpolymer, ($I_2^1$) may be about 1000 dg/min, in some cases about 750 dg/min; in other cases about 500 dg/min, and; in still other cases about 200 dg/min; and the lower limit on the melt index of the homogeneous first ethylene interpolymer may be about 0.001 dg/min, in some cases about 0.005 dg/min; in other cases about 0.01 dg/min, and; in still other cases about 0.05 dg/min. The melt index of the first ethylene interpolymer was controlled by the amount of hydrogen in R1, i.e. $H_2^{R1}$ (ppm).

The first ethylene interpolymer may, or may not, contain long chain branching as characterized by LCBF values. The upper limit on the LCBF of the first ethylene interpolymer may be 0.5, in other cases 0.4 and in still other cases 0.3 (dimensionless). The lower limit on LCBF was a homogenous first ethylene interpolymer that did not chain long chain branching or an undetectable level of long chain branching, as characterized by LCBF values <0.001.

The first ethylene interpolymer may have a $CDBI_{50}$ that ranges from: an upper $CDBI_{50}$ of about 98%, in other cases 95% and in still other cases about 90%; and a lower $CDBI_{50}$ of about 20%, in other cases about 45% and in still other cases about 55%.

The upper limit on the $M_w/M_n$ of the first ethylene interpolymer may be about 5.0, in other cases about 4.5 and in still other cases about 4.0; and the lower limit on the $M_w/M_n$ the first ethylene interpolymer may be about 1.7, in other cases about 1.8 and in still other cases about 1.9.

The first ethylene interpolymer contains catalyst residues that reflect the chemical composition of the catalyst formulation used. Catalyst residues were quantified by the parts per million of catalytic metal in the first ethylene interpolymer; hereinafter 'metal A'. Non-limiting examples of metal A include metals selected from Group 4 through Group 8 of the Periodic Table, or mixtures of metals selected from Group 4 through Group 8. The upper limit on the ppm of metal A in the first ethylene interpolymer may be about 12.0 ppm, in other cases about 10.0 ppm and in still other cases about 8.0 ppm. The lower limit on the ppm of metal A in the first ethylene interpolymer may be about 0.01 ppm, in other cases about 0.1 ppm and in still other cases about 0.2 ppm.

The upper limit on the weight percent (wt %) of the first ethylene interpolymer in the ethylene interpolymer product may be about 60 wt %, in other cases about 55 wt % and in still other cases about 50 wt %. The lower limit on the wt % of the first ethylene interpolymer in the ethylene interpolymer product may be 0 wt %; in other cases about 5 wt % and in still other cases about 10 wt %.

Third Ethylene Interpolymer

In this disclosure, the term 'third ethylene interpolymer' refers to an ethylene interpolymer synthesized in a third reactor. This disclosure described several embodiments of intermediately branched ethylene interpolymer products; and the third ethylene interpolymer may, or may not, be present. If present, the third ethylene interpolymer may be an intermediately branched ethylene interpolymer and characterized as described above (e.g. via Eq. (1a), Eq. (1b) and Eq. (2), etc.). If present, the third ethylene interpolymer may also be produced using a heterogeneous catalyst formulation, e.g. a comparative batch Ziegler-Natta catalyst formulation that does not produce intermediate branching. If present, the third ethylene interpolymer may also be produced using a homogeneous catalyst formulation that does not produce intermediate branching and may, or may not, produced long chain branching.

The upper limit on the density (as) of the third ethylene interpolymer in some cases may be about 0.975 g/cm³, in other cases about 0.965 g/cm³ and in still other cases about 0.955 g/cm³; while the lower 3 limit may be about 0.855 g/cm³, in other cases about 0.865 g/cm³, and in still other cases about 0.875 g/cm³.

The amount of hydrogen added to the third reactor (R3), $H_2^{R3}$ (ppm), may vary over a wide range to produce a third ethylene interpolymer having a wide range of melt indexes (I23). The upper limit on I23 may be about 10000 dg/min, in other cases about 5000 dg/min, in still cases about 2000 dg/min, and in other cases about 1000 dg/min; while the lower limit on 123 may be about 0.1 dg/min, in other cases about 0.2 dg/min, in still other cases about 0.3 dg/min, and in other cases 0.5 dg/min.

The upper limit on the $CDBI_{50}$ of the third ethylene interpolymer may be about 98%, in other cases about 95% and in still other cases about 90%; while the lower limit on $CDBI_{50}$ of the third ethylene interpolymer may be about 20%, in other cases about 30% and in still other cases about 40%.

The upper limit on the $M_w/M_n$ of the third ethylene interpolymer may be about 6.0, in other cases about 5.0 and in still other cases about 4.0. The lower limit on the $M_w/M_n$ of the third ethylene interpolymer may be about 1.7, in other cases about 1.8 and in still other cases about 1.9.

The catalyst residues in the third ethylene interpolymer reflect the chemical composition of catalyst formulation used. In this disclosure, the term 'metal C' refers to the catalytic metal employed in the catalyst formulation that was used to synthesize the third ethylene interpolymer. Non-limiting examples of metal C include metals selected from Group 4 through Group 8 of the Periodic Table, or mixtures of metals selected from Group 4 through Group 8. Metal C was may be the same or different relative to metal A and metal B. The upper limit on the ppm of metal C in the third ethylene interpolymer may be about 12 ppm, in other cases about 10 ppm and in still other cases about 8 ppm; and the lower limit on the ppm of metal C in the third ethylene interpolymer may be about 0.01 ppm, in other cases about 0.1 ppm and in still other cases about 0.2 ppm.

The upper limit on the weight percent (wt %) of the optional third ethylene interpolymer in the ethylene interpolymer product may be about 30 wt %, in other cases about 25 wt % and in still other cases about 20 wt %. The lower limit on the wt % of the optional third ethylene interpolymer in the ethylene interpolymer product may be 0 wt %; in other cases about 5 wt % and in still other cases about 10 wt %.

Manufactured Articles

Ethylene interpolymer products having intermediate branching may be converted into a wide variety of flexible manufactured articles. Non-limiting examples include monolayer or multilayer films. Non-limiting examples of processes to prepare such films include blown film processes, double bubble processes, triple bubble processes, cast film processes, tenter frame processes and machine direction orientation (MDO) processes.

In the blown film extrusion process an extruder heats, melts, mixes and conveys a thermoplastic, or a thermoplastic blend. Once molten, the thermoplastic is forced through an annular die to produce a thermoplastic tube. In the case of co-extrusion, multiple extruders are employed to produce a multilayer thermoplastic tube. The temperature of the extrusion process is primarily determined by the thermoplastic or thermoplastic blend being processed, for example the melting temperature or glass transition temperature of the thermoplastic and the desired viscosity of the melt. In the case of polyolefins, typical extrusion temperatures are from 330° F. to 550° F. (166° C. to 288° C.). Upon exit from the annular die, the thermoplastic tube is inflated with air, cooled, solidified and pulled through a pair of nip rollers. Due to air inflation, the tube increases in diameter forming a bubble of desired size. Due to the pulling action of the nip rollers the bubble is stretched in the machine direction. Thus, the bubble is stretched in two directions: the transverse direction (TD) where the inflating air increases the diameter of the bubble; and the machine direction (MD) where the nip rollers stretch the bubble. As a result, the physical properties of blown films are typically anisotropic, i.e. the physical properties differ in the MD and TD directions; for example, film tear strength and tensile properties typically differ in the MD and TD. In some prior art documents, the terms "cross direction" or "CD" is used; these terms are equivalent to the terms "transverse direction" or "TD" used in this disclosure. In the blown film process, air is also blown on the external bubble circumference to cool the thermoplastic as it exits the annular die. The final width of the film is determined by controlling the inflating air or the internal bubble pressure; in other words, increasing or decreasing bubble diameter. Film thickness is controlled primarily by increasing or decreasing the speed of the nip rollers to control the draw-down rate. After exiting the nip rollers, the bubble or tube is collapsed and may be slit in the machine direction thus creating sheeting. Each sheet may be wound into a roll of film. Each roll may be further slit to create film of the desired width. Each roll of film is further processed into a variety of consumer products as described below.

The cast film process is similar in that a single or multiple extruder(s) may be used; however, the various thermoplastic materials are metered into a flat die and extruded into a monolayer or multilayer sheet, rather than a tube. In the cast film process the extruded sheet is solidified on a chill roll.

In the double bubble process a first blown film bubble is formed and cooled, then the first bubble is heated and re-inflated forming a second blown film bubble, which is subsequently cooled. The ethylene interpolymer products, disclosed herein, are also suitable for the triple bubble blown process. Additional film converting processes, suitable for the disclosed ethylene interpolymer products, include processes that involve a Machine Direction Orientation (MDO) step; for example, blowing a film or casting a film, quenching the film and then subjecting the film tube or film sheet to a MDO process at any stretch ratio. Additionally, the ethylene interpolymer product films disclosed herein are suitable for use in tenter frame processes as well as other processes that introduce biaxial orientation.

Depending on the end-use application, the disclosed ethylene interpolymer products having intermediate branching may be converted into films that span a wide range of thicknesses. Non-limiting examples include, food packaging films where thicknesses may range from about 0.5 mil (13 μm) to about 4 mil (102 μm), and; in heavy duty sack applications film thickness may range from about 2 mil (51 μm) to about 10 mil (254 μm).

Intermediately branched ethylene interpolymer products may be used in monolayer films; where the monolayer comprises one or more of the disclosed ethylene interpolymer products having intermediate branching and optionally one or more ethylene polymers and/or one or more polyolefins. The lower limit on the weight percent of intermediately branched ethylene interpolymer product in a monolayer film may be about 3 wt %, in other cases about 10 wt % and in still other cases about 30 wt %. The upper limit on the weight percent of the intermediately branched ethylene interpolymer product in the monolayer film may be 100 wt %, in other cases about 90 wt % and in still other cases about 70 wt %.

Intermediately branched ethylene interpolymer products may also be used in one or more layers of a multilayer film; non-limiting examples of multilayer films include two, three, five, seven, nine, eleven or more layers. The disclosed ethylene interpolymer products are also suitable for use in processes that employ micro-layering dies and/or feed-blocks, such processes can produce films having many layers, non-limiting examples include from 10 to 10,000 layers.

The thickness of a specific layer (containing one or more intermediately branched ethylene interpolymer product(s)) within the multilayer film may be about 5%, in other cases about 15% and in still other cases about 30% of the total multilayer film thickness. In other embodiments, the thickness of a specific layer (containing one or more intermediately branched ethylene interpolymer product(s)) within the multilayer film may be about 95%, in other cases about 80% and in still other cases about 65% of the total multilayer film thickness. Each individual layer of a multilayer film may contain more than one intermediately branched ethylene interpolymer product; may contain one or more ethylene polymer and/or one or more polyolefin.

Additional embodiments include laminations and coatings, where mono or multilayer films containing an ethylene interpolymer product having intermediate branching are extrusion laminated or adhesively laminated or extrusion coated. In extrusion lamination or adhesive lamination, two or more substrates are bonded together with a thermoplastic or an adhesive, respectively. In extrusion coating, a thermoplastic is applied to the surface of a substrate. These processes are well known to those of ordinary experience in the art. Frequently, adhesive lamination or extrusion lamination are used to bond dissimilar materials, non-limiting examples include the bonding of a paper web to a thermoplastic web, or the bonding of an aluminum foil containing web to a thermoplastic web, or the bonding of two thermoplastic webs that are chemically incompatible, e.g. the bonding of an intermediately branched ethylene interpolymer product containing web to a polyester or polyamide web. Prior to lamination, the web containing intermediately branched ethylene interpolymer product(s) may be monolayer or multilayer. Prior to lamination the individual webs may be surface treated to improve the bonding, a non-limiting example of a surface treatment is corona treating. A primary web or film may be laminated on its upper surface, its lower surface, or both its upper and lower surfaces with a secondary web. A secondary web and a tertiary web could be laminated to the primary web; wherein the secondary and tertiary webs differ in chemical composition. As non-limiting examples, secondary or tertiary webs may include; polyamide, polyester and polypropylene, or webs containing barrier resin layers such as EVOH. Such webs may also contain a vapor deposited barrier layer; for example a thin silicon oxide ($SiO_x$) or aluminum oxide ($AlO_x$) layer. Multilayer webs (or films) may contain three, five, seven, nine, eleven or more layers.

Ethylene interpolymer products having intermediate branching can be used in a wide range of manufactured articles comprising one or more films (monolayer or multilayer). Non-limiting examples of such manufactured articles include: food packaging films (fresh and frozen foods, liquids and granular foods), stand-up pouches, retortable packaging and bag-in-box packaging; barrier films (oxygen, moisture, aroma, oil, etc.) and modified atmosphere packaging; light and heavy duty shrink films and wraps, collation shrink film, pallet shrink film, shrink bags, shrink bundling and shrink shrouds; light and heavy duty stretch films, hand stretch wrap, machine stretch wrap and stretch hood films; high clarity films; heavy-duty sacks; household wrap, overwrap films and sandwich bags; industrial and institutional films, trash bags, can liners, magazine overwrap, newspaper bags, mail bags, sacks and envelopes, bubble wrap, carpet film, furniture bags, garment bags, coin bags, auto panel films; medical applications such as gowns, draping and surgical garb; construction films and sheeting, asphalt films, insulation bags, masking film, landscaping film and bags; geomembrane liners for municipal waste disposal and mining applications; batch inclusion bags; agricultural films, mulch film and green house films; in-store packaging, self-service bags, boutique bags, grocery bags, carry-out sacks and t-shirt bags; oriented films, machine direction and biaxially oriented films and functional film layers in oriented polypropylene (OPP) films, e.g., sealant and/or toughness layers. Additional manufactured articles comprising one or more films containing at least one ethylene interpolymer product having intermediate branching include laminates and/or multilayer films; sealants and tie layers in multilayer films and composites; laminations with paper; aluminum foil laminates or laminates containing vacuum deposited aluminum; polyamide laminates; polyester laminates; extrusion coated laminates, and; hot-melt adhesive formulations. The manufactured articles summarized in this paragraph contain at least one film (monolayer or multilayer) comprising at least one embodiment of the disclosed intermediately branched ethylene interpolymer products.

Intermediately branched ethylene interpolymer product have performance attributes that are advantageous in many flexible applications. The performance attribute(s) required depends on how the film will be used, i.e., the specific film application the film is employed in. Ethylene interpolymer products having intermediate branching have a desirable balance of properties. Elaborating, relative to competitive polyethylenes of similar density and melt index, intermediately branched ethylene interpolymers have one or more of: improved dart impact; improved machine direction tensile strength; improved transverse direction tensile strength; improved a 45° gloss; and/or improved haze; relative to a comparative film. To be more clear: in the comparative film the second ethylene interpolymer having intermediate branching has been replaced with a comparative second ethylene interpolymer that does not contain intermediate branching. The improvements in film properties disclosed are not to be construed as limiting.

The films and/or flexible articles described above may optionally include, depending on its intended use, additives and adjuvants. Non-limiting examples of additives and adjuvants include, anti-blocking agents, antioxidants, heat stabilizers, slip agents, processing aids, anti-static additives, colorants, dyes, filler materials, light stabilizers, light absorbers, lubricants, pigments, plasticizers, nucleating agents and combinations thereof. Non-limiting examples of suitable primary antioxidants include Irganox 1010 [CAS Reg. No. 6683-19-8] and Irganox 1076 [CAS Reg. No. 2082-79-3]; both available from BASF Corporation, Florham Park, NJ, U.S.A. Non-limiting examples of suitable secondary antioxidants include Irgafos 168 [CAS Reg. No. 31570-04-4], available from BASF Corporation, Florham Park, NJ, U.S.A.; Weston 705 [CAS Reg. No. 939402-02-5], available from Addivant, Danbury CT, U.S.A. and; Doverphos Igp-11 [CAS Reg. No. 1227937-46-3] available form Dover Chemical Corporation, Dover OH, U.S.A.

Intermediately branched ethylene interpolymer products may also be converted into a wide variety of rigid manufactured articles, non-limiting examples include: deli containers, margarine tubs, drink cups and produce trays, bottle cap liners and bottle caps (for carbonated or non-carbonated fluids), closures (including closures with living hinge functionality), household and industrial containers, cups, bottles, pails, crates, tanks, drums, bumpers, lids, industrial bulk containers, industrial vessels, material handling containers, toys, bins, playground equipment, recreational equipment, boats, marine equipment, safety equipment (helmets), wire and cable applications such as power cables, communication cables and conduits, flexible tubing and hoses, pipe applications including both pressure pipe and non-pressure pipe markets (e.g., natural gas distribution, water mains, interior plumbing, storm sewer, sanitary sewer, corrugated pipes and conduit), foamed articles manufactured from foamed sheet or bun foam, military packaging (equipment and ready meals), personal care packaging, diapers and sanitary products, cosmetic/pharmaceutical/medical packaging, truck bed liners, pallets and automotive dunnage.

The rigid manufactured articles summarized above contain one or more intermediately branched ethylene interpolymer product or a blend of at least one intermediately branched ethylene interpolymer product with at least one other thermoplastic. Further, the rigid manufactured articles summarized above may be multilayer, comprising at least one layer comprising one or more ethylene interpolymer product having intermediate branching or a blend of at least one ethylene interpolymer product having intermediate branching with at least one other thermoplastic. Such rigid manufactured articles may be fabricated using the following non-limiting processes: injection molding, compression molding, blow molding, rotomolding, profile extrusion, pipe extrusion, sheet thermoforming and foaming processes employing chemical or physical blowing agents.

The rigid articles described above may optionally include, depending on its intended use, additives and adjuvants. Non-limiting examples of additives and adjuvants include, antioxidants, slip agents, processing aids, anti-static additives, colorants, dyes, filler materials, heat stabilizers, light stabilizers, light absorbers, lubricants, pigments, plasticizers, nucleating agents and combinations thereof.

Examples

Polymerization

The following examples are presented for the purpose of illustrating embodiments of this disclosure; it being understood, that the examples presented do not limit the claims presented.

In-Line Intermediate Branching Catalyst Formulation

Embodiments of ethylene interpolymer products having intermediate branching were prepared in a pilot plant using an intermediate branching catalyst formulation.

Methylpentane was used as the process solvent (a commercial blend of methylpentane isomers). The volume of the first CSTR reactor (R1) was 3.2 gallons (12 L), the volume of the second CSTR reactor (R2) was 5.8 gallons (22 L) and the volume of the tubular reactor (R3) was 0.58 gallons (2.2 L) or 4.8 gallons (18 L). The R1 pressure ranged from about 14 MPa to about 18 MPa; R2 was operated at a lower pressure to facilitate continuous flow from R1 to R2. In some embodiments R1, R2 and R3 were operated in series mode; wherein the first exit stream from R1 flows directly into R2. In other embodiments R1 and R2 were operated in parallel mode; wherein the first exit from R1 and the second exit stream from R2 are combined downstream of R2. R2 was agitated such that the reactor contents were well mixed; R1 was agitated if this reactor was utilized. Polymerization was conducted by continuously feeding fresh process solvent, ethylene, 1-octene and hydrogen to the reactor or reactors.

The solution process conditions employed to manufacture Examples 1 and 4 were summarized in Tables 1a and 1b. In Examples 1 an embodiment of the in-line intermediate branching catalyst formulation was injected into the second CSTR reactor (R2); in a similar manner, Example 2 was synthesized using the same in-line intermediate branching catalyst system. In Example 1, 80% of the ethylene was injected into R2 (i.e. the ethylene split ($ES^{R2}$) was 80% and the remaining ethylene was injected in the tubular third reactor (R3) ($ES^{R3}$ 20%). In Example 2, $ES^{R2}$ was 100%. Example 4 was produced by injecting a batch intermediate branching catalyst formulation into R2 and $ES^{R2}$ was 100%. In Examples 1, 2 and 4 all the comonomer (1-octene) was injected into R2, i.e. the comonomer split, $CS^{R2}$, was 100%. The physical and molecular characteristics of Examples 1, 2 and 4 were summarized in Table 2.

In the case of Examples 1 and 2, embodiments of the in-line intermediate branching catalyst formulation were prepared from the following components: component (v), butyl ethyl magnesium; component (vi), tertiary butyl chloride; component (vii), titanium tetrachloride; component (viii), diethyl aluminum ethoxide, and; component (ix), triethyl aluminum. In step one, a solution of triethylaluminum and dibutylmagnesium ((triethylaluminum)/(dibutylmagnesium) molar ratio of 20) was combined with a solution of tertiary butyl chloride and allowed to react for about 30 seconds (HUT-1); in step two, a solution of titanium tetrachloride was added to the mixture formed in step one and allowed to react for about 14 seconds (HUT-2), and; in step three, the mixture formed in step two was allowed to reactor for an additional 3 seconds (HUT-3) prior to injection into R2. The average solution temperature during HUT-1, $T^{HUT-1}$ was 65.3° C.; and the average solution temperature during HUT-2, $T^{HUT-2}$ was 71.1° C. The in-line intermediate branching catalyst formulation was formed in R2 by injecting a solution of diethyl aluminum ethoxide into R2. The quantity of component (vii), i.e. 'R2 (vii) (ppm)' added to reactor 2 (R2) was shown in Table 1a; to be more clear, in Example 1 the solution in R2 contained 6.4 ppm of $TiCl_4$. The mole ratios of the in-line intermediate branching catalyst components were also shown in Table 1a, specifically: (vi)/(v) or (tertiary butyl chloride)/(butyl ethyl magnesium); (viii)/(vii) or (diethyl aluminum ethoxide)/(titanium tetrachloride), and; (ix)/(vii) or (triethyl aluminum)/(titanium tetrachloride). In Example 1, the following mole ratios were used to synthesize the in-line intermediate branching catalyst formulation: R2 (vi)/(v)=1.78; R2 (viii)/(vii)=1.35, and; R2 (ix)/(vii)=0.35. Referring to FIG. 19, in Examples 1 and 2, 100% of the diethyl aluminum ethoxide in stream 10d, component (viii), was added to reactor 12a via stream 10h.

Average residence time of the solvent in a reactor is primarily influenced by the amount of solvent flowing through each reactor and the total amount of solvent flowing through the solution process, in the case of Examples 1 and 2 the typical average reactor residence times for R2 and R2 was about 73 and 50 seconds, respectively (R3 volume 18 L (4.8 gallons)).

Polymerization in the continuous solution polymerization process was terminated by adding a catalyst deactivator to the third exit stream exiting the tubular reactor (R3). The catalyst deactivator used was octanoic acid (caprylic acid), commercially available from P&G Chemicals, Cincinnati, OH, U.S.A. The catalyst deactivator was added such that the moles of fatty acid added were 50% of the total molar amount of titanium and aluminum added to the polymerization process; i.e. moles of octanoic acid added=0.5×(moles titanium+moles aluminum); this mole ratio was consistently used in all examples.

A two-stage devolitizing process was employed to recover the ethylene interpolymer product from the process solvent, i.e. two vapor/liquid separators were used and the second bottom stream (from the second V/L separator) was passed through a gear pump/pelletizer combination. DHT-4V (hydrotalcite), supplied by Kyowa Chemical Industry Co. LTD, Tokyo, Japan was used as a passivator, or acid scavenger. A slurry of DHT-4V in process solvent was added prior to the first V/L separator. The molar amount of DHT-4V added was 10-fold higher than the molar amount of tertiary butyl chloride and titanium tetrachloride added to the solution process.

Prior to pelletization the ethylene interpolymer product was stabilized by adding about 500 ppm of Irganox 1076 (a primary antioxidant) and about 500 ppm of Irgafos 168 (a secondary antioxidant), based on weight of the ethylene interpolymer product. Antioxidants were dissolved in process solvent and added between the first and second V/L separators. The targeted ethylene interpolymer product was 1.0 melt index (I2) (ASTM D1239, 2.16 kg load, 190° C.) and 0.920 g/cm³ (ASTM D792). As shown in Table 1b, Examples 1 was produced at production rates of 98.3 kg/hr.

Batch Intermediate Branching Catalyst Formulation

Using a batch intermediate branching catalyst formulation an intermediately branched ethylene interpolymer product was prepared in the pilot plant (described above); specifically, Example 4 in Tables 1a and 1b.

The batch intermediate branching procatalyst was injected into R2 using a batch delivery system. The batch delivery system consisted of an agitated catalyst storage tank, recirculation loop, a metering pump and solvent diluent loop. The batch intermediate branching procatalyst was prepared in the Catalyst Synthesis Unit (CSU), described below, and transferred to the agitated catalyst storage tank using nitrogen. Once transferred, the agitator in the catalyst storage tank and the recirculation pump were started to keep the batch intermediate branching procatalyst suspended to maintain a constant composition in the slurry. The temperature in the storage tank was maintained at ambient temperature and the tank pressure was 300 kPag. The batch intermediate branching procatalyst was transferred from the storage tank to the reactor using the metering pump and a high flow solvent diluent. To be more clear, the discharge from the metering pump was combined with a high flow solvent diluent having a flow rate of 15 kg/hr; the diluent was used to facilitate procatalyst injection into R2. A flow meter recorded the flow rate of the combined batch intermediate branching procatalyst and the high flow diluent. The amount of batch intermediate branching procatalyst injected into R2 was controlled/adjusted by changing the metering pump's variable frequency drive or pump stroker. The co-catalyst, diethyl aluminum ethoxide (component (viii)), was injected into the reactor (R2) through a separate line forming the active batch intermediate branching catalyst formulation. Typically, procatalyst flow rate was adjusted such that more than 80% of the ethylene was converted to polyethylene in R2. The quantity of the batch intermediate branching catalyst formulation added to R2 was expressed as the parts-per-million (ppm) of component (vii) in the reactor solution, i.e. R2 batch (vii) was 0.97 ppm for Example 4, as shown in Table 1a; the R2 batch (viii)/(vii) was 4.0, stream 60e flow rate was 30,370 g/hr and the R2 batch catalyst inlet temperature was 31.9° C. The physical properties of Example 4 were summarized in Table 2.

Batch Intermediate Branching Procatalyst Formulation

The batch intermediate branching procatalyst was prepared in the Catalyst Synthesis Unit (CSU). The CSU included a continuously stirred tank reactor coded CSU-1, having a volume of 2.1 L, designed for pressures up to 20.6 MPa and temperatures up to 350° C. As described below, the batch intermediate branching procatalyst was prepared in a batch-wise fashion in CSU-1 from the following components: component (v), butyl ethyl magnesium; component (vi), tertiary butyl chloride; component (vii), titanium tetrachloride; component (viii), diethyl aluminum ethoxide, and; component (x), isobutyl aluminum dichloride. First, magnesium dichloride was formed in CSU-1. Although the $MgCl_2$ reaction did not require pressure, CSU-1 was operated at 100 psi $N_2$ pressure to ensure inert conditions, temperature was controlled at 50° C. using a recirculating heating bath connected to the jacket on CSU-1 and agitator speed was 600 rpm. Using diaphragm pumps, components (v) and (vi) were continuously added to CSU-1 from their respective 5.5 L reagent vessels such that the [component (vi)]/[component (v)] mole ratio was about 2.2. After about 100 minutes 1.5 L of $MgCl_2$ slurry had been collected in CSU-1 and the flows of components (v) and (vii) were stopped. Using a diaphragm pump component (x), stored in a 0.15 L reagent vessel, was pumped to CSU-1 and the reactor was stirred at 50° C. for an additional 15 minutes; the [(component (x)]/[(component (v)] mole ratio was about 0.23. Using a diaphragm pump component (vii), stored in a 0.15 L reagent vessel, was pumped to CSU-1 and the reactor was stirred at 50° C. for an additional 10 minutes; the [(component (v)]/[(component (vii)] mole ratio was about 7.5. The batch intermediate branching procatalyst formulation was formed by adding component (viii). Using a diaphragm pump, component (viii) was pumped from its 0.15 L reagent vessel to CSU-1 and the reactor was heated to 85° C. and stirred for 90 minutes; the [(component (viii)]/[(component (vii)] mole ratio was from about 1.0 to about 1.65. The batch intermediate branching procatalyst was pumped from CSU-1 to the catalyst storage tank and injected in R2 was required.

Mixed Catalyst Examples

The following examples were presented to illustrate embodiments of ethylene interpolymer products produced using two catalyst formulations; these interpolymers contained a component A and a component B; wherein component B contained intermediate branching and component A did not contain intermediate branching and may, or may not, contain long chain branching. It is understood that the following examples do not limit the claims presented.

The solution pilot plant described above was used to manufacture Example 5. Tables 10a and 10b disclosed the process conditions employed to manufacture Example 5; where an unbridged single site catalyst formulation was employed in reactor 1 (R1) and an in-line intermediate branching catalyst formulation (fully described above) was employed in reactor 2 (R2). The unbridged single site catalyst formulation included the following components: component (i), cyclopentadienyl tri(tertiary butyl)phosphinimine titanium dichloride, (Cp[(t-Bu)$_3$PN]TiCl$_2$) (abbreviated PIC-1 in Table 10a); component (ii), methylaluminoxane (MAO-07); component (iii), trityl tetrakis(pentafluoro-phenyl)borate, and; component (iv), 2,6-di-tert-butyl-4-ethylphenol. The unbridged single site catalyst component solvents used were methylpentane for components (ii) and (iv) and xylene for components (i) and (iii). The quantity of PIC-1 added "R1 (i) (ppm)" was 0.12 ppm; i.e. the solution in R1 contained 0.12 ppm of PIC-1. The mole ratios of the catalyst components in R1 were: (ii)/(i) or [(MAO-07)/(PIC-1)] was 100; (iv)/(ii) or [(2,6-di-tert-butyl-4-ethylphenol)/(MAO-07)] was 0.0, and; (iii)/(i) or [(trityl tetrakis(pentafluoro-phenyl)borate)/(PIC-1)] was 1.1. Additional solution process parameters are disclosed in Table 10b; for example, given the ethylene splits of 40/60 ($ES^{R1}$/

$ES^{R2}$), Example 5 contained about 40 wt % of component A and about 60 wt % of component B. PIC-1 produced an ethylene/1-octene interpolymer, component A, that did not contain long chain branching or intermediate branching. The in-line intermediate branching catalyst formulation produced an ethylene/1-octene interpolymer, component B, that contained intermediate branching and did not contain long chain branching. In Example 5, the average solution temperature during HUT-1, $T^{HUT-1}$ was 64.0° C.; and the average solution temperature during HUT-2 $T^{HUT-2}$ was 70.5° C. The in-line intermediate branching catalyst formulation was formed in R2 by injecting a solution of diethyl aluminum ethoxide into R2.

The solution pilot plant described above was also used to manufacture Examples 10 and 11. Examples 10 and 11 were manufactured employing a bridged metallocene catalyst formulation in reactor 1 (R1) and the in-line intermediate branching catalyst formulation (described above) in reactor 2 (R2) as shown in Tables 10a and 10b. The following components were used to prepare the bridged metallocene catalyst formulation: component (i), diphenylmethylene(cyclopentadienyl)(2,7-di-t-butylfuorenyl) hafnium dimethyl, [(2,7-tBu$_2$Flu)Ph$_2$C(Cp)HfMe$_2$] (abbreviated CpF-2 in Table 10a); component (ii) methylaluminoxane (MMAO-07); component (iii) trityl tetrakis(pentafluoro-phenyl)borate, and; component (iv) 2,6-di-tert-butyl-4-ethylphenol.

The bridged metallocene catalyst component solvents used were methylpentane for components (ii) and (iv) and xylene for components (i) and (iii). The quantity of CpF-2 added "R1 (i) (ppm)" was 0.38 ppm; i.e. the solution in R1 contained 0.38 ppm of CpF-2. In the case of Example 10, the mole ratios of the catalyst components in R1 were: (ii)/(i) or [(MAO-07)/(CpF-2)] was 64.2; (iv)/(ii) or [(2,6-di-tert-butyl-4-ethylphenol)/(MAO-07)] was 0.16, and; (iii)/(i) or [(trityl tetrakis(pentafluoro-phenyl)borate)/(CpF-2)] was 1.20. Additional solution process parameters were disclosed in Table 10b. Example 10 was manufactured with R1 and R2 operating in series mode and given an ethylene split of 50/50 ($ES^{R1}/ES^{R2}$); i.e. Example 10 contained about 50 wt % of a component A and about 50 wt % of a component B. Example 11 was manufactured with R1 and R2 operating in parallel mode and given an ethylene split of 40/60 ($ES^{R1}/ES^{R2}$) Example 11 contained about 40 wt % of a component A and about 60 wt % of a component B. CpF-2 produced an ethylene/1-octene interpolymer, component A, that contained long chain branching but did not contain intermediate branching. The in-line intermediate branching catalyst formulation produced an ethylene/1-octene interpolymer, component B, that contained intermediate branching and did not contain long chain branching. In Example 10, the average solution temperature during HUT-1, $T^{HUT-1}$ was 65.3° C.; and the average solution temperature during HUT-2, $T^{HUT-2}$ was 62.8° C. In Example 11, the average solution temperature during HUT-1, $T^{HUT-1}$ was 64.8° C.; and the average solution temperature during HUT-2, $T^{HUT-2}$ was 66.1° C. In both Examples 10 and 11, the in-line intermediate branching catalyst formulation was formed in R2 by injecting a solution of diethyl aluminum ethoxide into R2.

Blown Films

The following examples are presented for the purpose of illustrating embodiments of manufactured articles, specifically blown films; it being understood that articles of manufacture are not limited to blown films.

Monolayer blown films were produced on a monolayer blown film line (Macro Engineering, Mississauga, Ontario, Canada). This line was equipped with: a 3-inch diameter (7.62-cm) barrel; a Maddox mixing screw; a low pressure, four-port spiral mandrel die with a 35 mil (0.089 cm) die gap; and a dual ring. Blown films were produced at thicknesses of 1.0, 2.0 and 4.0 mil (25.4, 50.8 and 101.6 μm) employing the experimental conditions disclosed in Table 22. Examples 2 and 3 were produced in the solution pilot plant (described above) using an in-line intermediate branching catalyst formulation and similar process conditions as those used to manufacture Example 1 (0.9191 g/cm$^3$, 0.90 dg/min) as disclosed in Tables 1a and 1b; Example 2 was an ethylene/1-octene interpolymer having a density of 0.9208 g/cm$^3$ and a melt index of 1.02; Example 3 was an ethylene/1-octene interpolymer having a density of 0.9200 g/cm$^3$ and a melt indexes of 0.96 dg/min. Given the fact that Examples 2 and 3 were manufactured using a similar in-line intermediate branching catalyst formulation, the same pilot plant and similar process conditions; Examples 2 and 3 contained a level of intermediate branching similar to Example 1. Comparative 2 was an ethylene/1-octene interpolymer produced with a comparative batch Ziegler-Natta catalyst formulation that did not produce intermediate branching; the physical properties of Comparative 2 were summarized in Table 2, e.g. 0.9208 g/cm$^3$ and 0.97 dg/min.

Table 23 disclosed the blown film properties of: (i) Example 2; about 1 mil film; (ii) Example 3, about 2 mil and about 4 mil films; and (iii) Comparative Example 2, about 2 mil and about 4 mil films. At least one advantage of films manufactured from ethylene interpolymer products having intermediate branching was an improved (higher) dart impact; relative to comparative films manufactured from comparative ethylene interpolymer products that do not contain intermediate branching. More specifically, as disclosed in Table 23, the 2 mil film prepared from Example 3 had a dart impact of 365 g/mil which was 109% improved relative to the dart impact of the film prepared from Comparative 2, i.e. 175 g/mil. Similarly, the 4 mil film prepared from Example 3 had a dart impact of 256 g/mil which was 71% improved relative to the dart impact of the film prepared from Comparative 2, i.e. 150 g/mil.

Table 24 compares the monolayer blown film properties of Example 6 with Comparative 9. Example 6 has been discussed previously. Example 6 was an ethylene/1-octene interpolymer product containing the following two components: A) about 40 wt % of a first ethylene interpolymer produced using an unbridged single site catalyst formulation in a first reactor; and B) about 60 wt % of a second ethylene interpolymer produced using an in-line intermediate branching catalyst formulation in a second reactor; where the two reactors were operated in series. As shown in Table 24, Example 6 and Comparative 9 had the same density and melt index. However, Comparative 9 did not contain intermediate branching. Comparative 9 was an ethylene/1-octene interpolymer product containing two components: A) about 40 wt % of a first ethylene interpolymer produced using an unbridged single site catalyst formulation in a first reactor; and B) about 60 wt % of a second ethylene interpolymer produced using an unbridged single site catalyst formulation in a second reactor (same catalyst in both reactors); where the two reactors were operated in series. Several advantages of films manufactured from ethylene interpolymer products having intermediate branching are evident in Table 24; relative to the Comparative 9 film. For example, monolayer films (1.0 mil) prepared from Example 6 had improved (higher) dart impact relative to Comparative 9 monolayer films (1.0 mil); i.e. 824 g, relative to 475 g, respectively, a 74% higher dart impact. The Example 6 film had improved (higher) machine direction (MD) tensile strength relative to the Comparative 9 film; i.e. 56 MPa, relative to 49 MPa, respectively, a 14% higher MD tensile strength. The Example 6 film had improved (higher) transverse direction (TD) tensile strength relative to the Comparative 9 film; i.e. 47 MPa, relative to 40 MPa, respectively, an 18% higher TD tensile strength. Example 6 films also had improved optical properties relative to Comparative 9 films. Specifically, the Example 6 film had improved (higher) 45° gloss relative to the Comparative 9 film, i.e. 73, relative to 35, respectively, which was a 108% improvement in film 450 gloss; and the film haze was improved (lower); i.e. 11%, relative to 22%, respectively, a −73% improvement in film haze.

Testing Methods

Prior to testing, each specimen was conditioned for at least 24 hours at 23±2° C. and 50±10% relative humidity and subsequent testing was conducted at 23±2° C. and 50 +10% relative humidity. Herein, the term "ASTM conditions" refers to a laboratory that is maintained at 23±2° C. and 50±10% relative humidity; and specimens to be tested were conditioned for at least 24 hours in this laboratory prior to testing. ASTM refers to the American Society for Testing and Materials.

Density

Ethylene interpolymer density was determined using ASTM D792-13 (Nov. 1, 2013).

Melt Index

Ethylene interpolymer melt index was determined using ASTM D1238 (Aug. 1, 2013). Melt indexes, $I_2$, $I_6$, $I_{10}$ and $I_{21}$ were measured at 190° C., using weights of 2.16 kg, 6.48 kg, 10 kg and a 21.6 kg respectively. The terms High Load Melt Index (HLMI) and $I_{21}$ are equivalent. The term Melt Flow Ratio (MFR) is defined as $I_{21}/I_2$. Herein, the term "stress exponent" or its acronym "S.Ex.", is defined by the following relationship:

$$S.Ex.=\log(I_6/I_2)/\log(6480/2160)$$

wherein $I_6$ and $I_2$ are the melt flow rates measured at 190° C. using 6.48 kg and 2.16 kg loads, respectively.

Conventional Size Exclusion Chromatography (SEC)

Ethylene interpolymer (polymer) solutions (1 to 3 mg/mL) were prepared by heating the polymer in 1,2,4-trichlorobenzene (TCB) and rotating on a wheel for 4 hours at 150° C. in an oven. An antioxidant (2,6-di-tert-butyl-4-methylphenol (BHT)) was added to the mixture in order to stabilize the polymer against oxidative degradation. The BHT concentration was 250 ppm. Polymer solutions were chromatographed at 140° C. on a PL 220 high-temperature chromatography unit equipped with four Shodex columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect GPC columns from oxidative degradation. The sample injection volume was 200 μL. The GPC columns were calibrated with narrow distribution polystyrene standards. The polystyrene molecular weights were converted to polyethylene molecular weights using the Mark-Houwink equation, as described in the ASTM standard test method D6474-12 (December 2012). The GPC raw data were processed with the Cirrus GPC software, to produce molar mass averages ($M_n$, $M_w$, $M_z$) and molar mass distribution (e.g. Polydispersity, $M_w/M_n$). In the polyethylene art, a commonly used term that is equivalent to SEC is GPC, i.e. Gel Permeation Chromatography.

Triple Detection Size Exclusion Chromatography (3D-SEC)

Ethylene interpolymer (polymer) sample solutions (1 to 3 mg polymer/mL) were prepared by heating the polymer in 1,2,4-trichlorobenzene (TCB) and rotating on a wheel for 4 hours at 150° C. in an oven. An antioxidant (2,6-di-tert-butyl-4-methylphenol (BHT)) was added to the mixture to stabilize the polymer against oxidative degradation. The BHT concentration was 250 ppm. Sample solutions were chromatographed at 140° C. on a PL 220 high temperature chromatography unit equipped with a differential refractive index (DRI) detector, a dual-angle light scattering detector (15 and 90 degree) and a differential viscometer. The SEC columns used were either four Shodex columns (HT803, HT804, HT805 and HT806), or four PL Mixed ALS or BLS columns. TCB was the mobile phase with a flow rate of 1.0 mL/minute, BHT was added to the mobile phase at a concentration of 250 ppm to protect SEC columns from oxidative degradation. The sample injection volume was 200 μL. The SEC raw data were processed with the Cirrus GPC software, to produce absolute molar masses and intrinsic viscosity ([η]) and viscosity average molar mass ($M_v$). The term "absolute" molar mass was used to distinguish 3D-SEC determined absolute molar masses from the molar masses determined by conventional SEC. The viscosity average molar mass ($M_v$) and intrinsic viscosity ([η]) determined by 3D-SEC were used in calculations to determine the Long Chain Branching Factor (LCBF).

Triple Detection Cross Fractionation Chromatography (3D-CFC)

A polymer sample (150 to 300 mg) was introduced into the sample dissolution vessel of the Polymer Char Crystaf-TREF unit. The sample dissolution vessel was then filled with 35 ml 1,2,4-trichlorobenzene (TCB) containing 250 ppm antioxidant 2,6-di-tert-butyl-4-methylphenol (BHT), heated to the desired dissolution temperature (e.g. 140° C.) and stirred for 2 to 3 hours. The polymer solution (1.5 ml) was then loaded into the TREF column filled with stainless steel beads. After being allowed to equilibrate at a given stabilization temperature (e.g. 110° C.) for 20 to 45 minutes, the polymer solution was allowed to crystallize with a temperature drop from the stabilization temperature to 30° C. (0.2° C./minute). After equilibrating at 30° C. for 90 minutes, the crystallized sample was eluted with TCB from 30 to 140° C., while dividing the effluent into a number of fractions (e.g. 5 to 20 fractions). For each fraction, the TREF column was heated (the heating rate in the step-elution was 1.0° C./minute) to the specific dissolution temperature and maintained at that temperature for at least 50 minute before the solution of the fraction was eluted and introduced directly to a SEC system through a heated transfer line. All above steps, including the sample dissolution, sample solution loading into TREF column, crystallization and elution, were programmed and controlled with the Polymer Char TREF software with the step-elution capability. The various polymer fractions were chromatographed at 140° C. on a PL 220 high-temperature chromatography unit equipped with either four Shodex columns (HT803, HT804, HT805 and HT806), or four PL Mixed ALS or BLS columns, and with a differential refractive index (DRI) as the concentration detector. A dual-angle light scattering detector (15 and 90 degree) and a differential viscometer were used to measure the molar mass and intrinsic viscosity, respectively. TCB was the mobile phase with a flow rate of 1.0 mL/minute, BHT was added to the mobile phase at a concentration of 250 ppm to protect SEC columns from oxidative degradation. The data were acquired using Cirrus GPC software and processed with Cirrus GPC software and Excel spreadsheet to produce absolute molar masses and intrinsic viscosity [η]. The term "absolute" molar mass was used to distinguish 3D-SEC determined absolute molar masses from the molar masses determined by conventional SEC. The viscosity average molar mass ($M_v$) and intrinsic viscosity [η] of each 3D-CFC TREF fraction determined by 3D-CFC were used in calculations to determine the Non-Comonomer Index ($NCI^f$) and the Non-Comonomer Index Distribution ($NCID_i$).

Referring to Eq. (4) where $NCI^f$ was defined; ($M_v^f$) (g/mole) and $[\eta]^f$ (dL/g) were the viscosity average molar mass and the intrinsic viscosity, respectively, of the $f^{th}$ TREF fraction as determined with 3D-CFC; $T^f$ was the weight average TREF elution temperature of the $f^{th}$ TREF fraction (details regarding $T^f$ are described below); and A, B and C were constants specific to the α-olefin comonomer in the ethylene/α-olefin interpolymer under test. In the case of 1-octene: A was 2.1626; B was −0.6737 and C was 63.6727. Constants A, B and C for other α-olefins were determined experimentally (non-limiting examples include 1-hexene). Elaborating, a series of linear ethylene/α-olefin interpolymers with different comonomer contents were analyzed with triple detection size exclusion chromatography (3D-SEC) in TCB at 140° C., in which the viscosity average molar masses ($M_v$) and the intrinsic viscosities ([η]) of the linear ethylene/α-olefin interpolymers were determined and were used to calculate the Mark-Houwink constants K based on the Mark-Houwink equation ($[\eta]=K \times (M_v)^\alpha$). Well-known to those of ordinary experience, the Mark-Houwink constant α is 0.725 for ethylene/α-olefin interpolymers. Using simple regression, a plot of Mark-Houwink constants K versus comonomer contents [$CH_3$/1000C] of the linear ethylene/α-olefin interpolymers generated the following relationship:

$$K=(slope)[CH_3/1000C]+intercept \quad \text{Eq. (16)}$$

In this disclosure, the constant A in Eq. (4) was defined by the (slope) in Eq. (16); specifically, $A=-1000000 \times (slope)$. The constants B and C in Eq. (4) were calculated from the linear correlation between comonomer contents and the weight average elution temperatures of ethylene/α-olefin interpolymers based on re-constructed analytical TREF profiles of the ethylene/α-olefin interpolymers (see details below); the constant B was the slope and the constant C was the intercept. For example, in this disclosure for α-octene comonomer, constants A, B and C were 2.1626, −0.6737 and 63.6727 respectively.

$T^f$, in Eq. (4), the weight average TREF elution temperature of the $f^{th}$ 3D-CFC TREF fraction, was calculated based on the re-constructed analytical TREF profile of the ethylene/α-olefin interpolymer. The re-constructed analytical TREF profile was obtained by simply replacing the original elution temperatures in analytical TREF analysis performed on a Polymer Char Crystaf-TREF instrument, hereafter CTREF, with the equivalents of 3D-CFC elution temperature. The conversion of the original elution temperatures to the equivalents of 3D-CFC elution temperature enables one to compensate for differences in flow during the elution stage, i.e. dynamic (with a flow) while heating in CTREF, in contrast with static elution (without a flow) while heating in 3D-CFC; as well as for any other difference between these instruments (if any). To do this conversion, a series of ethylene/α-olefin interpolymers having different comonomer contents and randomly distributed comonomer units were analyzed with both CTREF (Polymer Char Crystaf-TREF unit) and 3D-CFC. In this calibration procedure, the range of elution temperature in 3D-CFC analysis for each TREF fraction was very narrow (e.g., 1 to 2 degrees whenever possible and not greater than 5 degrees) and the average of the low and high temperatures of the TREF fraction was used to define the elution temperature of the 3D-CFC TREF fraction, e.g. 42.5° C. was the elution temperature for the 40° C. to 45° C. fraction. The weight average elution temperature of the entire ethylene/α-olefin interpolymer was calculated from the weight fraction and the elution temperature of each 3D-CFC TREF fraction. From the correlations between comonomer contents and the weight average elution temperatures of ethylene/α-olefin interpolymers in 3D-CFC and CTREF, the relation between the weight average elution temperatures between 3D-CFC and CTREF could be established and this relation was used to convert the original elution temperatures in CTREF analysis to 3D-CFC elution temperatures. In this disclosure, the relation between the weight average elution temperatures of 3D-CFC ($T_{CFC}$) and the weight average elution temperatures of CTREF ($T_{CTREF}$) was described by the following relationship.

$$T_{CFC}=0.9776\ T_{CTREF}-0.7156$$

This relationship was used to convert the original CTREF elution temperatures to the equivalents of 3D-CFC elution temperature in re-construction of the analytical TREF profiles, for calculating the $T^f$, the weight average TREF elution temperature of the $f^{th}$ 3D-CFC TREF fraction and for calculating the constants B and C in Eq. (4).

Dynamic Mechanical Analysis (DMA)

Oscillatory shear measurements under small strain amplitudes were carried out to obtain linear viscoelastic functions at 190° C. under nitrogen atmosphere, at a strain amplitude of 10% and over a frequency range of 0.02-126 rad/s at 5 points per decade. Frequency sweep experiments were performed with a TA Instruments DHR3 stress-controlled rheometer using cone-plate geometry with a cone angle of 5°, a truncation of 137 μm and a diameter of 25 mm. In this experiment a sinusoidal strain wave was applied and the stress response was analyzed in terms of linear viscoelastic functions. The zero shear rate viscosity ($\eta_0$) based on the DMA frequency sweep results was determined using the Ellis model (see R. B. Bird et al. "Dynamics of Polymer Liquids. Volume 1: Fluid Mechanics" Wiley-Interscience Publications (1987) p. 228).

Composition Distribution Branching Index (CDBI)

The "Composition Distribution Branching Index", hereinafter CDBI, of the disclosed Examples and Comparative Examples were measured using a CRYSTAF/TREF 200+ unit equipped with an IR detector, hereinafter CTREF. The acronym "TREF" refers to Temperature Rising Elution Fractionation. The CTREF was supplied by PolymerChAR S.A. (Valencia Technology Park, Gustave Eiffel, 8, Paterna, E-46980 Valencia, Spain). The CTREF was operated in the TREF mode, which generates the chemical composition of the polymer sample as a function of elution temperature, the Co/Ho ratio (Copolymer/Homopolymer ratio) and the CDBI (the Composition Distribution Breadth Index), i.e. $CDBI_{50}$. A polymer sample (80 to 100 mg) was placed into the reactor vessel of the CTREF. The reactor vessel was filled with 35 ml of 1,2,4-trichlorobenzene (TCB) and the polymer was dissolved by heating the solution to 150° C. for 2 hours. An aliquot (1.5 mL) of the solution was then loaded into the CTREF column which was packed with stainless steel beads. The column, loaded with sample, was allowed to stabilize at 110° C. for 45 minutes. The polymer was then crystallized from solution, within the column, by dropping the temperature to 30° C. at a cooling rate of 0.09° C./minute. The column was then equilibrated for 30 minutes at 30° C. The crystallized polymer was then eluted from the column with TCB flowing through the column at 0.75 mL/minute, while the column was slowly heated from 30° C. to 120° C. at a heating rate of 0.25° C./minute. The raw CTREF data were processed using Polymer ChAR software, an Excel spreadsheet and CTREF software developed in-house. $CDBI_{50}$ was defined as the percent of polymer whose composition was within 50% of the median comonomer composition; $CDBI_{50}$ was calculated from the composition distribution cure and the normalized cumulative integral of the composition distribution curve, as described in U.S. Pat. No. 5,376,439. Those skilled in the art will understand that a calibration curve was required to convert a CTREF elution temperature to comonomer content, i.e. the amount of comonomer in the ethylene/α-olefin polymer fraction that eluted at a specific temperature. The generation of such calibration curves were described in the prior art, e.g. Wild, et al., J. Polym. Sci., Part B, Polym. Phys., Vol. 20 (3), pages 441-455: hereby fully incorporated by reference. At the end of each sample run, the CTREF column was cleaned for 30 minutes; specifically, with the CTREF column temperature at 160° C., TCB flowed (0.5 mL/minute) through the column for 30 minutes.

Neutron Activation (Elemental Analysis)

Neutron Activation Analysis, hereinafter N.A.A., was used to determine catalyst residues in ethylene interpolymer products as follows. A radiation vial (composed of ultrapure polyethylene, 7 mL internal volume) was filled with an ethylene interpolymer product sample and the sample weight was recorded. Using a pneumatic transfer system the sample was placed inside a SLOWPOKE™ nuclear reactor (Atomic Energy of Canada Limited, Ottawa, Ontario, Canada) and irradiated for 30 to 600 seconds for short half-life elements (e.g., Ti, V, Al, Mg, and Cl) or 3 to 5 hours for long half-life elements (e.g. Zr, Hf, Cr, Fe and Ni). The average thermal neutron flux within the reactor was $5 \times 10^{11}/cm^2/s$. After irradiation, samples were withdrawn from the reactor and aged, allowing the radioactivity to decay; short half-life elements were aged for 300 seconds or long half-life elements were aged for several days. After aging, the gamma-ray spectrum of the sample was recorded using a germanium semiconductor gamma-ray detector (Ortec model GEM55185, Advanced Measurement Technology Inc., Oak Ridge, TN, USA) and a multichannel analyzer (Ortec model DSPEC Pro). The amount of each element in the sample was calculated from the gamma-ray spectrum and recorded in parts per million relative to the total weight of the ethylene interpolymer product sample. The N.A.A. system was calibrated with Specpure standards (1000 ppm solutions of the desired element (greater than 99% pure)). One mL of solutions (elements of interest) were pipetted onto a 15 mm×800 mm rectangular paper filter and air dried. The filter paper was then placed in a 1.4 mL polyethylene irradiation vial and analyzed by the N.A.A. system. Standards are used to determine the sensitivity of the N.A.A. procedure (in counts/μg).

Unsaturation

The quantity of unsaturated (Unsat.) groups, i.e. double bonds, in an ethylene interpolymer product was determined according to ASTM D3124-98 (vinylidene unsaturation, published March 2011) and ASTM D6248-98 (vinyl and trans unsaturation, published July 2012). An ethylene interpolymer product sample was: a) first subjected to a carbon disulfide extraction to remove additives that may interfere with the analysis; b) the sample (pellet, film or granular form) was pressed into a plaque of uniform thickness (0.5 mm), and; c) the plaque was analyzed by FTIR.

Comonomer Content: Fourier Transform Infrared (FTIR) Spectroscopy

The quantity (mol % (or wt %)) of comonomer in an ethylene interpolymer product was determined by FTIR and reported as the Short Chain Branching (SCB) content having dimensions of $CH_3\#/1000C$ (number of methyl branches per 1000 carbon atoms). This test was completed according to ASTM D6645-01 (2001), employing a compression molded polymer plaque and a Thermo-Nicolet 750 Magna-IR Spectrophotometer. The polymer plaque was prepared using a compression molding device (Wabash-Genesis Series press) according to ASTM D4703-16 (April 2016).

Creep Test

Creep measurements were performed by an Anton Paar MCR 501 rheometer at 190° C. using 25 mm parallel plate geometry under nitrogen atmosphere. In this experiment, a compression molded circular plaque with a thickness of 1.8 mm was placed between the pre-heated upper and lower measurement fixtures and allowed to come to thermal equilibrium. The upper plate was then lowered to 50 μm above the testing gap size of 1.5 mm. At this point, the excess material was trimmed off and the upper fixture was lowered to the measurement gap size. A waiting time of 10 min after sample loading and trimming was applied to avoid residual stresses causing the strain to drift. In the creep experiment, the shear stress was increased instantly from 0 to 20 Pa and the strain was recorded versus time. The sample continued to deform under the constant shear stress and eventually reached a steady rate of straining. Creep data was reported in terms of creep compliance (J(t)) which has the units of reciprocal modulus. The inverse of J(t) slope in the steady creeping regime was used to calculate the zero shear rate viscosity based on the linear regression of the data points in the last 10% time window of the creep experiment.

In order to determine if the sample was degraded during the creep test, frequency sweep experiments under small strain amplitude (10%) were performed before and after creep stage over a frequency range of 0.1-100 rad/s. The difference between the magnitude of complex viscosity at 0.1 rad/s before and after the creep stage was used as an indicator of thermal degradation. The difference should be less than 5% to consider the creep determined zero shear rate viscosity acceptable.

Creep experiments confirmed that Linear Reference Line (see FIG. 18) for linear ethylene interpolymers was also valid if the creep determined $\eta_0$ was used rather than the DMA determined $\eta_0$. In this disclosure, the LCBF (Long Chain Branching Factor) was determined using the DMA determined $\eta_0$. To be absolutely clear, the zero shear viscosity (ZSV [poise]) data reported in Tables 19a, 19b, 20 and 21 were measured using DMA.

Hexane Extractables (Plaque)

Hexane extractables using compression molded plaques were determined according to ASTM D5227.

Film Dart Impact

Film dart impact strength was determined using ASTM D1709-09 Method A (May 1, 2009). In this disclosure the dart impact test employed a 1.5 inch (38 mm) diameter hemispherical headed dart.

Film Tensile

The following film tensile properties were determined using ASTM D882-12 (Aug. 1, 2012): tensile break strength (MPa), elongation at break (%), tensile yield strength (MPa), tensile elongation at yield (%) and tensile energy to break (J). Tensile properties were measured in the both the machine direction (MD) and the transverse direction (TD) of the blown films.

Film Secant Modulus

The secant modulus is a measure of film stiffness. The secant modulus is the slope of a line drawn between two points on the stress-strain curve, i.e. the secant line. The first point on the stress-strain curve is the origin, i.e. the point that corresponds to the origin (the point of zero percent strain and zero stress), and; the second point on the stress-strain curve is the point that corresponds to a strain of 1%; given these two points the 1% secant modulus is calculated and is expressed in terms of force per unit area (MPa). The 2% secant modulus is calculated similarly. This method is used to calculated film modulus because the stress-strain relationship of polyethylene does not follow Hook's law; i.e. the stress-strain behavior of polyethylene is non-linear due to its viscoelastic nature. Secant moduli were measured using a conventional Instron tensile tester equipped with a 200 lbf load cell. Strips of monolayer film samples were cut for testing with following dimensions: 14 inch long, 1 inch wide and 1 mil thick; ensuring that there were no nicks or cuts on the edges of the samples. Film samples were cut in both the machine direction (MD) and the transverse direction (TD) and tested. ASTM conditions were used to condition the samples. The thickness of each film was accurately measured with a hand-held micrometer and entered along with the sample name into the Instron software. Samples were loaded in the Instron with a grip separation of 10 inch and pulled at a rate of 1 inch/min generating the strain-strain curve. The 1% and 2% secant modulus were calculated using the Instron software.

Film Elmendorf Tear

Film tear performance was determined by ASTM D1922-09 (May 1, 2009); an equivalent term for tear is "Elmendorf tear". Film tear was measured in both the machine direction (MD) and the transverse direction (TD) of the blown films.

Film Opticals

Film optical properties were measured as follows: Haze, ASTM D1003-13 (Nov. 15, 2013), and; Gloss ASTM D2457-13 (Apr. 1, 2013).

Film Hot Tack

In this disclosure, the "Hot Tack Test" was performed as follows, using ASTM conditions. Hot tack data was generated using a J&B Hot Tack Tester which is commercially available from Jbi Hot Tack, Geloeslaan 30, B-3630 Maamechelen, Belgium. In the hot tack test, the strength of a polyolefin to polyolefin seal is measured immediately after heat sealing two film samples together (the two film samples were cut from the same roll of 2.0 mil (51-μm) thick film), i.e. when the polyolefin macromolecules that comprise the film are in a semi-molten state. This test simulates the heat sealing of polyethylene films on high speed automatic packaging machines, e.g., vertical or horizontal form, fill and seal equipment. The following parameters were used in the J&B Hot Tack Test: film specimen width, 1 inch (25.4 mm); film sealing time, 0.5 second; film sealing pressure, 0.27 N/mm$^2$; delay time, 0.5 second; film peel speed, 7.9 in/second (200 mm/second); testing temperature range, 203° F. to 293° F. (95° C. to 145° C.); temperature increments, 9° F. (5° C.); and five film samples were tested at each temperature increment to calculate average values at each temperature. The following data was recorded for the disclosed Example films and Comparative Example films: the "Tack Onset @ 1.0 N (° C.)", the temperature at which a hot tack force of 1N was observed (average of 5-film samples); "Hot tack Strength (N)" was the maximum hot tack force observed (average of 5-film samples) over the testing temperature range.

Film Heat Seal Strength

In this disclosure, the "Heat Seal Strength Test" was performed as follows. ASTM conditions were employed. Heat seal data was generated using a conventional Instron Tensile Tester. In this test, two film samples are sealed over a range of temperatures (the two film samples were cut from the same roll of 2.0 mil (51-μm) thick film). The following parameters were used in the Heat Seal Strength Test: film specimen width, 1 inch (25.4 mm); film sealing time, 0.5 second; film sealing pressure, 40 psi (0.28 N/mm$^2$); temperature range, 212° F. to 302° F. (100° C. to 150° C.) and temperature increment, 9° F. (5° C.). After aging for at least 24 hours at ASTM conditions, seal strength was determined using the following tensile parameters: pull (crosshead) speed, 12 inch/min (2.54 cm/min); direction of pull, 90° to seal, and; 5 samples of film were tested at each temperature increment. The Seal Initiation Temperature, hereinafter S.I.T., is defined as the temperature required to form a commercially viable seal; a commercially viable seal has a seal strength of 2.0 lb per inch of seal (8.8 N per 25.4 mm of seal).

Film Hexane Extractables

Hexane extractables was determined according to the Code of Federal Registration 21 CFR § 177.1520 Para (c) 3.1 and 3.2; wherein the quantity of hexane extractable material in a film is determined gravimetrically. Elaborating, 2.5 grams of 3.5 mil (89 μm) monolayer film was placed in a stainless steel basket, the film and basket were weighed ($w^i$), while in the basket the film was: extracted with n-hexane at 49.5° C. for two hours; dried at 80° C. in a vacuum oven for 2 hours; cooled in a desiccator for 30 minutes, and; weighed ($w^f$). The percent loss in weight is the percent hexane extractables ($w^{C6}$): $w^{C6}=100\times(w^i-w^f)/w^i$.

TABLE 1a

Continuous solution polymerization process parameters employing an intermediate branching catalyst formulation: Examples 1 and 4.

| Sample Code | Example 1 | Example 4 |
|---|---|---|
| Intermediate Branching Catalyst | In-line | Batch |
| R2 (vii) (ppm) | 6.4 | — |
| R2 (vi)/(v) (mol ratio) | 1.78 | — |
| R2 (viii)/(vii) (mol ratio) | 1.35 | — |
| R2 (ix)/(vii) (mol ratio) | 0.35 | — |
| component (vii), stream 10c (g/h) | 439.8 | — |
| component (viii), stream 10h (g/h) | 140.6 | — |
| component (vi), stream 10b (g/h) | 430.0 | — |
| components ((v) + (ix))[1], stream 10a (g/h) | 463.4 | — |
| solvent stream 10a' (g/h) | 3000 | — |
| solvent stream 10b' (g/h) | 3000 | — |
| solvent stream 10c' (g/h) | 4900 | — |
| solvent stream 10f' (g/h) | 37600 | — |
| R2 batch (vii) ppm | — | 0.97 |
| R2 batch (viii)/(vii) (mol ratio) | — | 4.0 |
| R2 stream 60e (g/h) | — | 30370 |
| R2 batch catalyst, Ti flow (g/h) | | |
| Stream 60e' (g/h) | — | 30000 |

[1]Molar ratio of [component (ix)]/[component (v)] was 20/1

TABLE 1b

Additional solution process parameters for Examples 1 and 4.

| Sample Code | Example 1 | Example 4 |
|---|---|---|
| R2 total solution rate (kg/hr) | 522.2 | 427.3 |
| Total Soluton Rate (kg/hr) | 600.0 | 500.1 |
| R2 ethylene concentration (wt %) | 12.1 | 13.1 |
| R3 ethylene concentration (wt %) | 13.9 | 15.0 |
| $ES^{R2}$ (%) | 80.0 | 80.0 |
| $ES^{R3}$ | 20.0 | 20.0 |
| (1-octene/ethylene) total (wt.fr.) | 0.50 | 0.46 |
| $CS^{R2}$ (%) | 100 | 100 |
| $CS^{R3}$ (%) | 0.0 | 0.0 |

TABLE 1b-continued

Additional solution process parameters for Examples 1 and 4.

| Sample Code | Example 1 | Example 4 |
|---|---|---|
| R2 Catalyst Inlet Temperature (° C.) | 40.0 | 31.9 |
| R2 inlet temp (° C.) | 30.0 | 30.0 |
| R2 Mean Temp (° C.) | 183.1 | 194.3 |
| $H_2^{R2}$ (ppm) | 1.0 | 1.0 |
| R3 volume (L) | 18 | 18 |
| R3 inlet temp (° C.) | 129.9 | 129.9 |
| R3 exit temp (° C.) | 211.9 | 221.0 |
| $H_2^{R3}$ (ppm) | 0.50 | 0.5 |
| R3 ΔTemp (° C.) | 28.8 | 26.7 |
| $Q^T$ (%) | 90.0 | 93.2 |
| Production Rate (kg/hr) | 98.3 | 88.0 |

TABLE 2

Physical and molecular characteristics of Examples 1, 2 and 4; relative to Comparatives 1 and 2.

| Resin Code | Example 1 | Example 2 | Example 4 | Comp. 1 | Comp. 2 |
|---|---|---|---|---|---|
| Comonomer | 1-octene | 1-octene | 1-octene | 1-octene | 1-octene |
| Density (g/cm³) | 0.9191 | 0.9208 | 0.9186 | 0.9182 | 0.9208 |
| $I_2$ (dg/min) | 0.90 | 1.02 | 0.94 | 0.98 | 0.97 |
| S.Ex. | 1.32 | 1.32 | 1.31 | 1.31 | 1.30 |
| MFR | 29.0 | 30.9 | 29.1 | 28.2 | 29.5 |
| $M_n$ (g/mol) | 29615 | 27100 | 35870 | 26682 | 33800 |
| $M_w$ (g/mol) | 108052 | 101100 | 116340 | 94018 | 121500 |
| $M_z$ (g/mol) | 312107 | 302700 | 329736 | 245077 | 329400 |
| $M_w/M_n$ | 3.65 | 3.73 | 3.24 | 3.52 | 3.59 |
| $M_z/M_w$ | 2.89 | 2.99 | 2.83 | 2.61 | 2.71 |
| $CDBI_{50}$ (%) | 51.4 | n/a | 53.0 | 54.0 | n/a |
| FTIR CoMo (mol %) | 2.7 | 2.8 | 2.7 | 2.6 | 2.7 |
| FTIR Branch Freq ($CH_3$/1000 C.) | 13.5 | 14.2 | 13.7 | 13.2 | 13.7 |
| Unsat. Internal/100 C. | 0.005 | n/a | n/a | 0.004 | n/a |
| Unsat. Side Chain/100 C. | 0.011 | n/a | n/a | 0.005 | n/a |
| Unsat. Terminal/100 C. | 0.050 | n/a | n/a | 0.039 | n/a |
| Hexane Extractables, Plaque (%) | 0.58 | n/a | 0.51 | 0.65 | n/a |
| Ti (ppm), N.A.A. | 7.52 | n/a | 12.84 | 1.7 | |
| Al (ppm), N.A.A. | 94.5 | n/a | 186 | 8.8 | |
| Mg (ppm), N.A.A. | 348 | n/a | 387 | 12.0 | |
| Cl (ppm), N.A.A. | 93.7 | n/a | 166 | 39.0 | |

TABLE 3

3D-CFC characterization of Example 1 and Non-Comonomer Index.

| 3D-CFC Fraction | Elution Temp (° C.) | (wt.fr.)$^f$ | $M_w \times 10^{-5}$ (g/mol) | $M_v \times 10^{-5}$ (g/mol) | Avg. [n] (dL/g) | $T^f$ (° C.) | $NCI^f$ | $SCB^f$ ($CH_3$/1000 C) |
|---|---|---|---|---|---|---|---|---|
| F1 | 30-60 | 0.1699 | 0.723 | 0.637 | 0.98 | 51.42 | 0.983 | 29.03 |
| F2 | 60-65 | 0.0821 | 0.93 | 0.837 | 1.26 | 62.64 | 0.980 | 21.47 |
| F3 | 65-70 | 0.1131 | 1.05 | 0.962 | 1.42 | 67.63 | 0.981 | 18.11 |
| F4 | 70-74 | 0.1059 | 1.09 | 0.996 | 1.49 | 72.05 | 0.983 | 15.13 |
| F5 | 74-78 | 0.1201 | 1.14 | 1.04 | 1.56 | 76.01 | 0.981 | 12.46 |
| F6 | 78-82 | 0.1203 | 1.27 | 1.14 | 1.66 | 79.99 | 0.960 | 9.78 |
| F7 | 82-87 | 0.1052 | 1.55 | 1.36 | 1.82 | 84.25 | 0.916 | 6.91 |
| F8 | 87-92 | 0.0720 | 1.90 | 1.66 | 2.13 | 89.76 | 0.902 | 3.20 |
| F9 | 92-110 | 0.1114 | 2.02 | 1.79 | 2.33 | 93.44 | 0.924 | 0.72 |

TABLE 4

3D-CFC characterization of Example 4 and Non-Comonomer Index.

| 3D-CFC Fraction | Elution Temp (° C.) | (wt.fr.)$^f$ | $M_w \times 10^{-5}$ (g/mol) | $M_v \times 10^{-5}$ (g/mol) | Avg. [n] (dL/g) | $T^f$ (° C.) | $NCI^f$ | $SCB^f$ ($CH_3$/1000 C) |
|---|---|---|---|---|---|---|---|---|
| F1 | 30-60 | 0.1666 | 0.616 | 0.544 | 0.88 | 50.84 | 0.985 | 29.42 |
| F2 | 60-65 | 0.0831 | 0.869 | 0.786 | 1.21 | 62.63 | 0.980 | 21.48 |
| F3 | 65-70 | 0.1166 | 0.969 | 0.888 | 1.34 | 67.61 | 0.979 | 18.12 |
| F4 | 70-74 | 0.1101 | 1.08 | 0.989 | 1.47 | 72.04 | 0.978 | 15.14 |
| F5 | 74-78 | 0.1240 | 1.13 | 1.04 | 1.56 | 76.03 | 0.984 | 12.45 |

TABLE 4-continued

3D-CFC characterization of Example 4 and Non-Comonomer Index.

| 3D-CFC Fraction | Elution Temp (° C.) | (wt.fr.)$^y$ | $M_w \times 10^{-5}$ (g/mol) | $M_v \times 10^{-5}$ (g/mol) | Avg. [n] (dL/g) | $T^f$ (° C.) | $NCI^f$ | $SCB^f$ ($CH_3$/1000 C) |
|---|---|---|---|---|---|---|---|---|
| F6 | 78-82 | 0.1204 | 1.22 | 1.11 | 1.65 | 79.98 | 0.976 | 9.79 |
| F7 | 82-88 | 0.1033 | 1.41 | 1.28 | 1.81 | 84.56 | 0.952 | 6.70 |
| F8 | 88-92 | 0.0456 | 1.70 | 1.54 | 2.10 | 90.06 | 0.938 | 3.00 |
| F9 | 92-110 | 0.1304 | 2.06 | 1.89 | 2.49 | 94.45 | 0.951 | 0.04 |

TABLE 5

3D-CFC characterization of Comparative 1 and Non-Comonomer Index.

| 3D-CFC Fraction | Elution Temp (° C.) | (wt.fr.)$^y$ | $M_w \times 10^{-5}$ (g/mol) | $M_v \times 10^{-5}$ (g/mol) | Avg. [n] (dL/g) | $T^f$ (° C.) | $NCI^f$ | $SCB^f$ ($CH_3$/1000 C) |
|---|---|---|---|---|---|---|---|---|
| F1 | 30-65 | 0.1921 | 0.604 | 0.517 | 0.87 | 54.98 | 1.00 | 26.63 |
| F2 | 65-70 | 0.0928 | 0.878 | 0.785 | 1.25 | 67.67 | 1.00 | 18.08 |
| F3 | 70-74 | 0.1094 | 1.05 | 0.954 | 1.46 | 72.11 | 0.994 | 15.09 |
| F4 | 74-78 | 0.1511 | 1.15 | 1.06 | 1.61 | 76.09 | 1.00 | 12.41 |
| F5 | 78-82 | 0.1631 | 1.23 | 1.14 | 1.72 | 79.96 | 1.00 | 9.8 |
| F6 | 82-88 | 0.1266 | 1.40 | 1.28 | 1.90 | 84.39 | 1.00 | 6.82 |
| F7 | 88-92 | 0.0549 | 1.71 | 1.55 | 2.23 | 90.20 | 0.989 | 2.9 |
| F8 | 92-110 | 0.1100 | 1.95 | 1.78 | 2.50 | 93.75 | 1.00 | 0.51 |

TABLE 6

3D-CFC characterization of Comparative 3 and Non-Comonomer Index.

| 3D-CFC Fraction | Elution Temp (° C.) | (wt.fr.)$^y$ | $M_w \times 10^{-5}$ (g/mol) | $M_v \times 10^{-5}$ (g/mol) | Avg. [n] (dL/g) | $T^f$ (° C.) | $NCI^f$ | $SCB^f$ ($CH_3$/1000 C) |
|---|---|---|---|---|---|---|---|---|
| F1 | 30-65 | 0.1527 | 0.238 | 0.222 | 0.48 | 57.43 | 0.998 | 24.98 |
| F2 | 65-70 | 0.1059 | 0.514 | 0.480 | 0.87 | 67.73 | 0.997 | 18.04 |
| F3 | 70-73 | 0.1133 | 0.884 | 0.817 | 1.30 | 71.64 | 0.995 | 15.41 |
| F4 | 73-75 | 0.1408 | 1.31 | 1.23 | 1.77 | 74.09 | 1.000 | 13.76 |
| F5 | 75-76 | 0.0783 | 1.53 | 1.44 | 2.00 | 75.51 | 0.996 | 12.80 |
| F6 | 76-77 | 0.1169 | 1.54 | 1.47 | 2.03 | 76.50 | 0.997 | 12.13 |
| F7 | 77-78 | 0.0977 | 1.35 | 1.27 | 1.84 | 77.48 | 0.993 | 11.47 |
| F8 | 78-85 | 0.1432 | 1.09 | 1.01 | 1.57 | 79.49 | 0.996 | 10.12 |
| F9 | 85-140 | 0.0512 | 2.15 | 2.04 | 2.75 | 92.16 | 0.995 | 1.58 |

TABLE 7

Physical and molecular characteristics of Comparatives 3, 4 and 5.

| Resin Code | Comparative 3 | Comparative 4 | Comparative 5 |
|---|---|---|---|
| Comonomer | 1-octene | 1-octene | 1-octene |
| Density (g/cm$^3$) | 0.9162 | 0.9018 | 0.9028 |
| $I_2$ (dg/min) | 0.99 | 1.06 | 0.91 |
| S.Ex. | 1.27 | 1.41 | 1.44 |
| MFR | 30.8 | 29.5 | 31.1 |
| $M_n$ (g/mol) | 33358 | 40133 | 45124 |
| $M_w$ (g/mol) | 102603 | 83226 | 84299 |
| $M_z$ (g/mol) | 238331 | 148667 | 137468 |
| $M_w/M_n$ | 3.08 | 2.07 | 1.87 |
| $M_z/M_w$ | 2.32 | 1.79 | 1.93 |
| $CDBI_{50}$ (%) | 77.5 | 89.5 | 92.5 |
| FTIR CoMo (mol %) | 2.9 | 4.6 | 4.5 |
| FTIR Branch Freq ($CH_3$/1000 C.) | 14.6 | 23.2 | 22.3 |
| Unsaturation Internal/100 C. | 0.021 | 0.006 | 0.014 |
| Unsaturation Side Chain/100 C. | 0.002 | 0.001 | 0.009 |

TABLE 7-continued

Physical and molecular characteristics of Comparatives 3, 4 and 5.

| Resin Code | Comparative 3 | Comparative 4 | Comparative 5 |
|---|---|---|---|
| Unsaturation Terminal/100 C. | 0.006 | 0.008 | 0.009 |
| Hexane Extractables, Plaque (%) | 0.48 | 0.58 | n/a |
| Ti (ppm), N.A.A. | 0.30 | 0.30 | n/a |
| Al (ppm), N.A.A. | 9.1 | 1.9 | n/a |
| Mg (ppm), N.A.A. | n/d | 2.0 | n/a |
| Cl (ppm), N.A.A. | 0.47 | 0.9 | n/a |
| Hf (ppm), N.A.A. | n/a | n/a | 2.2 |

TABLE 8

3D-CFC characterization of Comparative 4 and Non-Comonomer Index.

| 3D-CFC Fraction | Elution Temp (° C.) | (wt.fr.)$^f$ | $M_w \times 10^{-5}$ (g/mol) | $M_v \times 10^{-5}$ (g/mol) | Avg. [n] (dL/g) | $T^f$ (° C.) | NCI$^f$ | SCB$^f$ (CH$_3$/1000 C) |
|---|---|---|---|---|---|---|---|---|
| F1 | 30-50 | 0.1123 | 0.459 | 0.439 | 0.70 | 44.18 | 0.944 | 33.91 |
| F2 | 50-55 | 0.1024 | 0.675 | 0.654 | 0.97 | 52.76 | 0.948 | 28.13 |
| F3 | 55-58 | 0.0896 | 0.827 | 0.804 | 1.15 | 56.60 | 0.943 | 25.54 |
| F4 | 58-60 | 0.0726 | 0.87 | 0.850 | 1.21 | 59.05 | 0.945 | 23.89 |
| F5 | 60-62 | 0.108 | 0.978 | 0.956 | 1.32 | 61.04 | 0.942 | 22.55 |
| F6 | 62-64 | 0.1386 | 1.080 | 1.05 | 1.44 | 63.03 | 0.947 | 21.21 |
| F7 | 64-66 | 0.1435 | 1.110 | 1.09 | 1.49 | 64.99 | 0.948 | 19.89 |
| F8 | 66-68 | 0.1111 | 1.100 | 1.08 | 1.47 | 66.93 | 0.94 | 18.58 |
| F9 | 68-110 | 0.1218 | 1.120 | 1.07 | 1.50 | 69.99 | 0.944 | 16.52 |

TABLE 9

3D-CFC characterization of Comparative 5 and Non-Comonomer Index.

| 3D-CFC Fraction | Elution Temp (° C.) | (wt.fr.)$^f$ | $M_w \times 10^{-5}$ (g/mol) | $M_v \times 10^{-5}$ (g/mol) | Avg. [n] (dL/g) | $T^f$ (° C.) | NCI$^f$ | SCB$^f$ (CH$_3$/1000C) |
|---|---|---|---|---|---|---|---|---|
| F1 | 30-55 | 0.1153 | 0.377 | 0.359 | 0.64 | 48.57 | 0.976 | 30.95 |
| F2 | 55-60 | 0.1609 | 0.742 | 0.721 | 1.10 | 57.86 | 0.976 | 24.69 |
| F3 | 60-63 | 0.1725 | 0.964 | 0.941 | 1.35 | 61.62 | 0.973 | 22.16 |
| F4 | 63-65 | 0.1650 | 1.12 | 1.10 | 1.53 | 64.05 | 0.974 | 20.52 |
| F5 | 65-67 | 0.2053 | 1.11 | 1.090 | 1.54 | 65.98 | 0.979 | 19.22 |
| F6 | 67-110 | 0.1810 | 0.895 | 0.866 | 1.31 | 68.70 | 0.973 | 17.39 |

TABLE 10a

Mixed catalyst Continuous solution polymerization process parameters employing an intermediate branching catalyst formulation and a homogeneous catalyst formulation: Examples 5, 10 and 11.

| Sample Code | Example 5 | Example 10 | Example 11 |
|---|---|---|---|
| Reactor Mode | Series | Series | Parallel |
| R1 Catalyst (homogeneous) | PIC-1 | CpF-2 | CpF-2 |
| R2 Catalyst (intermediate branching) | In-line | In-line | In-line |
| R1 (i) (ppm) | 0.12 | 0.380 | 0.380 |
| R1 (ii)/(i) mole ratio | 100 | 64.2 | 48 |
| R1 (iv)/(ii) mole ratio | 0 | 0.16 | 0.15 |
| R1 (iii)/(i) mole ratio | 1.1 | 1.20 | 1.36 |
| R2 (vii) (ppm) | 4.2 | 5.16 | 7.24 |
| R2 (vi)/(v) (mol ratio) | 2.07 | 2.07 | 2.07 |
| R2 (viii)/(vii) (mol ratio) | 1.35 | 1.35 | 1.35 |
| R2 (ix)/(vii) (mol ratio) | 0.35 | 0.35 | 0.35 |
| component (vii), stream 10c (g/h) | 326.9 | 354.0 | 179.2 |
| component (viii), stream 10h (g/h) | 89.7 | 104.4 | 52.6 |
| component (vi), stream 10b (g/h) | 388.8 | 417.4 | 211.1 |

TABLE 10a-continued

Mixed catalyst Continuous solution polymerization process parameters employing an intermediate branching catalyst formulation and a homogeneous catalyst formulation: Examples 5, 10 and 11.

| Sample Code | Example 5 | Example 10 | Example 11 |
|---|---|---|---|
| components ((v) + (ix))[1], stream 10a (g/h) | 391.8 | 389.4 | 201.6 |
| solvent stream 10a' (g/h) | 3200 | 2900 | 2470 |
| solvent stream 10b' (g/h) | 3300 | 3100 | 29900 |
| solvent stream 10c' (g/h) | 4700 | 4900 | 4900 |
| solvent stream 10f' (g/h) | 38600 | 37700 | 37600 |

[1]R1 catalyst component (i) was PIC-1 or CpF-2

TABLE 10b

Additional solution process parameters for Examples 5, 10 and 11.

| Sample Code | Example 5 | Example 10 | Example 11 |
|---|---|---|---|
| R1 total solution rate (kg/h) | 358.8 | 387.3 | 352.0 |
| R2 total solution rate (kg/hr) | 241.2 | 162.7 | 198.0 |
| Total Solution Rate (kg/hr) | 600 | 550 | 550 |
| R1 ethylene concentration (wt %) | 10.3 | 9.8 | 11.1 |
| R2 ethylene concentration (wt %) | 15.4 | 13.8 | 13.2 |
| R3 ethylene concentration (wt %) | 15.4 | 13.8 | 13.2 |
| $ES^{R1}$ (%) | 40 | 50.0 | 60.0 |
| $ES^{R2}$ (%) | 60 | 50.0 | 40.0 |
| $ES^{R3}$ | 0 | 0.0 | 0.0 |
| (1-octene/ethylene) total (wt.fr.) | 0.67 | 0.31 | 0.29 |
| $CS^{R1}$ (%) | 100 | 67 | 100 |
| $CS^{R2}$ (%) | 0 | 33 | 0.0 |
| $CS^{R3}$ (%) | 0 | 0 | 0 |
| R1 Catalyst Inlet Temperature (° C.) | 32.5 | 30.6 | 31.4 |
| R1 Inlet Temperature (° C.) | 30.0 | 30.0 | 30.0 |
| R1 Mean Temperature (° C.) | 141 | 141.1 | 154.7 |
| $H_2^{R1}$ (ppm) | 0.2 | 5.35 | 6.82 |
| R2 Catalyst Inlet Temperature (° C.) | 38.6 | 37.9 | 37.8 |
| R2 inlet temp (° C.) | 30 | 50 | 50 |
| R2 Mean Temp (° C.) | 206 | 197.7 | 205.7 |
| $H_2^{R2}$ (ppm) | 3.5 | 18 | 2.78 |
| R3 volume (L) | 18 | 2.2 | 2.2 |
| R3 inlet temp (° C.) | 130.0 | 130 | 130 |
| R3 exit temp (° C.) | 214.0 | 197.7 | 181.6 |
| $H_2^{R3}$ (ppm) | 0.0 | 0 | 0 |
| $Q^T$ (%) | 93.1 | 90.8 | 89.9 |
| Production Rate (kg/hr) | 94.8 | 72.0 | 61.5 |

TABLE 11

Physical and molecular characteristics of Examples 5-7 and Comparative 6.

| Resin Code | Example 5 | Example 6 | Example 7 | Comp. 6 |
|---|---|---|---|---|
| Comonomer | 1-octene | 1-octene | 1-octene | 1-octene |
| Density (g/cm³) | 0.9160 | 0.9124 | 0.9210 | 0.9189 |
| $I_2$ (dg/min) | 1.00 | 0.92 | 0.85 | 0.89 |
| S.Ex. | 1.26 | 1.25 | 1.23 | 1.36 |
| MFR | 27.2 | 23.4 | 22.1 | 30.4 |
| $M_n$ (g/mol) | 28655 | 42765 | 39503 | 42399 |
| $M_w$ (g/mol) | 104966 | 107517 | 111582 | 110940 |
| $M_z$ (g/mol) | 251646 | 230247 | 278862 | 237733 |
| $M_w/M_n$ | 3.66 | 2.51 | 2.82 | 2.62 |
| $M_z/M_w$ | 2.40 | 2.14 | 2.50 | 2.14 |
| $CDBI_{50}$ (%) | 51.4 | 59.7 | 51.9 | 24.5 |
| FTIR CoMo (mol %) | 2.9 | 3.6 | 2.5 | 2.8 |
| FTIR Branch Freq ($CH_3$/1000 C.) | 14.5 | 18.1 | 12.7 | 14.1 |
| Unsat. Internal/100 C. | 0.009 | 0.008 | 0.004 | 0.004 |
| Unsat. Side Chain/100 C. | 0.005 | 0.003 | 0.003 | 0.002 |
| Unsat. Terminal/100 C. | 0.048 | 0.029 | 0.03 | 0.021 |
| Hexane Extractables, Plaque (%) | 0.72 | n/a | n/a | 0.42 |
| Ti (ppm), N.A.A. | 7.4 | 7.6 | n/a | 2.2 |
| Al (ppm), N.A.A. | 97.0 | 104 | n/a | 11.3 |
| Mg (ppm), N.A.A. | 85.8 | 90.1 | n/a | 14.6 |
| Cl (ppm), N.A.A. | 180 | 190 | n/a | 48.8 |

TABLE 12

3D-CFC characterization of Example 5 and Non-Comonomer Index.

| 3D-CFC Fraction | Elution Temp (° C.) | (wt.fr.)[f] | $M_w \times 10^{-5}$ (g/mol) | $M_v \times 10^{-5}$ (g/mol) | Avg. [n] (dL/g) | $T^f$ (° C.) | $NCI^f$ | $SCB^f$ ($CH_3$/1000 C) |
|---|---|---|---|---|---|---|---|---|
| F1 | 30-60 | 0.1373 | 0.441 | 0.382 | 0.69 | 52.06 | 0.985 | 28.60 |
| F2 | 60-65 | 0.0677 | 0.660 | 0.596 | 0.99 | 62.66 | 0.990 | 21.46 |
| F3 | 65-69 | 0.0793 | 0.832 | 0.767 | 1.21 | 67.18 | 0.986 | 18.41 |

TABLE 12-continued

3D-CFC characterization of Example 5 and Non-Comonomer Index.

| 3D-CFC Fraction | Elution Temp (° C.) | (wt.fr.)$^f$ | $M_w \times 10^{-5}$ (g/mol) | $M_v \times 10^{-5}$ (g/mol) | Avg. [n] (dL/g) | $T^f$ (° C.) | NCI$^f$ | SCB$^f$ (CH$_3$/1000 C) |
|---|---|---|---|---|---|---|---|---|
| F4  | 69-71  | 0.0533 | 1.033 | 0.959 | 1.44 | 70.08 | 0.988 | 16.46 |
| F5  | 71-73  | 0.0992 | 1.406 | 1.321 | 1.84 | 72.10 | 0.992 | 15.10 |
| F6  | 73-74  | 0.0465 | 1.587 | 1.499 | 2.03 | 73.51 | 0.988 | 14.15 |
| F7  | 74-75  | 0.0800 | 1.736 | 1.655 | 2.19 | 74.50 | 0.993 | 13.48 |
| F8  | 75-76  | 0.0767 | 1.621 | 1.537 | 2.07 | 75.48 | 0.986 | 12.82 |
| F9  | 76-78  | 0.1218 | 1.308 | 1.220 | 1.75 | 76.92 | 0.982 | 11.85 |
| F10 | 78-88  | 0.1551 | 1.036 | 0.924 | 1.39 | 81.49 | 0.935 | 8.77  |
| F11 | 88-140 | 0.0831 | 1.506 | 1.322 | 1.75 | 91.91 | 0.873 | 1.75  |

TABLE 13

3D-CFC characterization of Example 6 and Non-Comonomer Index.

| 3D-CFC Fraction | Elution Temp (° C.) | (wt.fr.)$^f$ | $M_w \times 10^{-5}$ (g/mol) | $M_v \times 10^{-5}$ (g/mol) | Avg. [n] (dL/g) | $T^f$ (° C.) | NCI$^f$ | SCB$^f$ (CH$_3$/1000 C) |
|---|---|---|---|---|---|---|---|---|
| F1  | 30-51  | 0.0993 | 0.618 | 0.564 | 0.88 | 44.95 | 0.983 | 33.39 |
| F2  | 51-56  | 0.0904 | 0.894 | 0.858 | 1.23 | 53.82 | 0.982 | 27.41 |
| F3  | 56-59  | 0.0855 | 1.058 | 1.020 | 1.43 | 57.59 | 0.987 | 24.87 |
| F4  | 59-61  | 0.0680 | 1.118 | 1.139 | 1.56 | 60.01 | 0.984 | 23.24 |
| F5  | 61-63  | 0.0858 | 1.276 | 1.232 | 1.66 | 61.96 | 0.983 | 21.93 |
| F6  | 63-65  | 0.0637 | 1.198 | 1.147 | 1.58 | 63.95 | 0.978 | 20.59 |
| F7  | 65-70  | 0.1094 | 1.062 | 0.996 | 1.44 | 67.36 | 0.974 | 18.29 |
| F8  | 70-78  | 0.1375 | 1.172 | 1.064 | 1.49 | 74.00 | 0.931 | 13.82 |
| F9  | 78-88  | 0.1109 | 1.296 | 1.141 | 1.62 | 82.17 | 0.931 | 8.31  |
| F10 | 88-94  | 0.0765 | 1.765 | 1.554 | 2.07 | 90.95 | 0.920 | 2.40  |
| F11 | 94-140 | 0.0729 | 2.107 | 1.902 | 2.45 | 94.51 | 0.931 | 0.00  |

TABLE 14

3D-CFC characterization of Example 7 and Non-Comonomer Index.

| 3D-CFC Fraction | Elution Temp (° C.) | (wt.fr.)$^f$ | $M_w \times 10^{-5}$ (g/mol) | $M_v \times 10^{-5}$ (g/mol) | Avg. [n] (dL/g) | $T^f$ (° C.) | NCI$^f$ | SCB$^f$ (CH$_3$/1000 C) |
|---|---|---|---|---|---|---|---|---|
| F1  | 30-60  | 0.1188 | 0.730 | 0.674 | 1.05 | 53.82 | 0.994 | 27.41 |
| F2  | 60-64  | 0.0977 | 1.078 | 1.041 | 1.49 | 62.23 | 0.994 | 21.75 |
| F3  | 64-67  | 0.1226 | 1.290 | 1.255 | 1.72 | 65.54 | 0.991 | 19.52 |
| F4  | 67-70  | 0.1085 | 1.265 | 1.222 | 1.71 | 68.40 | 0.989 | 17.59 |
| F5  | 70-75  | 0.1024 | 1.055 | 0.985 | 1.48 | 72.33 | 0.985 | 14.94 |
| F6  | 75-80  | 0.1031 | 1.016 | 0.928 | 1.45 | 77.66 | 0.988 | 11.35 |
| F7  | 80-85  | 0.1138 | 1.135 | 1.030 | 1.56 | 82.40 | 0.967 | 8.16  |
| F8  | 85-90  | 0.0555 | 1.269 | 1.122 | 1.66 | 87.22 | 0.945 | 4.91  |
| F9  | 90-93  | 0.0505 | 1.538 | 1.369 | 1.94 | 91.88 | 0.936 | 1.77  |
| F10 | 93-140 | 0.1272 | 1.813 | 1.641 | 2.23 | 94.24 | 0.944 | 0.18  |

TABLE 15

3D-CFC characterization of Comparative 6 and Non-Comonomer Index.

| 3D-CFC Fraction | Elution Temp (° C.) | (wt.fr.)[f] | $M_w \times 10^{-5}$ (g/mol) | $M_v \times 10^{-5}$ (g/mol) | Avg. [n] (dL/g) | $T^f$ (° C.) | $NCI^f$ | $SCB^f$ ($CH_3$/1000 C) |
|---|---|---|---|---|---|---|---|---|
| F1 | 30-55 | 0.1268 | 0.974 | 0.911 | 1.22 | 48.47 | 0.950 | 31.02 |
| F2 | 55-58 | 0.0713 | 1.708 | 1.640 | 1.94 | 56.66 | 0.954 | 25.50 |
| F3 | 58-60 | 0.0779 | 2.004 | 1.940 | 2.19 | 59.09 | 0.940 | 23.86 |
| F4 | 60-62 | 0.1005 | 2.082 | 2.015 | 2.26 | 60.98 | 0.941 | 22.59 |
| F5 | 62-68 | 0.0800 | 1.504 | 1.381 | 1.77 | 63.86 | 0.953 | 20.65 |
| F6 | 68-80 | 0.1170 | 0.525 | 0.466 | 0.85 | 75.21 | 0.958 | 13.00 |
| F7 | 80-90 | 0.1743 | 0.639 | 0.586 | 1.04 | 84.97 | 0.955 | 6.43 |
| F8 | 90-94 | 0.1138 | 0.860 | 0.785 | 1.30 | 92.54 | 0.944 | 1.33 |
| F9 | 94-110 | 0.1385 | 1.098 | 1.034 | 1.59 | 94.51 | 0.939 | 0.0 |

TABLE 16

Physical and molecular characteristics of Examples 10 and 11; relative to Comparatives 7 and 8.

| Resin Code | Example 10 | Example 11 | Comparative 7 | Comparative 8 |
|---|---|---|---|---|
| Comonomer | 1-octene | 1-octene | 1-octene | 1-octene |
| Density (g/cm³) | 0.9170 | 0.9177 | 0.9045 | 0.9069 |
| $I_2$ (dg/min) | 0.70 | 0.92 | 0.93 | 1.12 |
| S.Ex. | 1.40 | 1.38 | 1.58 | 1.52 |
| MFR | 34.7 | 29.7 | 57.0 | 43.5 |
| $M_n$ (g/mol) | 35536 | 41838 | 27546 | 36041 |
| $M_w$ (g/mol) | 106261 | 93315 | 91509 | 90425 |
| $M_z$ (g/mol) | 217647 | 161131 | 246101 | 220700 |
| $M_w/M_n$ | 2.99 | 2.99 | 3.32 | 2.51 |
| $M_z/M_w$ | 2.05 | 1.73 | 2.69 | 2.44 |
| $CDBI_{50}$ (%) | 49.8 | 57.0 | 89.3 | 92.4 |
| FTIR CoMo (mol %) | 3.3 | 4.0 | 4.7 | 4.2 |
| FTIR Branch Freq ($CH_3$/1000 C.) | 16.7 | 19.8 | 23.4 | 20.9 |
| Unsat. Internal/100 C. | 0.004 | 0.005 | 0.011 | 0.011 |
| Unsat. Side Chain/100 C. | 0.001 | 0.004 | 0.006 | 0.006 |
| Unsat. Terminal/100 C. | 0.025 | 0.025 | 0.008 | 0.007 |
| Hexane Extractables, Plaque (%) | 0.21 | 0.41 | n/a | n/a |
| Ti (ppm), N.A.A. | 8.45 | 4.24 | n/d | n.d. |
| Al (ppm), N.A.A. | 187 | 160 | — | — |
| Mg (ppm), N.A.A. | 389 | 327 | — | — |
| Cl (ppm), N.A.A. | 120 | 69.5 | — | — |
| Hf (ppm), N.A.A. | 0.50 | 0.54 | 1.76 | 1.98 |

TABLE 17

3D-CFC characterization of Example 10 and Non-Comonomer Index.

| 3D-CFC Fraction | Elution Temp (° C.) | (wt.fr.)[f] | $M_w \times 10^{-5}$ (g/mol) | $M_v \times 10^{-5}$ (g/mol) | Avg. [n] (dL/g) | $T^f$ (° C.) | $NCI^f$ | $SCB^f$ ($CH_3$/1000 C) |
|---|---|---|---|---|---|---|---|---|
| F1 | 30-50 | 0.0812 | 0.983 | 0.932 | 1.23 | 44.64 | 0.961 | 33.60 |
| F2 | 50-54 | 0.0957 | 1.582 | 1.532 | 1.81 | 52.27 | 0.955 | 28.46 |
| F3 | 54-56 | 0.0666 | 1.884 | 1.835 | 2.10 | 55.09 | 0.955 | 26.56 |
| F4 | 56-58 | 0.1395 | 1.991 | 1.944 | 2.22 | 57.05 | 0.963 | 25.24 |
| F5 | 58-60 | 0.1096 | 1.988 | 1.934 | 2.21 | 58.93 | 0.954 | 23.97 |
| F6 | 60-68 | 0.0582 | 1.467 | 1.346 | 1.70 | 61.96 | 0.943 | 21.93 |
| F7 | 68-80 | 0.0777 | 0.364 | 0.314 | 0.64 | 75.67 | 0.955 | 12.69 |
| F8 | 80-90 | 0.2018 | 0.564 | 0.499 | 0.89 | 85.34 | 0.915 | 6.18 |
| F9 | 90-110 | 0.1696 | 1.044 | 0.892 | 1.23 | 93.01 | 0.814 | 1.01 |

TABLE 18

3D-CFC characterization of Example 11 and Non-Comonomer Index.

| 3D-CFC Fraction | Elution Temp (° C.) | (wt.fr.)$^f$ | $M_w \times 10^{-5}$ (g/mol) | $M_v \times 10^{-5}$ (g/mol) | Avg. [n] (dL/g) | $T^f$ (° C.) | NCI$^f$ | SCB$^f$ (CH$_3$/1000 C) |
|---|---|---|---|---|---|---|---|---|
| F1 | 30-45 | 0.1250 | 0.705 | 0.680 | 0.94 | 40.78 | 0.943 | 36.20 |
| F2 | 45-50 | 0.1581 | 1.156 | 1.128 | 1.41 | 47.83 | 0.944 | 31.45 |
| F3 | 50-53 | 0.1496 | 1.368 | 1.341 | 1.61 | 51.60 | 0.937 | 28.91 |
| F4 | 53-55 | 0.1028 | 1.431 | 1.397 | 1.67 | 53.99 | 0.931 | 27.30 |
| F5 | 55-62 | 0.1044 | 1.357 | 1.321 | 1.62 | 56.60 | 0.929 | 25.54 |
| F6 | 62-94 | 0.0586 | 0.271 | 0.203 | 0.49 | 86.11 | 0.962 | 5.66 |
| F7 | 94-97 | 0.0938 | 0.565 | 0.504 | 0.97 | 94.51 | 0.955 | 0.0 |
| F8 | 97-110 | 0.2078 | 1.209 | 1.114 | 1.71 | 98.00 | 0.957 | 0.0 |

TABLE 19a

Reference resins (linear ethylene interpolymers) having undetectable levels of Long Chain Branching (LCB).

| Reference Resins | Mv (g/mole) | [η] (dL/g) | $M_w/M_n$ | A | SCBD CH$_3$#/1000C | ZSV (poise) |
|---|---|---|---|---|---|---|
| Resin 1 | 1.06E+05 | 1.672 | 2.14 | 1.9772 | 10.5 | 7.81E+04 |
| Resin 2 | 1.11E+05 | 1.687 | 2.00 | 1.9772 | 11.2 | 7.94E+04 |
| Resin 3 | 1.06E+05 | 1.603 | 1.94 | 1.9772 | 15.9 | 7.28E+04 |
| Resin 4 | 1.07E+05 | 1.681 | 1.91 | 1.9772 | 11.0 | 8.23E+04 |
| Resin 5 | 7.00E+04 | 1.192 | 2.11 | 1.9772 | 13.7 | 1.66E+04 |
| Resin 6 | 9.59E+04 | 1.497 | 1.88 | 1.9772 | 12.6 | 5.73E+04 |
| Resin 7 | 1.04E+05 | 1.592 | 1.85 | 1.9772 | 12.8 | 6.60E+04 |
| Resin 8 | 5.09E+04 | 0.981 | 2.72 | 2.1626 | 0.0 | 6.42E+03 |
| Resin 9 | 5.27E+04 | 0.964 | 2.81 | 2.1626 | 0.0 | 6.42E+03 |
| Resin 10 | 1.06E+05 | 1.663 | 1.89 | 1.1398 | 13.3 | 7.69E+04 |
| Resin 11 | 1.10E+05 | 1.669 | 1.81 | 1.1398 | 19.3 | 7.31E+04 |
| Resin 12 | 1.07E+05 | 1.606 | 1.80 | 1.1398 | 27.8 | 6.99E+04 |
| Resin 13 | 6.66E+04 | 1.113 | 1.68 | 2.1626 | 17.8 | 1.39E+04 |
| Resin 14 | 6.62E+04 | 1.092 | 1.76 | 2.1626 | 21.4 | 1.45E+04 |
| Resin 15 | 6.83E+04 | 1.085 | 1.70 | 2.1626 | 25.3 | 1.44E+04 |
| Resin 16 | 7.66E+04 | 1.362 | 2.51 | 2.1626 | 4.0 | 3.24E+04 |
| Resin 17 | 6.96E+04 | 1.166 | 2.53 | 2.1626 | 13.9 | 2.09E+04 |
| Resin 18 | 6.66E+04 | 1.134 | 2.54 | 2.1626 | 13.8 | 1.86E+04 |
| Resin 19 | 5.81E+04 | 1.079 | 2.44 | 2.1626 | 5.8 | 1.10E+04 |
| Resin 20 | 7.85E+04 | 1.369 | 2.32 | 2.1626 | 3.7 | 3.34E+04 |
| Resin 21 | 6.31E+04 | 1.181 | 2.26 | 2.1626 | 4.3 | 1.61E+04 |
| Resin 22 | 7.08E+04 | 1.277 | 2.53 | 2.1626 | 3.6 | 2.58E+04 |
| Resin 23 | 9.91E+04 | 1.539 | 3.09 | 2.1626 | 14.0 | 8.94E+04 |
| Resin 24 | 1.16E+05 | 1.668 | 3.19 | 2.1626 | 13.3 | 1.32E+05 |
| Resin 25 | 1.12E+05 | 1.689 | 2.71 | 2.1626 | 12.8 | 1.38E+05 |
| Resin 26 | 1.14E+05 | 1.690 | 3.37 | 2.1626 | 8.0 | 1.48E+05 |
| Resin 28 | 1.00E+05 | 1.547 | 3.33 | 2.1626 | 14.1 | 9.61E+04 |
| Resin 30 | 1.04E+05 | 1.525 | 3.73 | 2.1626 | 13.4 | 1.10E+05 |
| Resin 31 | 1.10E+05 | 1.669 | 3.38 | 2.1626 | 8.7 | 1.26E+05 |
| Resin 32 | 1.09E+05 | 1.539 | 3.42 | 2.1626 | 13.4 | 1.07E+05 |
| Resin 33 | 8.04E+04 | 1.474 | 5.29 | 2.1626 | 1.7 | 7.60E+04 |
| Resin 34 | 8.12E+04 | 1.410 | 7.64 | 2.1626 | 0.9 | 9.11E+04 |
| Resin 35 | 7.56E+04 | 1.349 | 9.23 | 2.1626 | 1.0 | 9.62E+04 |
| Resin 36 | 7.34E+04 | 1.339 | 8.95 | 2.1626 | 1.1 | 1.00E+05 |
| Resin 37 | 1.01E+05 | 1.527 | 3.76 | 2.1626 | 13.3 | 1.11E+05 |

TABLE 19b

Reference resins (linear ethylene interpolymers) having undetectable levels of Long Chain Branching (LCB).

| Reference Resins | Log ZSV$_c$ (log(poise)) | Log IV$_c$ log(dL/g) | S$_h$ (dimensionless) | S$_v$ (dimensionless) | LCBF (dimensionless) |
|---|---|---|---|---|---|
| Resin 1 | 4.87E+00 | 2.46E-01 | -5.77E-02 | -1.21E-02 | 3.49E-04 |
| Resin 2 | 4.90E+00 | 2.52E-01 | -5.39E-02 | -1.13E-02 | 3.05E-04 |
| Resin 3 | 4.87E+00 | 2.41E-01 | -2.46E-02 | -5.16E-03 | 6.33E-05 |
| Resin 4 | 4.93E+00 | 2.50E-01 | -9.46E-03 | -1.99E-03 | 9.41E-06 |
| Resin 5 | 4.20E+00 | 1.07E-01 | -6.37E-02 | -1.34E-02 | 4.26E-04 |
| Resin 6 | 4.78E+00 | 2.04E-01 | 5.83E-02 | 1.22E-02 | 3.57E-04 |
| Resin 7 | 4.85E+00 | 2.31E-01 | -1.73E-03 | -3.65E-04 | 3.16E-07 |
| Resin 8 | 3.69E+00 | -8.43E-03 | -2.17E-02 | -4.55E-03 | 4.93E-05 |
| Resin 9 | 3.68E+00 | -1.58E-02 | 1.21E-04 | 2.44E-05 | 1.47E-09 |
| Resin 10 | 4.91E+00 | 2.38E-01 | 2.19E-02 | 4.60E-03 | 5.04E-05 |

TABLE 19b-continued

Reference resins (linear ethylene interpolymers) having undetectable levels of Long Chain Branching (LCB).

| Reference Resins | Log $ZSV_c$ (log(poise)) | Log $IV_c$ log(dL/g) | $S_h$ (dimensionless) | $S_v$ (dimensionless) | LCBF (dimensionless) |
|---|---|---|---|---|---|
| Resin 11 | 4.90E+00 | 2.48E−01 | −2.96E−02 | −6.21E−03 | 9.17E−05 |
| Resin 12 | 4.88E+00 | 2.42E−01 | −1.99E−02 | −4.19E−03 | 4.17E−05 |
| Resin 13 | 4.21E+00 | 9.14E−02 | 2.36E−02 | 4.96E−03 | 5.86E−05 |
| Resin 14 | 4.21E+00 | 9.22E−02 | 1.89E−02 | 3.97E−03 | 3.75E−05 |
| Resin 15 | 4.22E+00 | 1.00E−01 | −9.82E−03 | −2.06E−03 | 1.01E−05 |
| Resin 16 | 4.42E+00 | 1.44E−01 | −1.23E−02 | −2.59E−03 | 1.60E−05 |
| Resin 17 | 4.23E+00 | 1.01E−01 | −4.64E−03 | −9.75E−04 | 2.26E−06 |
| Resin 18 | 4.18E+00 | 8.91E−02 | 1.66E−03 | 3.47E−04 | 2.87E−07 |
| Resin 19 | 3.97E+00 | 4.73E−02 | −1.09E−02 | −2.29E−03 | 1.25E−05 |
| Resin 20 | 4.47E+00 | 1.45E−01 | 2.28E−02 | 4.78E−03 | 5.44E−05 |
| Resin 21 | 4.16E+00 | 8.23E−02 | 1.78E−02 | 3.73E−03 | 3.31E−05 |
| Resin 22 | 4.32E+00 | 1.15E−01 | 2.45E−02 | 5.14E−03 | 6.30E−05 |
| Resin 23 | 4.78E+00 | 2.22E−01 | −2.25E−02 | −4.73E−03 | 5.31E−05 |
| Resin 24 | 4.94E+00 | 2.56E−01 | −3.13E−02 | −6.57E−03 | 1.03E−04 |
| Resin 25 | 5.02E+00 | 2.59E−01 | 3.91E−02 | 8.21E−03 | 1.60E−04 |
| Resin 26 | 4.97E+00 | 2.48E−01 | 3.94E−02 | 8.27E−03 | 1.63E−04 |
| Resin 28 | 4.79E+00 | 2.24E−01 | −3.13E−02 | −6.57E−03 | 1.03E−04 |
| Resin 30 | 4.80E+00 | 2.18E−01 | 1.47E−02 | 3.08E−03 | 2.26E−05 |
| Resin 31 | 4.90E+00 | 2.44E−01 | −1.40E−02 | −2.94E−03 | 2.06E−05 |
| Resin 32 | 4.82E+00 | 2.23E−01 | 1.27E−02 | 2.66E−03 | 1.69E−05 |
| Resin 33 | 4.51E+00 | 1.72E−01 | −6.37E−02 | −1.34E−02 | 4.26E−04 |
| Resin 34 | 4.45E+00 | 1.52E−01 | −2.68E−02 | −5.62E−03 | 7.52E−05 |
| Resin 35 | 4.40E+00 | 1.33E−01 | 1.55E−02 | 3.26E−03 | 2.53E−05 |
| Resin 36 | 4.43E+00 | 1.30E−01 | 5.82E−02 | 1.22E−02 | 3.55E−04 |
| Resin 37 | 4.80E+00 | 2.17E−01 | 1.77E−02 | 3.71E−03 | 3.28E−05 |

TABLE 20

Long Chain Branching Factor (LCBF) of ethylene/1-octene interpolymers: Examples 1, 4-7, 10 and 11.

| Sample | Example 1 | Example 4 | Example 5 | Example 6 | Example 7 | Example 10 | Example 11 |
|---|---|---|---|---|---|---|---|
| $M_V$ (g/mole) | 109000 | 104000 | 101000 | 111000 | 109000 | 104000 | 102000 |
| [η] (dL/g) | 1.570 | 1.531 | 1.497 | 1.565 | 1.600 | 1.433 | 1.410 |
| $M_w/M_n$ | 3.61 | 3.80 | 3.77 | 2.51 | 3.18 | 2.99 | 2.23 |
| A | 2.1626 | 2.1626 | 2.1626 | 2.1626 | 2.1626 | 2.1626 | 2.1626 |
| SCB ($CH_3$#/1000C) | 13.5 | 13.7 | 14.5 | 18.1 | 12.7 | 16.7 | 19.8 |
| ZSV (poise) | 107000 | 106000 | 857000 | 103000 | 107000 | 247000 | 158000 |
| Log $ZSV_c$ (log(poise)) | 4.80 | 4.78 | 4.69 | 4.93 | 4.85 | 5.24 | 5.16 |
| Log IVc (log(dL/g)) | 0.231 | 0.220 | 0.212 | 0.241 | 0.236 | 0.202 | 0.202 |
| $S_h$ (dimension-less) | −0.0487 | −0.0202 | −0.0721 | 0.0250 | −0.0240 | 0.527 | 0.442 |
| $S_v$ (dimension-less) | −0.0102 | −0.0042 | −0.0152 | 0.00526 | −0.00505 | 0.111 | 0.00929 |
| LCBF (dimension-less) | 2.49E−04 | 4.28E−05 | 5.47E−04 | 6.58E−05 | 6.06E−05 | 0.0291 | 0.0205 |

TABLE 21

Long Chain Branching Factor (LCBF) of ethylene/1-octene interpolymers: Comparatives 1 and 3-8.

| Sample | Comp. 1 | Comp 3 | Comp 4 | Comp 5 | Comp 6 | Comp 7 | Comp 8 |
|---|---|---|---|---|---|---|---|
| $M_v$ (g/mole) | 102000 | 94200 | 87900 | 88000 | 104000 | 91100 | 86500 |
| [η] (dL/g) | 1.553 | 1.474 | 1.300 | 1.284 | 1.507 | 1.286 | 1.245 |
| $M_w/M_n$ | 3.80 | 3.08 | 1.88 | 1.87 | 2.79 | 3.32 | 2.51 |
| A | 2.1626 | 2.1626 | 2.1626 | 2.1626 | 2.1626 | 2.1626 | 2.1626 |
| SCB ($CH_3$#/1000C) | 13.2 | 14.6 | 23.2 | 22.3 | 14.1 | 23.4 | 20.9 |
| ZSV (poise) | 118000 | 89790 | 151000 | 180000 | 155000 | 257000 | 190000 |
| Log $ZSV_c$ (log(poise)) | 4.83 | 4.79 | 5.20 | 5.28 | 5.06 | 5.22 | 5.19 |
| Log IVc (log(dL/g)) | 0.224 | 0.205 | 0.174 | 0.167 | 0.215 | 0.172 | 0.151 |

TABLE 21-continued

Long Chain Branching Factor (LCBF) of ethylene/1-octene interpolymers: Comparatives 1 and 3-8.

| Sample | Comp. 1 | Comp 3 | Comp 4 | Comp 5 | Comp 6 | Comp 7 | Comp 8 |
|---|---|---|---|---|---|---|---|
| $S_h$ (dimensionless) | 0.00830 | 0.0617 | 0.622 | 0.732 | 0.290 | 0.646 | 0.718 |
| $S_v$ (dimensionless) | 0.00174 | 0.0130 | 0.131 | 0.1054 | 0.0609 | 0.136 | 0.151 |
| LCBF (dimensionless) | 7.23E−6 | 4.00E−4 | 0.0406 | 0.0563 | 0.00883 | 0.0438 | 0.0541 |

TABLE 22

Blown film manufacturing conditions Examples 1 and 3 and Comparative 2.

| Resin Code | Example 2 | Example 3 | Example 3 | Comp. 2 | Comp. 2 |
|---|---|---|---|---|---|
| Film Thickness (mil) | 1 | 2 | 4 | 2 | 4 |
| Output (lb/hr) | 40.0 | 40.2 | 67.5 | 40.6 | 62.0 |
| Die Gap (mil) | 35 | 35 | 35 | 35 | 35 |
| BUR | 2.5:1 | 2.5:1 | 2.5:1 | 2.5:1 | 2.5:1 |
| Barrel Zone 1 (° F.) | 420 | 417 | 418 | 422 | 418 |
| Barrel Zone 2 (° F.) | 400 | 400 | 401 | 400 | 400 |
| Barrel Zone 3 (° F.) | 400 | 400 | 400 | 400 | 400 |
| Adapter Zone 4 (° F.) | 400 | 400 | 400 | 400 | 400 |
| Die Body Zone 5 (° F.) | 420 | 420 | 420 | 420 | 420 |
| Die Body Zone 6 (° F.) | 420 | 420 | 427 | 429 | 437 |
| Die Lip Zone 7 (° F.) | 440 | 440 | 440 | 440 | 440 |
| Melt Temperature (° F.) | 438 | 433 | 469 | 447 | 479 |
| Current (Amp) | 32.0 | 34.0 | 41.1 | 34.0 | 41.0 |
| Voltage (V) | 140 | 139 | 235 | 140 | 235 |
| Pressure High (psi) | 2835 | 2620 | 3310 | 3030 | 3700 |
| Pressure Low (psi) | 2755 | 2510 | 3250 | 2920 | 3650 |
| Avg. Pressure (psi) | 2795 | 2565 | 3280 | 2975 | 3675 |
| Screw Speed (rpm) | 87.8 | 87.5 | 157.4 | 88.9 | 157.5 |
| Air Temperature (° F.) | 51 | 48 | 50 | n/a | 49 |
| Frostline Height (inch) | 7.0 | 8.25 | 17 | 9.0 | 16.5 |
| Line Speed (ft/min) | 71.7 | 35.4 | 30.0 | 35.5 | 30.0 |
| Screw Type | maddox | maddox | maddox | maddox | maddox |
| Specific Output (lb/hr/rpm) | 0.46 | 0.46 | 0.43 | 0.46 | 0.39 |
| Specific Power ((lb/hr)/amp) | 1.25 | 0.12 | 1.64 | 1.19 | 1.51 |
| Specific Energy (W/lb/hr) | 112.0 | 117.6 | 143.1 | 117.2 | 155.40 |

TABLE 23

Blown film physical properties Examples 1 and 3 and Comparative 2.

| Sample Code | Example 2 | Example 3 | Example 3 | Comp. 2 | Comp. 2 |
|---|---|---|---|---|---|
| Density (g/cm³) | 0.9208 | 0.9200 | 0.9200 | 0.9182 | 0.9208 |
| $I_2$ (dg/min) | 1.02 | 0.96 | 0.96 | 0.98 | 0.97 |
| Thickness (mil) | 1.00 | 2.04 | 3.99 | 2.07 | 3.65 |
| Dart Impact, $F_{50}$ (g) | 325 | 365 | 256 | 175 | 150 |
| Tear - MD (g/mil) | 318 | 370 | 491 | 438 | 429 |
| Tear - TD (g/mil) | 638 | 558 | 604 | 646 | 729 |
| Tensile Strength @ Break MD (MPa) | 55.4 | 51.4 | 48.8 | 49.4 | 45.8 |
| Tensile Strength @ Break TD (MPa) | 55.7 | 51.6 | 44 | 45 | 45.4 |
| Tensile Yield Strength - MD (MPa) | 10.2 | 10.6 | 10.8 | 11.6 | 11.5 |
| Tensile Yield Strength - TD (MPa) | 10.5 | 10.8 | 11.1 | 11.8 | 12 |
| Tensile Elongation MD (%) @ Break MD (MPa) | 555 | 603 | 714 | 699 | 745 |
| Tensile Elongation TD (%) @ Break MD (MPa) | 827 | 716 | 717 | 696 | 743 |
| Tensile Elongation @ Yield MD (%) | 16 | 14 | 16 | 15 | 17 |
| Tensile Elongation @ Yield TD (%) | 24 | 19 | 17 | 14 | 12 |
| Tensile Energy (J) MD | 1.96 | 1.84 | 4.02 | 2.27 | 4.04 |
| Tensile Energy (J) TD | 2.55 | 2.22 | 3.69 | 2.01 | 3.88 |
| 1% Secant Modulus MD (MPa) | 193 | 185 | 185 | 203 | 215 |
| 1% Secant Modulus TD (MPa) | 224 | 213 | 214 | 241 | 259 |

TABLE 23-continued

Blown film physical properties Examples 1 and 3 and Comparative 2.

| Sample Code | Example 2 | Example 3 | Example 3 | Comp. 2 | Comp. 2 |
|---|---|---|---|---|---|
| 2% Sec. Modulus MD (MPa) | 163 | 160 | 161 | 174 | 184 |
| 2% Sec. Modulus TD (MPa) | 184 | 176 | 182 | 199 | 213 |
| Film Haze (%) | 5 | 8 | 13 | 7 | 12 |
| Film Gloss @ 45° | 78 | 69 | 69 | 73 | 73 |
| Hot Tack Strength (N) | n/a | 5.70 | 5.61 | 4.58 | 5.07 |
| Hot Tack Onset @0.5 N (° C.) | n/a | 87.0 | 86.9 | 87.0 | 90.3 |
| Hot Tack Onset @1.0 N (° C.) | n/a | 90.5 | 90.3 | 92.0 | 91.7 |
| Heat Seal Temperature @ Max. Heat Seal Strength (° C.) | n/a | 125 | 110 | 130 | 110 |
| Film Hexane Extractables (3.5 mil film) | n/a | n/a | 0.76 | n/a | 0.70 |

TABLE 24

Blown film physical properties Example 6 relative to Comparative 9; 1.0 mil monolayer film.

| Sample Code | Example 6 | Comparative 9 |
|---|---|---|
| Density (g/cm$^3$) | 0.919 | 0.919 |
| I$_2$ (dg/min) | 0.85 | 0.85 |
| Tear - MD (g/mil) | 305 | 275 |
| Tear - TD (g/mil) | 589 | 470 |
| Dart Impact, F$_{50}$ (g) | 824 | 475 |
| Tensile Strength @ Break MD (MPa) | 56 | 49 |
| Tensile Strength @ Break TD (MPa) | 47 | 40 |
| Tensile Yield Strength - MD (MPa) | 9.5 | 9.5 |
| Tensile Yield Strength - TD (MPa) | 9.3 | 9.8 |
| Tensile Elongation MD (%) @ Break MD (MPa) | 572 | 520 |
| Tensile Elongation TD (%) @ Break MD (MPa) | 715 | 700 |
| 1% Secant Modulus MD (MPa) | 159 | 165 |
| 1% Secant Modulus TD (MPa) | 167 | 175 |
| Film Haze (%) | 11 | 22 |
| Film Gloss 45° | 73 | 35 |

We claim:

1. An ethylene interpolymer product comprising:
(i) a first ethylene interpolymer;
(ii) a second ethylene interpolymer, and;
(iii) optionally a third ethylene interpolymer;
wherein said second ethylene interpolymer is characterized by an intermediate branching, wherein said intermediate branching is characterized by a Non-Comonomer Index Distribution, NCID$_i$, having a value characterized by Eq. (1a) and Eq. (1b);

$$NCID_i \leq 1.000 - 0.00201(\log M_i - \log M_o + 4.93) + 0.00137(\log M_i - \log M_o + 4.93)^2 - 0.00034(\log M_i - \log M_o + 4.93)^3 \quad \text{Eq. (1a)}$$

$$NCID_i \geq 0.730 - 0.00388(\log M_i - \log M_o + 4.93) + 0.00313(\log M_i - \log M_o + 4.93)^2 - 0.00069(\log M_i - \log M_o + 4.93)^3 \quad \text{Eq. (1b)}$$

wherein, $M_o$ is a peak molecular weight that characterizes a molecular weight distribution of said second ethylene interpolymer when fit to a log normal distribution and $M_i$ is an incremental molar mass that characterizes said molecular weight distribution; wherein a first derivative of said NCID$_i$, $$\frac{dNCID_i}{d\log M_i},$$

Eq. (2), $$\frac{dNCID_i}{d\log M_i} = \beta_1 + 2\beta_2(\log M_i - \log M_o + 4.93) + 3\beta_3(\log M_i - \log M_o + 4.93)^2 \quad \text{Eq. (2)}$$

has a value of $\leq -0.0001$, coefficients $\beta_0$, $\beta_1$, $\beta_2$ and $\beta_3$ are generated by fitting said NCID$_i$ of said second ethylene interpolymer to a third order polynomial, Eq. (3), $$NCID_i = \beta_0 + \beta_1(\log M_i - \log M_o + 4.93) + \beta_2(\log M_i - \log M_o + 4.93)^2 + \beta_3(\log M_i - \log M_o + 4.93)^3 \quad \text{Eq. (3)}$$

wherein said NCID$_i$ of said second ethylene interpolymer is obtained by deconvoluting an experimentally measured Non-Comonomer Index Distribution of said ethylene interpolymer product;
wherein said ethylene interpolymer product contains long chain branching as characterized by a dimensionless Long Chain Branching Factor, LCBF, having a value of $\geq 0.001$.

2. The ethylene interpolymer product of claim 1, wherein said first ethylene interpolymer is synthesized using a homogenous catalyst formulation and said second ethylene interpolymer is synthesized using an intermediate branching catalyst formulation.

3. The ethylene interpolymer product of claim 2, wherein said homogeneous catalyst formulation is a bridged single site catalyst formulation and said intermediate branching catalyst formulation is an in-line intermediate branching catalyst formulation or a batch intermediate branching catalyst formulation.

4. The ethylene interpolymer product of claim 1 having a melt index from about 0.3 to about 500 dg/minute and a density from about 0.858 to about 0.965 g/cc; wherein melt index is measured according to ASTM D1238 (2.16 kg load and 190° C.) and density is measured according to ASTM D792.

5. The ethylene interpolymer product of claim 1 having a $M_w/M_n$ from about 2 to about 25.

6. The ethylene interpolymer product of claim 1 having a CDBI$_{50}$ from about 10% to about 98%; wherein CDBI$_{50}$ is defined as the percent of said ethylene interpolymer product having a comonomer composition within 50% of the median comonomer composition as determined by CTREF.

7. The ethylene interpolymer product of claim 1; wherein
(i) said first ethylene interpolymer has a melt index from about 0.001 to about 1000 dg/minute, a density from about 0.855 g/cm³ to about 0.975 g/cc and is from about 0 to 60 weight percent of said ethylene interpolymer product;

(ii) said second ethylene interpolymer has melt index from about 0.001 to about 1000 dg/minute, a density from about 0.89 g/cm³ to about 0.965 g/cc and is from about 10 to 99 weight percent of said ethylene interpolymer product;

(iii) optionally said third ethylene interpolymer has a melt index from about 0.1 to about 10000 dg/minute, a density from about 0.855 to about 0.975 g/cc and is from 0 to about 30 weight percent of said ethylene interpolymer product;

wherein melt index is measured according to ASTM D1238 (2.16 kg load and 190° C.), density is measured according to ASTM D792 and weight percent is the weight of said first, said second or said optional third ethylene interpolymer divided by the weight of said ethylene interpolymer product.

8. The ethylene interpolymer product of claim 1 synthesized using a solution polymerization process.

9. The ethylene interpolymer product of claim 1 further comprising from 0.001 to about 10 mole percent of one or more α-olefin.

10. The ethylene interpolymer product of claim 9; wherein said one or more α-olefin are $C_3$ to $C_{10}$ α-olefins.

11. The ethylene interpolymer product of claim 10; wherein said one or more α-olefin is 1-hexene, 1-octene or a mixture of 1-hexene and 1-octene.

12. The ethylene interpolymer product of claim 1 wherein said third ethylene interpolymer is synthesized using a heterogeneous catalyst formulation or a homogeneous catalyst formulation or an intermediate branching catalyst formulation.

13. The ethylene interpolymer product of claim 1; wherein said first ethylene interpolymer has a first $CDBI_{50}$ from about 20 to about 98%, said second ethylene interpolymer has a second $CDBI_{50}$ from about 20 to about 70% and said optional third ethylene interpolymer has a third $CDBI_{50}$ from about 20 to about 98%.

14. The ethylene interpolymer product of claim 13; wherein said first $CDBI_{50}$ is higher than said second $CDBI_{50}$.

* * * * *